United States Patent
Leister et al.

(10) Patent No.: US 11,656,494 B2
(45) Date of Patent: May 23, 2023

(54) DEVICE FOR COMBINING LIGHT BEAMS WHICH INTERACT WITH ADJACENTLY ARRANGED PIXELS OF A LIGHT MODULATOR

(71) Applicant: SEEREAL TECHNOLOGIES S.A., Munsbach (LU)

(72) Inventors: Norbert Leister, Dresden (DE); Stephan Reichelt, Wanger i.A. (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 17/129,059

(22) Filed: Dec. 21, 2020

(65) Prior Publication Data
US 2021/0109404 A1    Apr. 15, 2021

Related U.S. Application Data

(63) Continuation of application No. 16/337,585, filed as application No. PCT/EP2017/074903 on Sep. 29, 2017, now Pat. No. 10,871,674.

(30) Foreign Application Priority Data

Sep. 29, 2016    (EP) ..................................... 16191282

(51) Int. Cl.
*G02F 1/1335*    (2006.01)
*G02F 1/13363*    (2006.01)
(Continued)

(52) U.S. Cl.
CPC .... *G02F 1/133528* (2013.01); *G02F 1/13363* (2013.01); *G03H 1/2294* (2013.01);
(Continued)

(58) Field of Classification Search
CPC ......... G03H 1/2294; G03H 2001/0224; G03H 2222/31; G03H 2225/55; G02F 1/133528;
(Continued)

(56) References Cited

U.S. PATENT DOCUMENTS 6,273,571 B1    8/2001   Sharp et al.
8,711,466 B2    4/2014   Kroll et al.
(Continued)

FOREIGN PATENT DOCUMENTS

DE    102009044910 A1    12/2010
JP       2002221703 A  *  8/2002
(Continued)

*Primary Examiner* — Jia X Pan
(74) *Attorney, Agent, or Firm* — Saul Ewing LLP

(57) ABSTRACT

A device for combining light beams which interact with adjacently arranged pixels of a light modulator, having a beam splitting component, a beam combining component, and a beam superposition component. The beam splitting component is configured such that incident light beams are split into a first subbeam and a second subbeam so that the first subbeam propagates toward a first pixel of the light modulator and the second subbeam propagates toward a second pixel of the light modulator. The beam combining component is configured and arranged so that the first subbeam and the second subbeam are combined after interaction with pixels of the light modulator. The beam splitting component and the beam combining component are configured and arranged in such a way that a sum of optical path lengths of the first subbeam and the second subbeam is respectively constant for different angles of incidence.

20 Claims, 57 Drawing Sheets

(51) Int. Cl.
*G03H 1/22* (2006.01)
*G03H 1/02* (2006.01)

(52) U.S. Cl.
CPC .... *G02F 1/13355* (2021.01); *G02F 1/133541* (2021.01); *G02F 1/133638* (2021.01); *G03H 2001/0224* (2013.01); *G03H 2222/31* (2013.01); *G03H 2225/55* (2013.01)

(58) Field of Classification Search
CPC ........... G02F 1/13363; G02F 1/133541; G02F 1/13355; G02F 1/133638
See application file for complete search history.

(56) References Cited

U.S. PATENT DOCUMENTS

| | | |
|---|---|---|
| 2004/0105039 A1 | 6/2004 | Wills et al. |
| 2012/0092735 A1* | 4/2012 | Futterer ................... G03H 1/08 359/11 |
| 2013/0002994 A1 | 1/2013 | Wang et al. |
| 2013/0293940 A1* | 11/2013 | Kroll .................... G03H 1/2645 359/9 |
| 2013/0321888 A1 | 12/2013 | Sung et al. |

FOREIGN PATENT DOCUMENTS

| | | |
|---|---|---|
| WO | 2006066919 A1 | 6/2006 |
| WO | 2010149583 A1 | 12/2010 |

\* cited by examiner

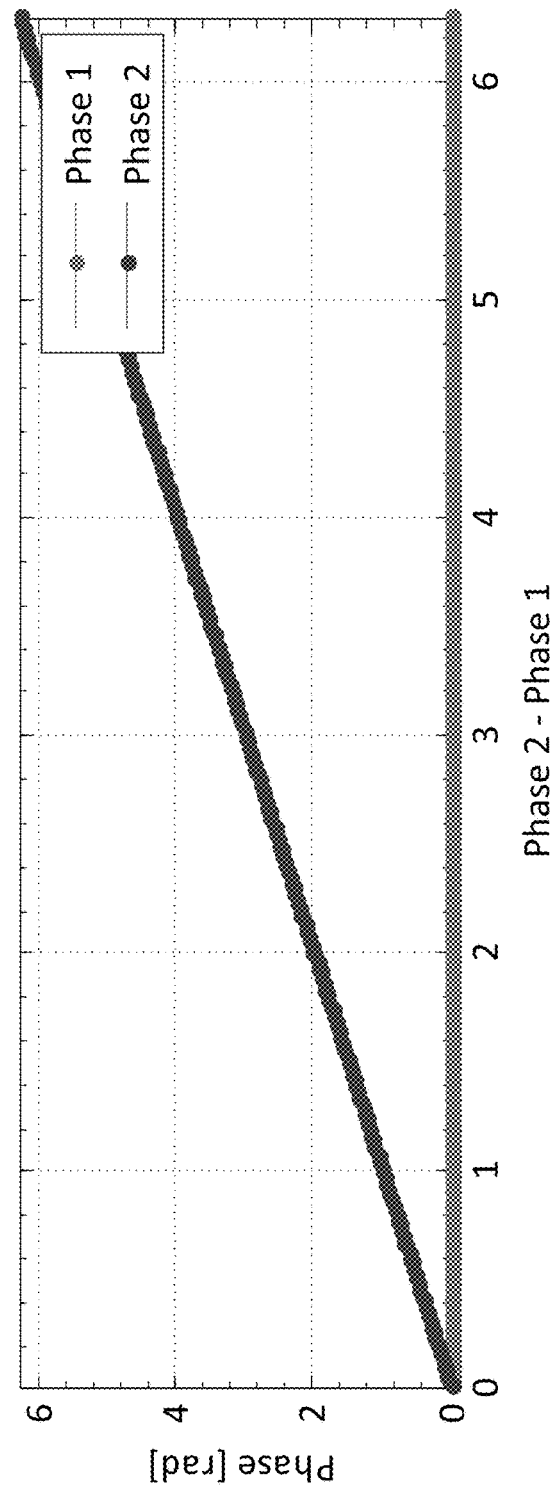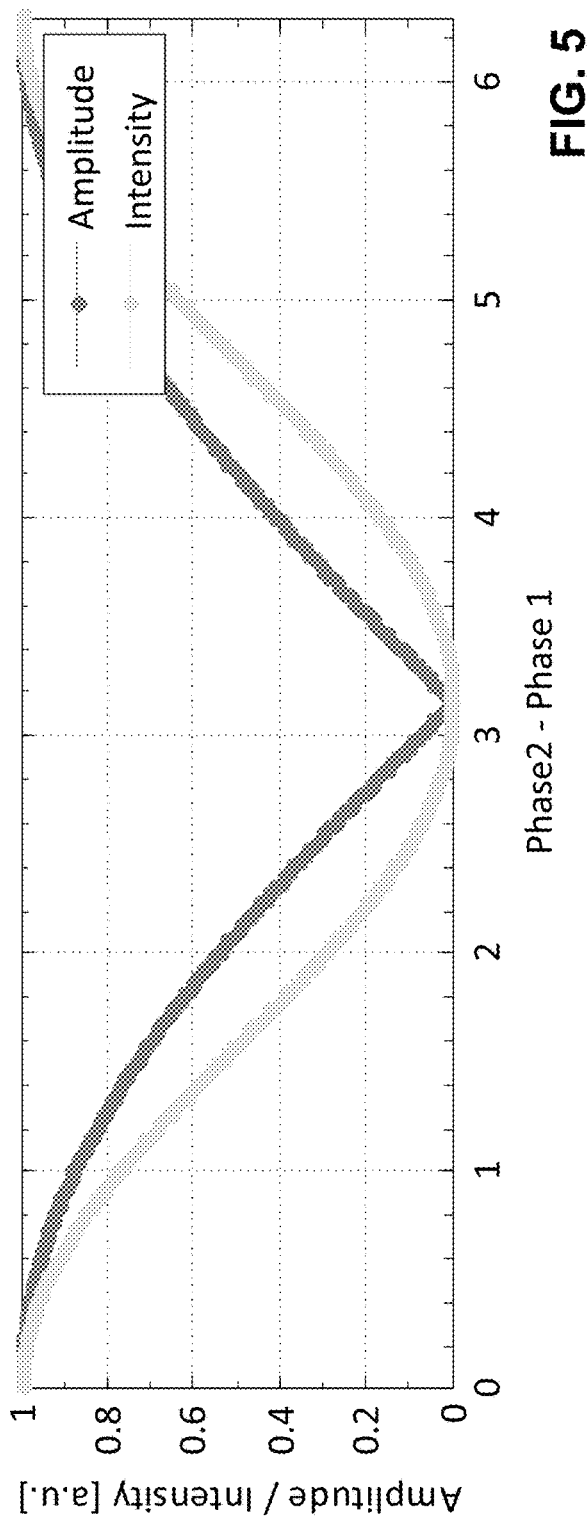
FIG. 5

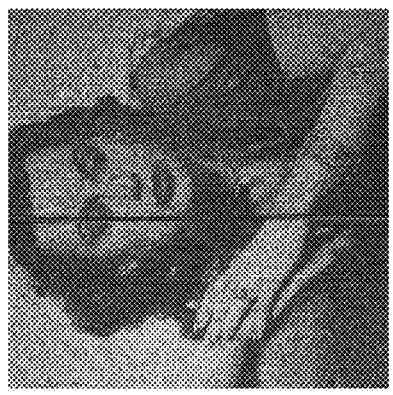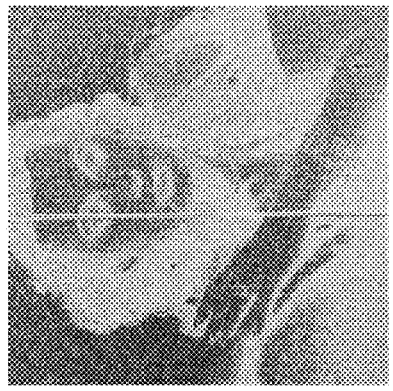
Fig. 11
(Prior Art)
*Experimental observation*
Relatively weak gray value representation
(Optimization difficult)
Sensitive to mechanical load
(Deformation of the display results in contrast loss/gray value inversion)
contrast inversion

Two-beam interference

BC-SLM: *Amplitude representation of the hologram function H based on two beam interference*

Double phase representation of a complex-valued hologram function H:

$$\frac{1}{2}\exp[i\phi_1(x,y)] + \frac{1}{2}\exp[i\phi_2(x,y)] = \cos\left(\frac{\phi_1-\phi_2}{2}\right)\exp\left[i\left(\frac{\phi_1+\phi_2}{2}\right)\right]$$

$$\equiv A(x,y)\exp[i\Phi(x,y)]$$

Pair of phase values in a macropixel:

$$\phi_{1,2}(x,y) = \mathrm{mod}\{[\Phi(x,y) \pm \cos^{-1}A(x,y)], 2\pi\}.$$

Hsueh, C. K. & Sawchuk, A. A.; *Appl. Opt.*, 1978, *17*, 3874-3883

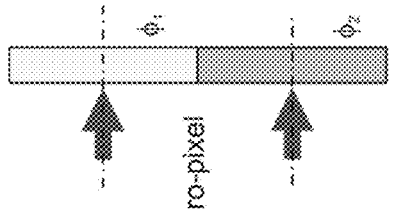

Fig. 12

Two-beam interference
Amplitude and intensity
$$I_R = A_R^2 = U_R U_R^*$$
$$I_R = A_1^2 + A_2^2 + 2A_1 A_2 \cos \Delta\phi$$
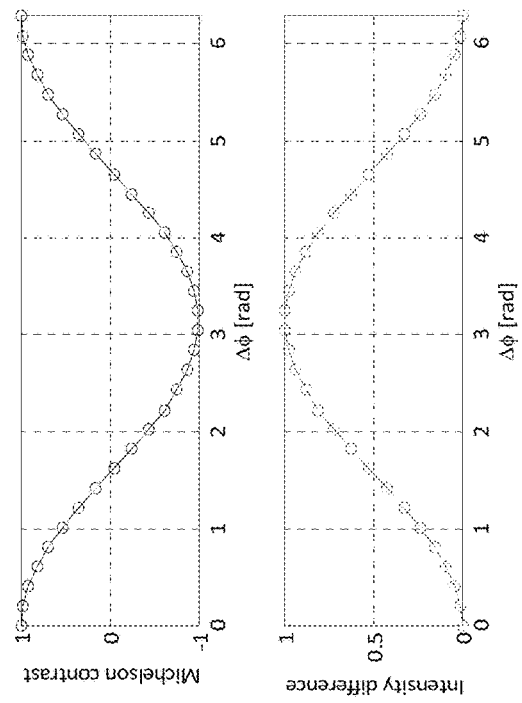
Michelson contrast $C_M$ and intensity error
$$C_M = \frac{I_{max} - I_{min}}{I_{max} + I_{min}}$$
$$\Delta I = I_{nominal} - I_{actual}$$
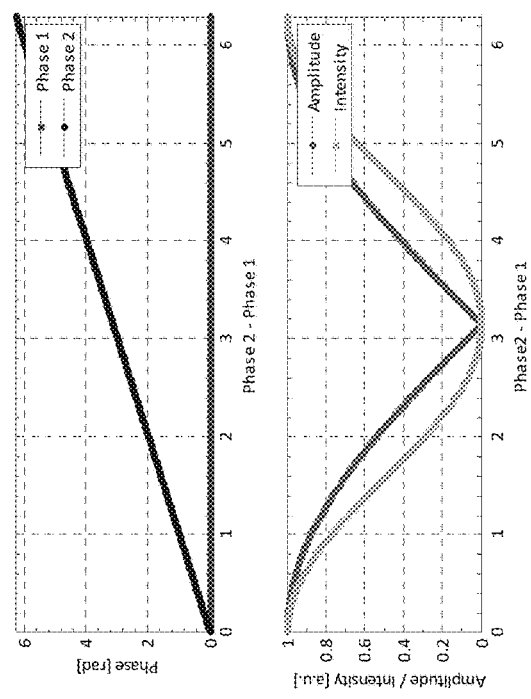
Assumptions:
$A_1 = A_2 = 0.5$ (normalization)
Fig. 13

Beam paths through a uniaxial medium

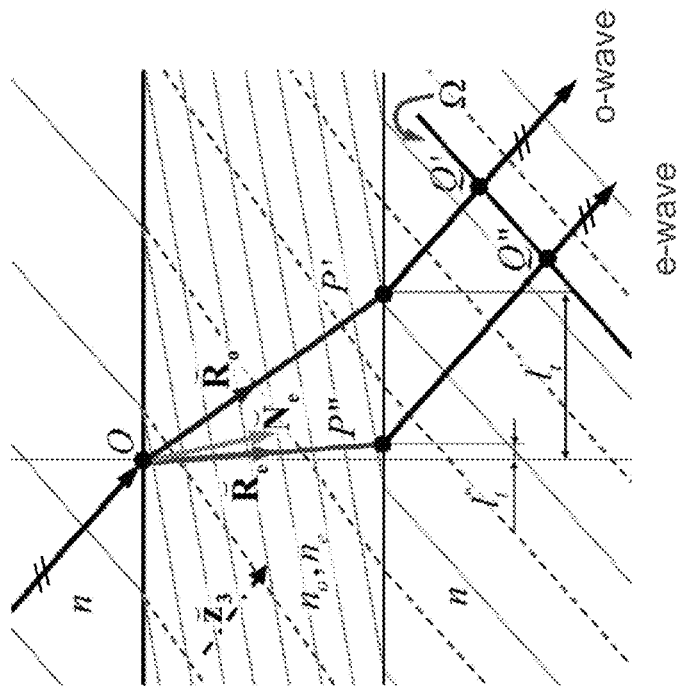

Optical path lengths OPL (only through the plate)

Ordinary beam (o-wave) $OPL_o = n_o \cdot OP'$ $$OPL_o = L \frac{n_o^2}{[n_o^2 - n^2\sin^2\alpha]^{\frac{1}{2}}}$$

Extraordinary beam (e-wave) $OPL_e$ (between O and P'')

$$OPL_e = \frac{L n_o n_e^2}{\{n_e^2(n_e^2\sin^2\theta + n_o^2\cos^2\theta) - [n_e^2 - (n_e^2 - n_o^2)\cos^2\theta]n^2\sin^2\alpha\}^{\frac{1}{2}}}$$

→ Entry and exit beams mutually parallel (optical axis in the incidence plane)

Veiras, F. E.; Perez, L. I. & Garea, M. T.; *Appl. Opt.*, 2010, *49*, 2769-2777

Fig. 15

Geometry of a uniaxial plane-parallel plate

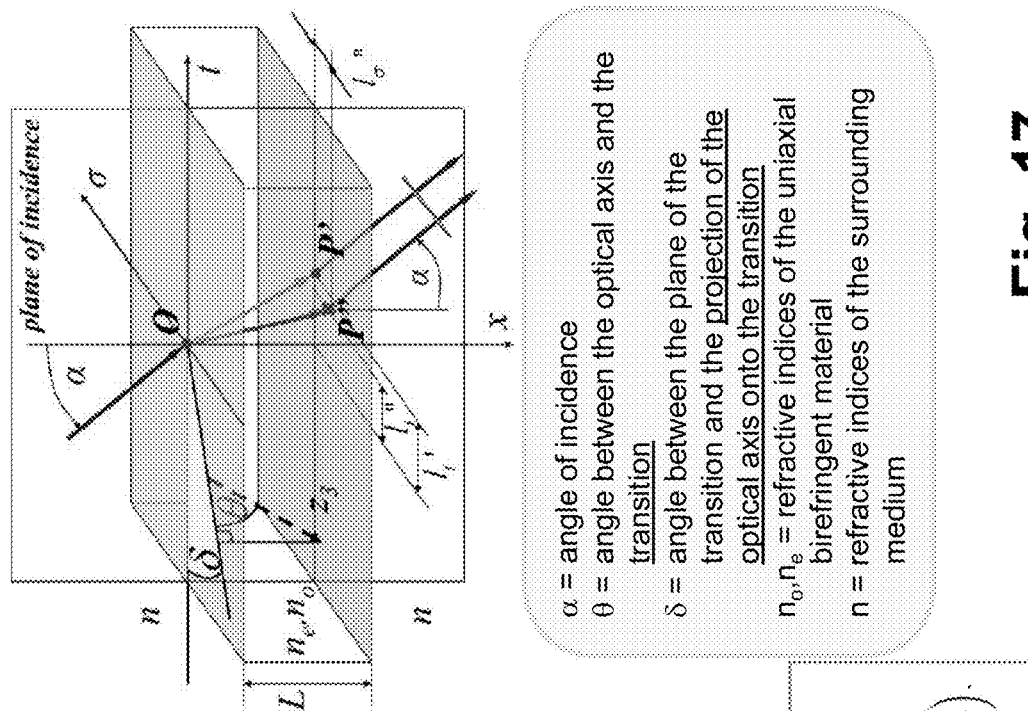

Fig. 17

Model

Total phase shift is taken into account (of the uniaxial plate + the surrounding medium)

Contrast inversion with a phase shift of $\pi$ or OPD of $\lambda/2$

Optical parameters

Reflective index: $n_o = 1.663$, $n_e = 1.489$

Nominal thickness $L = 755.8$ μm $\alpha$ = angle of incidence
$\theta$ = angle between the optical axis and the transition
$\delta$ = angle between the plane of the transition and the projection of the optical axis onto the transition
$n_o, n_e$ = refractive indices of the uniaxial birefringent material
$n$ = refractive indices of the surrounding medium

Based difference between o- and e-Waves $$\Delta\phi = \frac{2\pi L}{\lambda_o}\left(\left(n_o^2 - n^2\sin^2\alpha\right)^{\frac{1}{2}} + \frac{n(n_o^2 - n_e^2)\sin\theta\cos\theta\cos\delta\sin\alpha}{n_e^2\sin^2\theta + n_o^2\cos^2\theta}\right.$$
$$\left. + \frac{-n_o\{n_e^2(n_e^2\sin^2\theta + n_o^2\cos^2\theta) - [n_e^2 - (n_e^2 - n_o^2)\cos^2\theta\sin^2\delta]n^2\sin^2\alpha\}^{\frac{1}{2}}}{n_e^2\sin^2\theta + n_o^2\cos^2\theta}\right)$$

Analysis of relative phase difference

*Simple "black-box" model*

Only the phase change in the surrounding medium is taken into account

In the nominal state the two light beams are "in-phase" (Calibration for A = 1)

A contrast inversion occurs at a phase difference of $\pi$ or OPD (optical path difference) of $\lambda/2$:

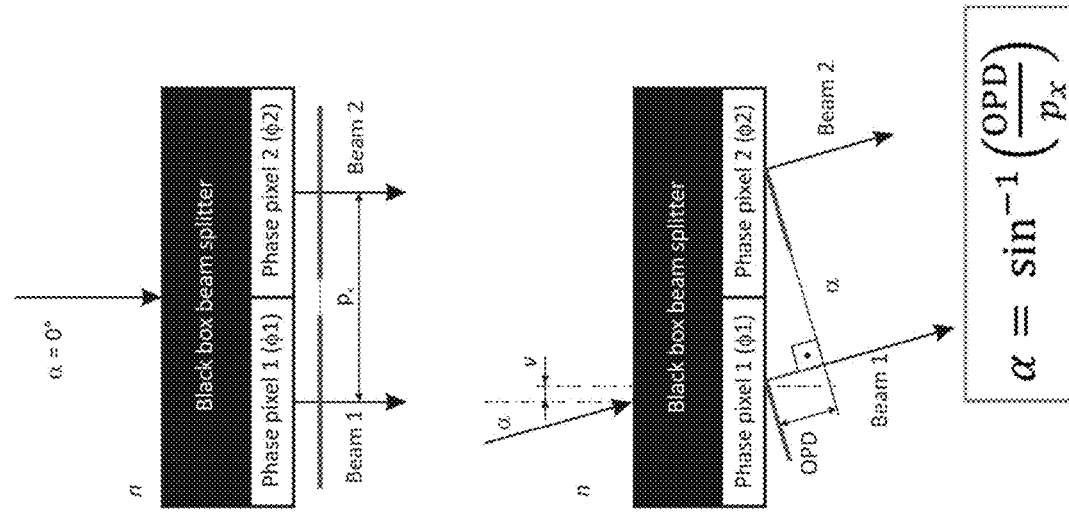

$$\alpha = \sin^{-1}\left(\frac{\lambda}{2p_x}\right)$$

(Deviation from the nominal state 0° angle of incidence leads to contrast inversion!)

Example: $\lambda$ = 532 nm and the pixel size (lateral offset) $p_x$ = 84 µm

→ Contrast inversion at $\alpha$ = 0.181°

Fig. 20

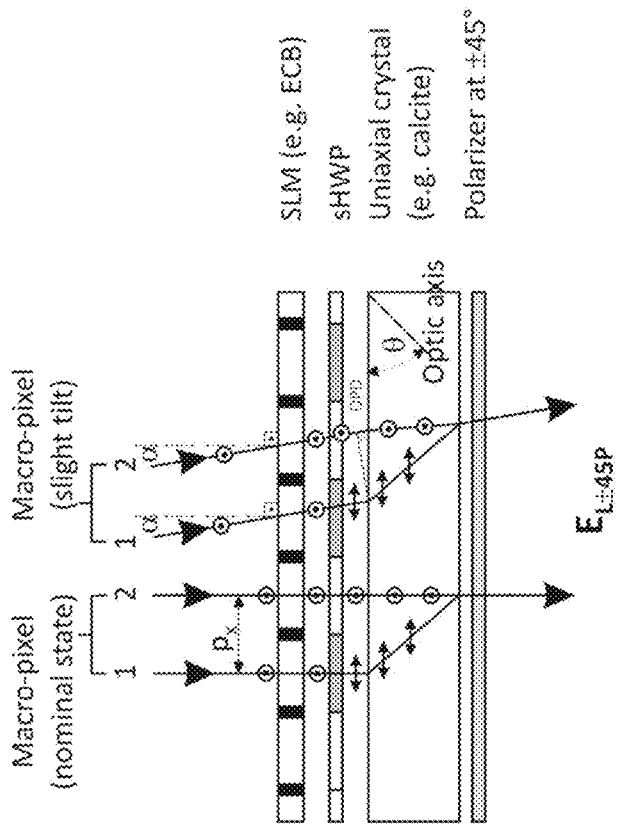

*Possible solutions*

How can the problems identified be avoided/overcome?

Option 1
Thermal and mechanical stabilization of the entire display sandwich
Monitoring and active control of misaligned states
(e.g. by fine adjustment of the illumination wavefront)

→ *Implementation is difficult and expensive*

Option 2
Robust and error-tolerant optical design by self-compensation principles → *This solution is more promising*

Fig. 23

Generic design principles

*Design principles / Rules*

To configure the beam paths as symmetrically as possible where the beams are split The symmetry rule leads to symmetrical interferometer types with symmetrical interferometer branches (reflective: Michelson, transmissive: Mach-Zehnder)

Main functions: (1) beam splitting, (2) independent beam modulation, (3) beam recombination

*Component parts of a fully complex-valued SLM based on pure phase modulation LC-SLM*

Beam splitter: polarization-sensitive component (PSC1)

entry-side "polarization provider" (HWP or QWP)

LC-SLM: pure phase modulation, i.e. out-of-plane/in-plane LC rotation exit-side "polarization provider" (HWP or QWP)

beam combiner: polarization-sensitive component part (PSC2)

Interference "generator" (Linear polarizer)

Fig. 24

SLM-dependent configurations

HAN-mode LC-SLM
Example of in-plane LC rotation

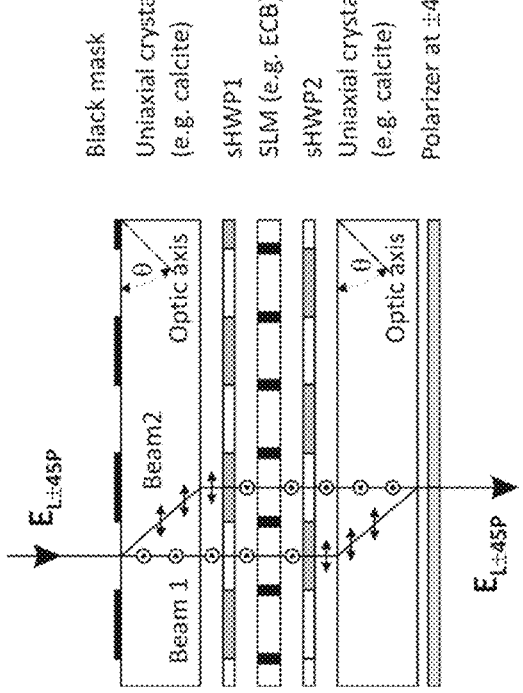

ECB-mode LC-SLM
Example of out-of-plane LC rotation

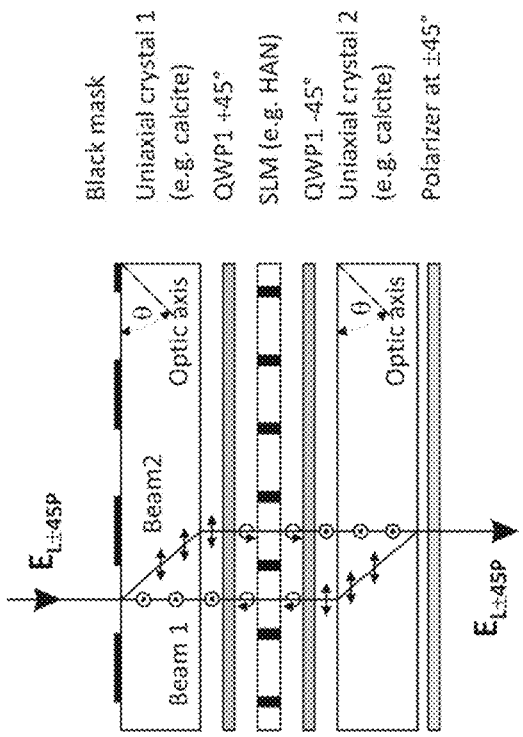

other polarization-sensitive component parts (PSC) for the beam splitting and recombination: volume gratings (volume Bragg gratings), polarization gratings, etc.
→ other configurations necessary for other PSC component parts For polarization-dependent SLMs, it is not necessary for the beam splitter/combiner to be polarization-sensitive. Conventional amplitude splitting may be used.

Fig. 26

Summary

*Results*

The reason for the high amplitude sensitivity of BC-SLMs has been identified:

→ Variation of the *relative phase difference between interfering adjacent pixels*

Nominal state is defined by a unique calibration, deviations from the nominal state are critical (i.e. mechanical stress, thermal extension)

→ Illumination wavefront must be stable *with respect to the angle of incidence*

It is not the beam path inside the beam combination element but outside that is critical (surrounding medium)

→ *intrinsic* *question of the simple BC geometry*

Criterion for maximum variance of the phase difference derived: $\Delta\phi_{max} \leq \pi/8 = 0.39$ rad → the angle tolerance of the illumination wavefront depends on the pixel pitch in the combination direction, wherein the sensitivity increases with the pitch (most critical for large pixel pitch, i.e. direct view)

$$\Delta\alpha \leq \sin^{-1}\frac{\lambda}{16p_x}$$

*New solution*

*a new solution has been proposed, which is based on a symmetrical beam path*

*Feature: variation in the relative phase difference is now self-compensated, problem solved various configurations possible, but more component parts are required*

*Statement of the problem (for phase SLM + BC)*

For the basic configurations
(a) (b) and (c)
output polarization is always parallel to input polarization What is required for beam combiner is however:
Pixel pairs
for which pixel 2 has an output polarization perpendicular to pixel 1

How to achieve this ?

Note:
Structured polarizer at input is in its simplest form
only applicable to basic set-up (a) and (b)
but not to (c)

For (c) only pixel with Pol 0 has phase modulation, pixel with Pol 90 has not !

(but there are some options for (c) -> next page)

Fig. 40

DEVICE FOR COMBINING LIGHT BEAMS WHICH INTERACT WITH ADJACENTLY ARRANGED PIXELS OF A LIGHT MODULATOR

CROSS-REFERENCE TO RELATED APPLICATIONS

This is a continuation of U.S. application Ser. No. 16/337,585, filed on Mar. 28, 2019, which claims the priority of PCT/EP2017/074903, filed on Sep. 29, 2017, which claims priority to European Application No. EP 16191282.9, filed on Sep. 29, 2016, the entire contents of each of which are incorporated fully herein by reference.

BACKGROUND OF THE INVENTION

The present invention relates to a device for combining light beams which interact with adjacently arranged pixels of a light modulator. The present invention furthermore relates to a device for beam combination and to a spatial light modulation device for complex-valued modulation of light. The invention relates to a device for beam combination, and to an optical arrangement of polarization-sensitive component parts which allows complex-valued modulation of a light field by means of a phase-modulating light modulator and a beam combiner, which is insensitive to changes in the incidence direction of the illumination wave.

Devices of the type mentioned in the introduction are used particularly in holographic displays for the three-dimensional reconstruction of objects and/or scenes, or are useful therefor, such displays being described for example in WO 2006/066919 A1 or in other publications by the Applicant.

PRIOR ART

DE 10 2009 044 910 A1 and WO 2010/149583 A1 describe various configurations of a device for the beam combination of respectively 2 phase pixels of a light modulator (SLM) to form a complex-valued pixel, referred to below as a beam combiner. The two pixels are arranged adjacent to one another. In this document, adjacently arranged pixels of a light modulator are intended in particular to mean pixels spatially adjoining one another directly, in which case the pixels may be arranged adjacent to one another in the horizontal direction, the vertical direction or a different direction—for example diagonally. A different polarization is imparted to light from the two pixels of a pixel pair after passing through the SLM. This is done by means of a structured retardation plate. The light of one polarization takes a different path through the beam combiner than that of the other, so that superposition or combining takes place at the exit of the beam combiner. The term combination of light beams is in particular intended in this document to mean spatial superposition of the light beams in such a way that, after the combination, the combined light beams have essentially the same propagation direction in a spatial overlap region.

FIG. 1—and in a similar way FIG. 8 of WO 2010/149583 A1—shows according to the prior art a structured aperture diaphragm AP and a layer PS with polarization-dependent light propagation, for example a calcite layer. The light path is indicated schematically. For simplicity, the geometrical light propagation is indicated schematically, diffraction not being taken into account.

The incident light is split into light of a—for example linear—polarization, which passes through the layer to a first pixel of an SLM PIX, and light of a second—for example perpendicular to the first and also linear—polarization, which travels to a second pixel of the SLM PIX. For illustration, one polarization is schematically indicated here by a dashed line and the other polarization by a dotted line. For an LC-based phase-modulating SLM, which for example only modulates in phase light of a particular entry polarization, a structured retardation plate may also be applied at the exit of the polarization-selective layer. The effect of this is that, before entry into the SLM PIX, for example for the light traveling to the second pixel, the polarization is rotated in such a way that only light of one polarization passes through the SLM itself. In the case of a reflective SLM, the light then travels back along the same path, and light of the two pixels of a pixel pair is superimposed again at the position of the aperture opening.

FIG. 2 shows the case without an aperture diaphragm. For illustration, the light which enters at a position where the aperture diaphragm previously was is indicated in a different gray shade. Light of both polarization directions would arrive at each pixel. After passing through the SLM PIX, light would also travel back again from each pixel in two directions. On the return path, although the light from pixel 1 and pixel 2 would be superimposed in the desired way, light from pixel 3 would undesirably also be superimposed on light from pixel 2. In this form, the arrangement can be used only insufficiently as a device for beam combination (beam combiner).

SUMMARY OF THE INVENTION

The object of the present invention is therefore to provide and refine a device for combining light beams, which substantially avoids these problems.

The device according to the invention is used for combining light beams which interact with adjacently arranged pixels of a light modulator. The light modulator comprises a multiplicity of pixels and is driven in such a way that two adjacent pixels respectively form a macropixel. A beam splitter is provided in relation to a macropixel, which is configured and arranged in such a way that incident light beams are thereby split into a first subbeam and a second subbeam, in such a way that the first subbeam propagates in the direction of the first pixel of the macropixel and the second subbeam propagates in the direction of the second pixel of the macropixel. Preferably, the splitting of the light beams into the first subbeam and the second subbeam is carried out with essentially equal intensity. A first structured beam influencing component is provided between the beam splitter and the light modulator, which is configured in such a way that the first subbeam can thereby be influenced in a different way to the second subbeam. The first and second subbeams pass after interaction with the respective pixel of the macropixel through a second structured beam influencing component, which is configured in such a way that the first subbeam can thereby be influenced in a different—preferably opposite—way to the second subbeam. A beam combiner is provided, which is configured and arranged in such a way that the first subbeam and the second subbeam can thereby be combined. A beam selector is arranged between the light modulator and the first or second structured beam influencing component, which is configured in such a way that first and/or second subbeams which do not belong to the macropixel are thereby blocked—for example absorbed or reflected. The light modulator of this device is preferably passed through transmissively by the incident light, or the two subbeams, or the incident light passes through the light modulator only once. This device will be referred to below as a transmissively operating device.

The device according to the invention is used for combining light beams which interact with adjacently arranged pixels of a light modulator. The light modulator comprises a multiplicity of pixels and is driven in such a way that two adjacent pixels respectively form a macropixel. A beam splitter is provided in relation to a macropixel, which is configured and arranged in such a way that incident light beams are thereby split into a first subbeam and a second subbeam, in such a way that the first subbeam propagates in the direction of the first pixel of the macropixel and the second subbeam propagates in the direction of the second pixel of the macropixel. Preferably, the splitting of the light beams into the first subbeam and the second subbeam is carried out with essentially equal intensity. A structured beam influencing component is provided between the beam splitter and the light modulator, which is configured in such a way that the first subbeam can thereby be influenced in a different way to the second subbeam. A reflection means is provided, with which the subbeams are reflected. The first and/or second subbeams pass after interaction with the respective pixel of the light modulator through the structured beam influencing component and the beam splitter again in order to recombine the first subbeam and the second subbeam. A beam selector is arranged between the light modulator and the structured beam influencing component, which is configured in such a way that first and/or second subbeams which do not belong to the macropixel are thereby blocked. Preferably, the incident light, or the two subbeams, interact reflectively with the light modulator of this device. This may on the one hand be carried out by the two subbeams passing through the light modulator two times, when for example the light passes through a liquid-crystal layer of the light modulator for a first time, is reflected at the reflection means and passes through the liquid-crystal layer for a second time. One example of such a light modulator is an LCoS. On the other hand, the pixels of the light modulator itself may comprise a reflection means, so that the two subbeams respectively interact with a reflectively acting pixel. One example of such a light modulator is a MEMS. This device will be referred to below as a reflectively operating device.

According to the invention, it has first of all been discovered that possibly perturbing diffraction effects at a structured aperture can be avoided in particular in that such a structured aperture does not have to be used in the device and the split subbeams are nevertheless not unintentionally influenced in an undesired way by adjacent macropixels. The reason is that thus, because of the particular configuration and arrangement of the beam selector in conjunction with a structured beam influencing component, act comparably to the now no longer required structured aperture, namely in such a way that first and/or second subbeams which do not belong to the macropixel are thereby blocked. The mode of operation is, however, different insofar as the structured aperture, at its optically non-transmissive positions, does not let any light beams enter the device for beam combination according to the prior art. The device according to the invention, however, lets all incident light beams enter the device according to the invention for combining light beams and blocks—essentially only inside the device—the first and/or second subbeams which do not belong to a macropixel because of the combination of the beam selector in conjunction with the structured beam influencing component. Because a structured aperture does not have to be used in the device, the orientation of the structured aperture with respect to the positions of the pixels of the light modulator is advantageously obviated.

The preferred embodiments and refinements of the present invention will first be presented in a somewhat generalized way below, the preferred embodiments and refinements of the present invention being explained in somewhat more detail and with specific examples particularly the in the description of the figures.

In the case of the transmissively operating device, the beam splitter and the beam combiner could be identically configured optically birefringent uniaxial components. To this extent, the beam splitter and the beam combiner could be made from the same material and/or have the same optical axes. In particular, the orientation of the optical axis of the beam splitter is oriented in the same way as the orientation of the optical axis of the beam combiner. The optical axes of the two birefringent uniaxial components could be oriented in such a way that the angle ($\theta$) with respect to the interface forms an equal angle between the ordinary and extraordinary subbeams for the two components. Use of optically birefringent uniaxial components is employed particularly when polarized light beams, or subbeams, are to be combined with one another. In particular, provision could be made that the incident light beams are linearly or circularly polarized, the polarization direction of the incident light beams being oriented in a predetermined direction in such a way that a beam splitter is provided which is configured and arranged in such a way that, for example, the incident light beams are thereby split into a first subbeam and a second subbeam—essentially with the same intensity—in such a way that the first subbeam propagates in the direction of the first pixel of the macropixel and the second subbeam propagates in the direction of the second pixel of the macropixel.

In the case of the reflectively operating device, the beam splitter—through which the two subbeams pass two times—could be configured in the form of an optically birefringent uniaxial component. To this extent, the beam splitter has a twofold function, since on the one hand it splits the incident light beams into a first subbeam and a second subbeam, and on the other hand the beam splitter recombines the first subbeam and the second subbeam with one another.

It is also conceivable that the beam splitter and/or the beam combiner is respectively configured not in the form of a birefringent component but in the form of at least one volume grating or at least one polarization grating. In this case, however, the dispersion property of the volume or polarization grating used should be corrected when the device according to the invention is intended to be operated with light of different wavelengths. In this case, at least one corresponding grating could also be provided for light of each wavelength used. To this extent, the use of optically birefringent components for the function of the beam splitter and/or of the beam combiner in the device according to the invention is preferred particularly when light with different wavelengths is employed.

More particularly preferably, the structured beam influencing component comprises spatial structuring which regionally realizes the functionality of a retarder, which has a $\lambda/2$ plate and/or a $\lambda/4$ plate. As an alternative or in addition, the structured beam influencing component could comprise spatial structuring which regionally modifies no optical property of a subbeam.

The spatial structuring of the structured beam influencing component is preferably adapted to the spatial structure of the pixels of the light modulator, for example in the sense of an imaginary perpendicular projection of the structure of the structured beam influencing component onto the structure of the pixels of the light modulator, such a projection essentially leading to congruent regions. It should be mentioned at this point that these considerations relate to the optical properties of the component parts of the device according to the invention for combining light beams, and for example not to the electronic circuits for driving the light modulator, even though parts of the electronic circuits also interact with light.

In the case of the reflectively operating device, the pixels of the light modulator could themselves be configured reflectively, as is the case for example in MEMs. As an alternative, a mirror could be arranged after the optically transmissive pixels of the light modulator.

More particularly preferably, the beam splitter, the beam combiner, the first and/or the second structured beam influencing component are configured and arranged in such a way that the beam path of the first subbeam and the beam path of the second subbeam are essentially configured point-symmetrically with respect to the midpoint between the first pixel and the second pixel of the macropixel. More precisely, the point symmetry with respect to the midpoint between the first pixel and the second pixel of the macropixel exists in the plane in which the beam path of a first subbeam and the beam path of a second subbeam, associated with the first subbeam, lie. In relation to the entire macropixel, there is thus symmetry in relation to the central line segment of the two adjacent pixels. Particularly in the case of the transmissively operating device, the beam splitter and/or the structured beam influencing component could be configured and arranged in such a way that the beam path of the first subbeam and the beam path of the second subbeam are essentially configured point-symmetrically with respect to a beam splitting point and/or a beam combining point. In these refinements of the device according to the invention for combining light beams, the incident light beams may particularly advantageously have an incidence direction which differs from a predetermined incidence direction characterizing a nominal state, and nevertheless achieve intended splitting and combining of the subbeams. In other words, such refinements of the device according to the invention for combining light beams are insensitive to changes in the incidence direction. Further comments in this regard will be made later at a different point in the present document.

More particularly preferably, the beam selector comprises a polarizer or consists of a polarizer. The polarizer is preferably a spatially nonstructured element. In this case, the polarizer is configured and arranged in such a way that first and/or second subbeams which do not belong to the macropixel are thereby blocked.

More particularly preferably, a beam superposition component is provided, with which the first subbeam and the second subbeam can be made to interfere. The beam superposition component could likewise be a polarizer, which could in particular be configured and arranged in such a way that, for effective phase modulation of the macropixel, the maximum amplitudes of the two subbeams to be superimposed have essentially an equal amplitude value after the combining.

If the light modulator comprises liquid crystals, the orientation direction of which can be varied by means of electrical driving, cyclic voltage inversion in the electrical driving is in principle carried out in order to avoid electrolysis. Voltage inversion may specifically be carried out conventionally as frame inversion, line inversion or by means of pixel inversion. In the case of frame inversion, at first all the pixels are driven with the same sign of the voltage, then the sign is inverted for all the pixels. In the case of line inversion, adjacent rows or columns of the pixels of a light modulator are conventionally driven with a different sign of the voltage, for example at first the even rows with a positive sign and the odd rows with a negative sign. The sign is then reversed for all the pixels. In the case of pixel inversion, a checkerboard arrangement of positive and negative voltages is conventionally used.

More particularly preferably, the pixels of a macropixel are respectively driven with an electrical voltage with the same sign. In the case of line inversion, this could be carried out in that two adjacent pixels of a macropixel are respectively arranged in the same row or column to be inverted. As an alternative, the line inversion may also be replaced with double line inversion, in which 2 adjacent columns or rows are respectively driven with the same sign of the voltage and the next two columns or rows are driven with the opposite sign. The respective first pixel of a macropixel may then be located in the first row or column, and the second pixel of the macropixel in the respective second row or column. Pixel inversion may also be envisioned, this relating to electrical inversion such that the two pixels of a macropixel are inverted similarly. In the case of frame inversion, the driving of the pixels for all the macropixels of the light modulator would respectively always be provided with an electrical voltage of the same sign.

Now, the beam splitter, an optionally present beam combiner, the at least one structured beam influencing component and/or the beam selector could be arranged essentially parallel to one another and have an intermediate space at one position or another. More particularly preferably, however, the beam splitter, an optionally present beam combiner, the at least one structured beam influencing component and/or the beam selector are directly arranged on one another or fastened to one another (sandwich arrangement). In this way, a compact and stable structure of a sandwich arrangement may be achieved, which is for example optimized in relation to temperature variations, without substantially modifying the optical properties. The individual component parts could, for example, be fastened to one another by means of adhesive, in which case, particularly with a view to the already mentioned symmetrization of the component parts of the device according to the invention, the same adhesive is preferably used in order to adhesively bond different layers together.

Specifically, the incident light beams could have a linear polarization or a circular polarization, which is oriented or adjusted in such a way that the light beams can be split into the first and second subbeams and recombined.

In the case of the reflectively operating device, a flatly shaped illumination device (comparably to WO 2010/149583 A1) could be arranged between the light modulator and the beam splitter or between the beam splitter and the beam superposition component. Such a flatly shaped illumination device could be configured comparably to WO 2010/149583 A1. The illumination device could comprise a flatly shaped lightguide and an extraction unit, with which the light is extracted from the lightguide and can be deviated in the direction of the light modulator. The light reflected at the reflection means could propagate essentially undeviated through the illumination device and then through the beam combiner, if for example the polarization directions of the corresponding light beams are adjusted suitably.

If the light modulator comprises liquid crystals and is configured in such a way that the liquid crystals execute an out-of-plane rotation, as is the case for example with liquid crystals in ECB (electrically controlled birefringence) mode, the incident light beams could be linearly polarized, in which case the structured beam influencing component could regionally have the functionality of a λ/2 plate.

The light modulator could comprise liquid crystals and be configured in such a way that the liquid crystals execute an in-plane rotation. Such a configuration is provided particularly in HAN-LC mode (hybrid aligned nematic liquid crystal mode) or in CIPR (continuous in-plane rotation) mode or in smectic LC modes, in which an in-plane rotation of the LC molecules in an electric field dominates over an out-of-plane rotation. Furthermore, the light modulator could also contain liquid crystals which comprise a cholesteric phase and in which the optical axis has an in-plane rotation in the electric field (uniform lying helix—ULH— mode). In the cases mentioned, the incident light beams could be linearly polarized, the structured beam influencing component regionally having the functionality of a λ/4 plate. The structured beam influencing component then modifies the polarization so that circularly polarized light enters the light modulator itself. By a structured beam influencing component, for example, right-circularly polarized light may be generated regionally and left-circularly polarized light may be generated regionally.

In other words, the object according to the invention is furthermore achieved by a device for beam combination which comprises a structured retardation plate. The structured retardation plate has at least one additional polarizer on the SLM side, i.e. as seen from the structured retardation plate toward the SLM.

BRIEF DESCRIPTION OF THE DRAWINGS

There are now various possibilities for advantageously configuring and refining the teaching of the present invention. In this regard, on the one hand, reference is to be made to the dependent claims referring to the independent patent claims and on the other hand to the following explanation of the preferred exemplary embodiments of the invention with the aid of the drawing. In connection with the explanation of the preferred exemplary embodiments of the invention with the aid of the drawing, preferred configurations and refinements of the teaching will also in general be explained. In the drawing, respectively in a schematic representation, FIG. 5 shows in the upper diagram the resulting phase as a function of the phase difference between the two phase values, and in the lower diagram the amplitude and intensity as a function of the phase difference, FIG. 11 shows results of the intensity of a 2D image on the light modulator, which are achieved with the arrangement described in FIG. 10, FIG. 12 schematically shows at the bottom right an arrangement of two adjacent pixels of a light modulator, into which the phase values ϕ1 and ϕ2 are written, FIG. 13 shows on the left-hand side the graphically plotted amplitude and intensity as a function of Δϕ and the Michelson contrast is plotted on the right-hand side, FIG. 14 graphically illustrates the effect of a phase error on the intensity modulation of a 2D image, FIG. 15 illustrates the light propagation of the ordinary and extraordinary beams in a uniaxial birefringent medium with refractive indices n0 and ne, the birefringent medium being surrounded on both sides by an identical isotropic medium, the isotropic medium having the refractive index n, FIG. 17 illustrates further considerations, which now take into account the entire path difference in the uniaxial birefringent medium and in the surrounding isotropic medium, FIG. 20 shows the analysis of the effects of the angle-dependent changes of Δϕ in the form of a "black box" model, FIG. 22 shows a device for combining light beams according to the prior art, FIG. 23 shows possible solutions to the indicated problems, FIG. 24 shows generic design principles according to the present invention, FIG. 26 shows two devices comparable to FIG. 25 according to the invention for combining light beams, the light modulator being shown on the left side is based on ECB mode, the light modulator being shown on the left side is based on HAN mode, both light modulators are based on in-plane LC modulation, FIG. 27 shows a summary of results and an indication of a solution, FIG. 40 shows notes regarding set-ups (a), (b) and (c), FIGS. 41, 42 each show an arrangement with a structured polarizer.

DETAILED DESCRIPTION OF THE INVENTION

The use of the polarizer is particularly expedient in the case of using SLMs which themselves require polarized light, for example liquid-crystal (LC) based SLMs. It is not however restricted thereto, but may also be used advantageously with other types of SLM.

The use of the polarizer is particularly advantageous in the case of reflective SLMs with small pixels, for example LCoS (liquid crystal on silicon), but is not restricted to these.

The mode of operation of the polarizer and its equivalent to the aperture diaphragm will be described below.

FIG. 3 shows the arrangement or device according to the invention for beam combination with a polarizer Pol for a reflective SLM PIX.

Figure 3A:
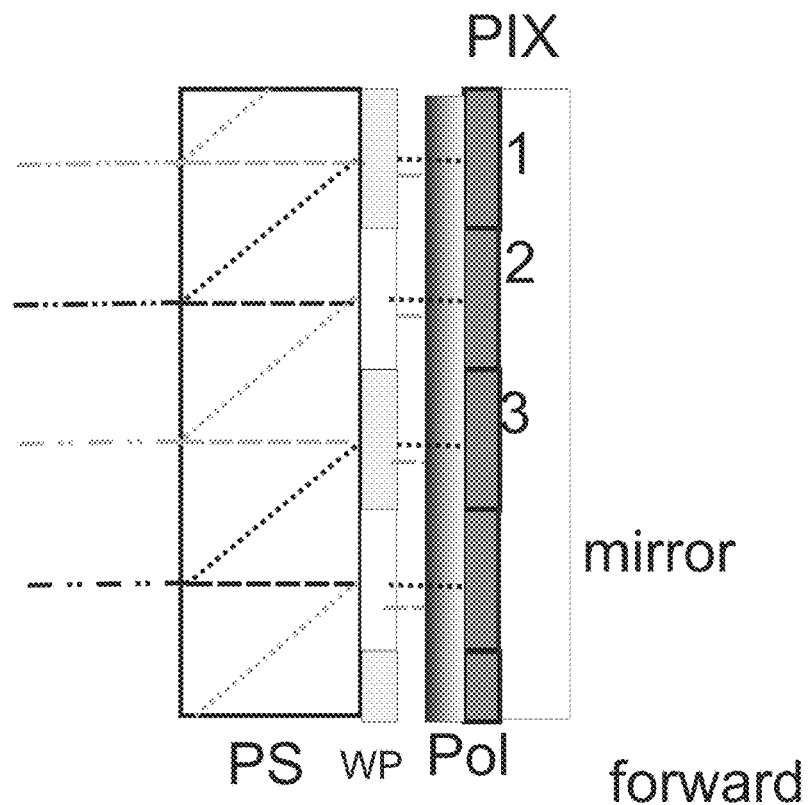
FIGS. 3a and 3b show a first exemplary embodiment according to the invention of a device for combining light beams which interact with adjacently arranged pixels of a light modulator in a reflective arrangement.

FIG. 3a shows the forward path of the light: the effect of the layer PS with polarization-selective light propagation is that light of both polarization directions initially arrives at the two pixels. Subsequently, the light passes through the structured retardation plate WP. On the forward path, one of the two polarization directions is filtered by a polarizer Pol.

Figure 1:
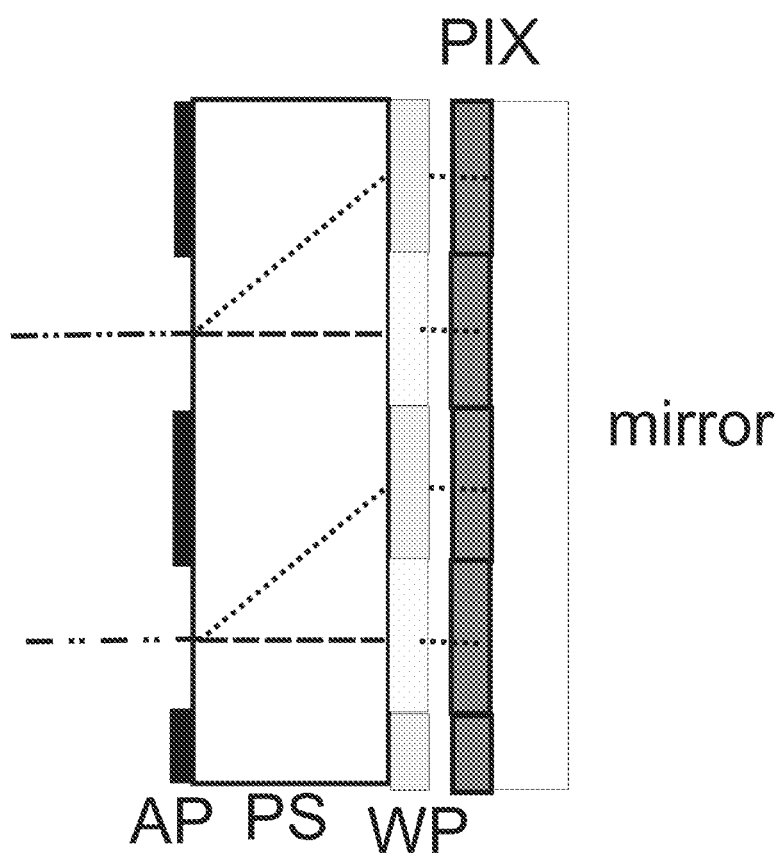
FIGS. 1 and 2 show arrangements of a beam combiner from the prior art.
Figure 2:
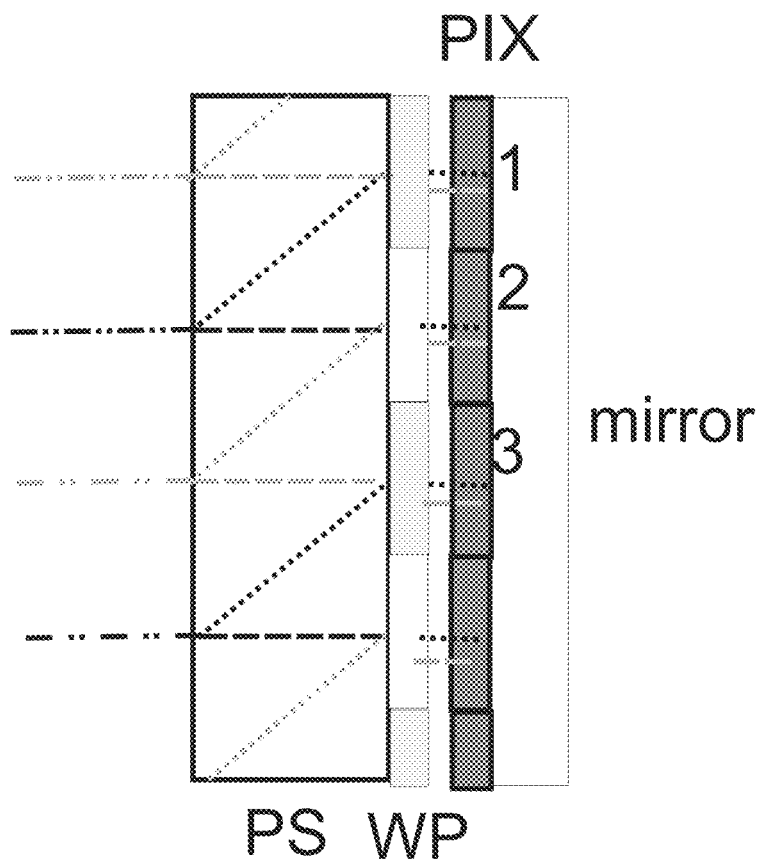

In the case of geometrical light propagation, this filtering would be equivalent in its effect to the effect of a structured aperture diaphragm as shown in FIG. 1 according to the prior art. This is because only the light coming from the positions inside the aperture is transmitted by the polarizer. For the realistic case in which the perturbing diffraction at the apertures is taken into account, however, the arrangement with a polarizer is preferable. This applies particularly for small pixels.

Figure 3B:
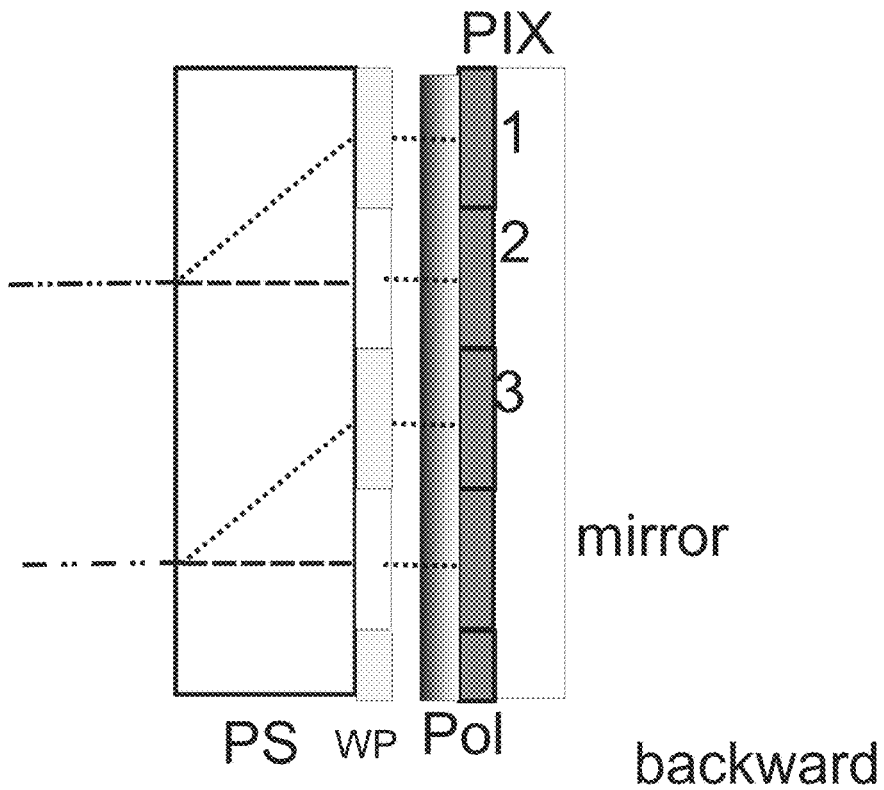

FIG. 3b shows the return path of the light after passing through the reflective SLM. Superposition takes place only of the desired pixel pairs, namely pixel 1 with pixel 2, but not pixel 2 with pixel 3. In the case of a reflective SLM, the polarizer may itself optionally be configured reflectively and arranged on the rear side of the SLM.

Figure 4:
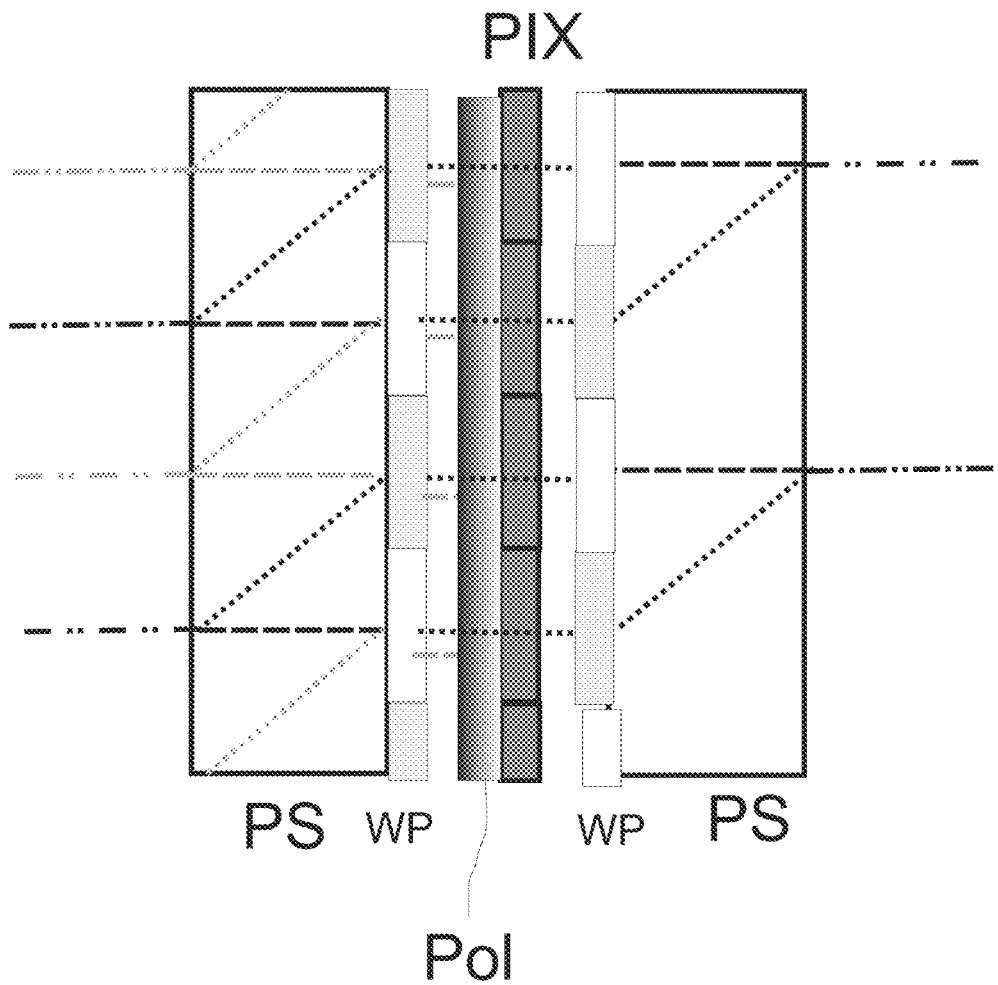
FIG. 4 shows a second exemplary embodiment according to the invention of a device for combining light beams which interact with adjacently arranged pixels of a light modulator in a transmissive arrangement.

FIG. 4 shows an exemplary embodiment of a tilting-tolerant transmissive SLM, which does not comprise an aperture diaphragm but instead is provided on the entry side of the SLM PIX with a polarizer Pol, which is arranged between two polarization-selective layers PS. Two retardation elements WP are further provided.

Other configurations are also possible, for example in which the SLM modulates the phase of circular light by additional retardation plates being inserted into the arrangement. The invention is thus not restricted to the configurations shown in FIGS. 3 and 4.

Another aspect will be described below in conjunction with devices for combining light beams which interact with adjacently arranged pixels of a light modulator, which may on the one hand be implemented in conjunction with the concept described above but, however, on the other hand may also be implemented separately therefrom. This further aspect relates to the sensitivity to changes of the angle of incidence of the light onto a device for combining light beams.

Figure 6:
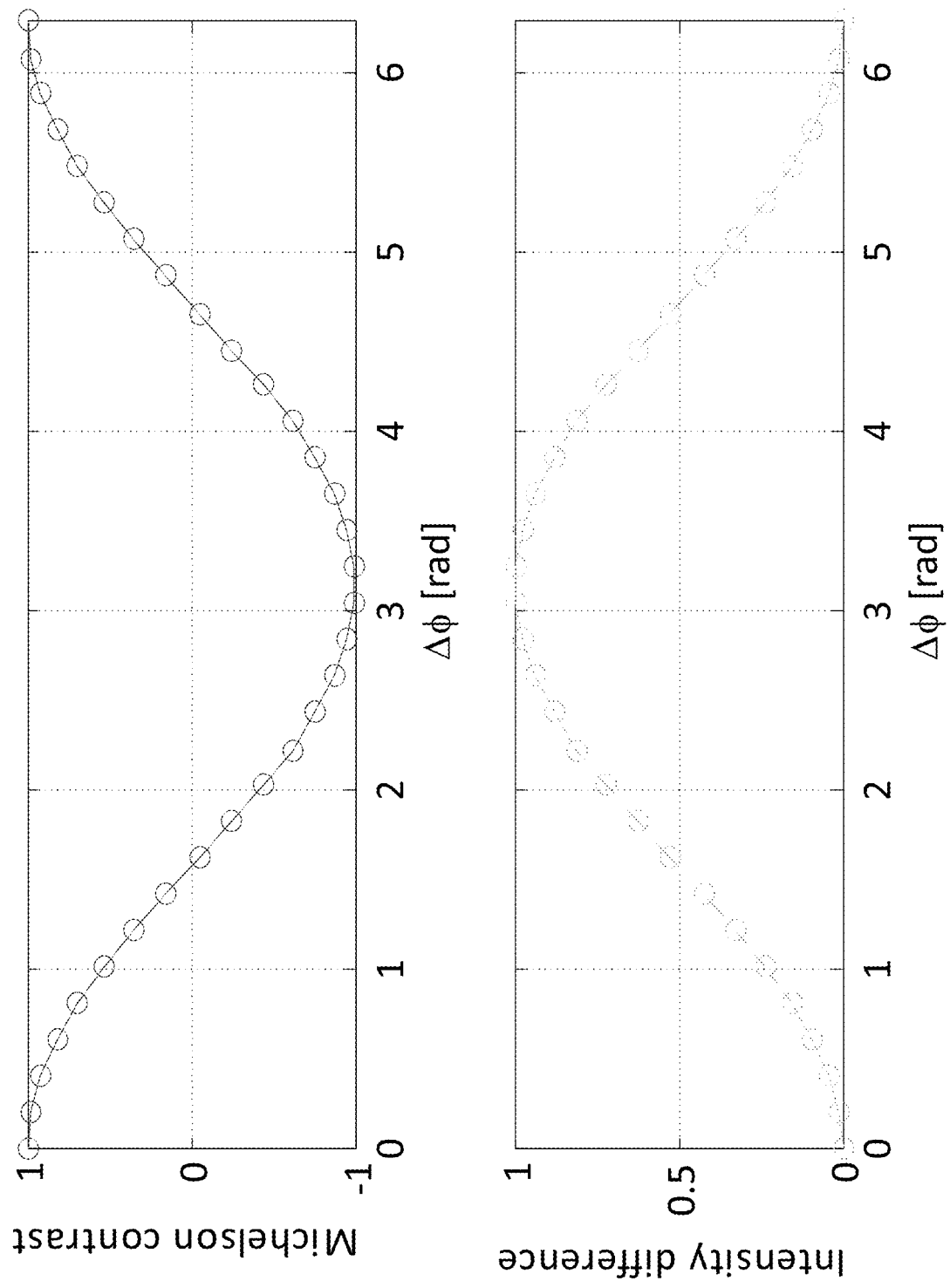
FIG. 6 shows in the upper diagram the Michelson contrast as a function of the phase difference, and in the lower diagram the intensity difference as a function of the phase difference.

An asymmetrical arrangement of the component parts for influencing the light for the superposition of two phase pixels would, however, lead to the superposition, based on two-beam interference, between two adjacent pixels being very sensitive to small changes of the light path through a light modulator sandwich. In this regard, the resulting intensity $I_R=A_R^2=(U_R \cdot U_R^*)$ is first of all considered, which in the case of coherent superposition of two waves $U_R=U_1+U_2$ is given as:

$$I_R=A_1^2+A_2^2+2A_1A_2 \cos \Delta\varnothing$$

where $A_1$ and $A_2$ are the amplitudes of the subwaves and $\Delta\phi$ is the relative phase difference of the two subwaves (subbeams). If the two amplitudes have the same value of $A_1=A_2=0.5$, it is clear that according to FIG. 5 the resulting intensity is dependent on the cosine of the relative phase difference $\Delta\phi$, with constructive interference (i.e. maximum intensity) for $\Delta\phi=0$ and with destructive interference (i.e. minimum intensity) for $\Delta\phi=\pi$. It is now assumed that the spatial light modulator sandwich (SLM) is calibrated in such a way that the two subphases $\varphi_1$, $\varphi_2$, which contribute to the relative phase difference $\Delta\phi=\varphi_2-\varphi_1$, correctly show the desired intensity values $0 \leq I_R \leq 1$ at the exit of the SLM. This state will be referred to below as the nominal state. If one of the two subbeams now experiences an additional phase shift of $\pi$, the effect of this is that the gray value image shown is inverted, i.e. a contrast inversion takes place. According to FIG. 6, the Michelson contrast between an originally bright and dark image pixel then becomes $C_M=-1$. In the calibrated nominal state, the Michelson contrast is equal to 1. Only small deviations from this ideal state are tolerable so that the contrast loss is not perceived as problematic. As a plausible but not rigidly defined limit, a minimum tolerable value of $C_M=0.924$ will be assumed for the following consideration, which already occurs with a relative phase error of $\pi/8=0.3927$ rad, see also FIGS. 13 and 14.

For holographic displays, however, it is very important to correctly represent both the amplitude and the phase, since otherwise the reconstruction quality is significantly degraded. Incorrectly represented hologram amplitude values lead in the reconstruction to inferiorly representable or no longer representable gray values. From FIGS. 6 and 13, it is clear in particular that gray values which correspond to intensities of around 0.5 react most sensitively to small changes of the phase difference, since in this range the partial derivative of the intensity with respect to the phase difference (phase 2–phase 1) is greatest.

Figure 7:
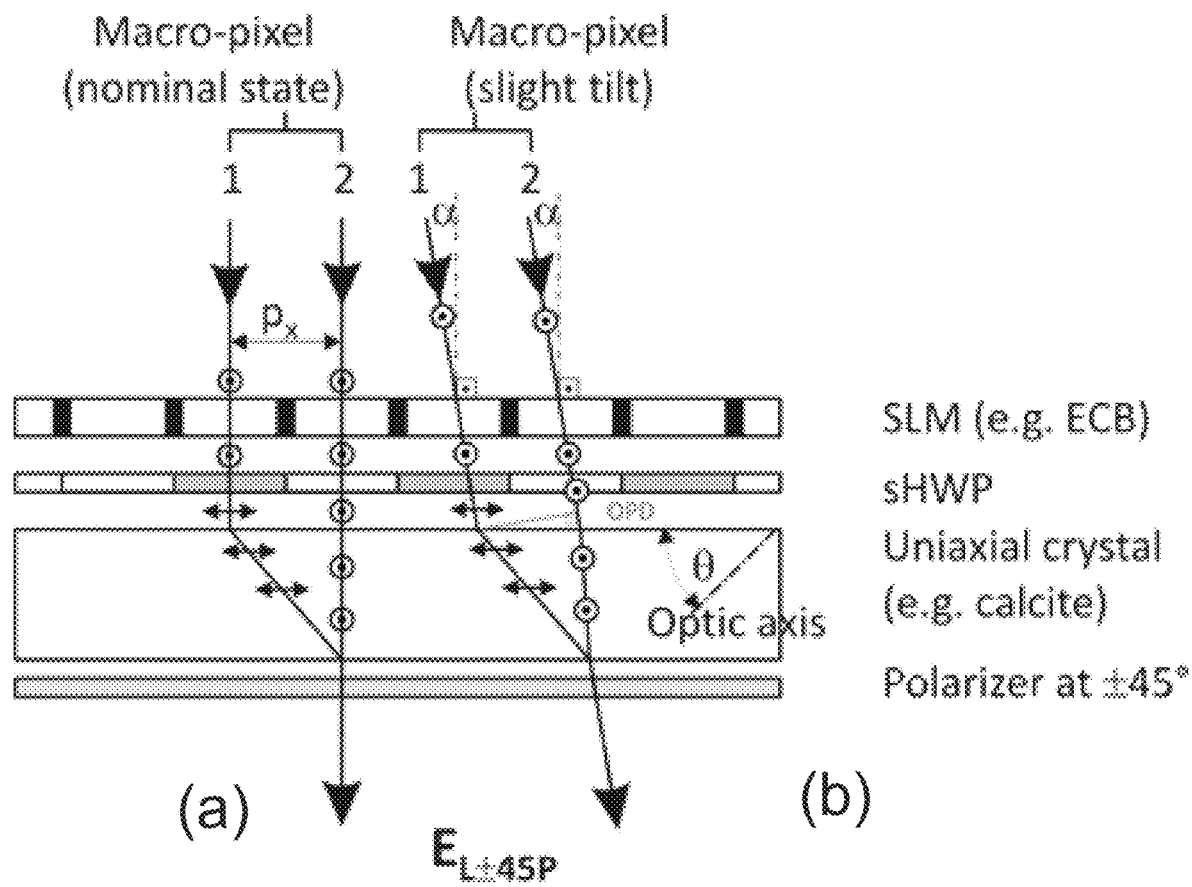
FIG. 7 shows a device for combining light beams according to the prior art, the light beams to be combined of adjacent pixels striking the light modulator essentially perpendicularly on the left-hand side in FIG. 7a, and the light beams to be combined of adjacent pixels striking the light modulator at an angle differing from the perpendicular to the surface on the right-hand side in FIG. 7b.

This will be explained below with reference to the example of WO 2010/149588 A1, in which a device for beam combination is disclosed. In this regard, FIG. 7 of the present application is considered. The polarization-sensitive element (uniaxial crystal) is in this case used for combining the two subbeams, modulated by the SLM, to form the composite beam. It is assumed that the relative phase difference, caused by different optical path lengths in the polarization-sensitive component part (uniaxial crystal), between the two subbeams for the nominal state is already calibrated, so that the two waves are "in-phase" without a relative phase shift. The phase values which need to be written into the respective phase subpixels to be superimposed, in order to represent the desired amplitude value of the macropixel, are therefore known.

The nominal state has, for example, been calibrated for normal incidence (FIG. 7(a)). Because of thermal expansion or mechanical stress of the display or of the illumination device of the display, the case may arise that a small relative tilt occurs between the incident wave and the SLM sandwich. The effect of this is that an additional optical path (optical path difference OPD) is traveled in one of the two subbeams to be combined, i.e. an additional phase $\Delta\phi=OPD*2\pi/\lambda$ is added. This additional phase is dependent on the angle of incidence $\alpha$ of the light, the distance or pitch of the pixels $p_x$ to be superimposed, and the optical path length:

$$\alpha = \sin^{-1}\left(\frac{OPD}{p_x}\right)$$

Figure 16:
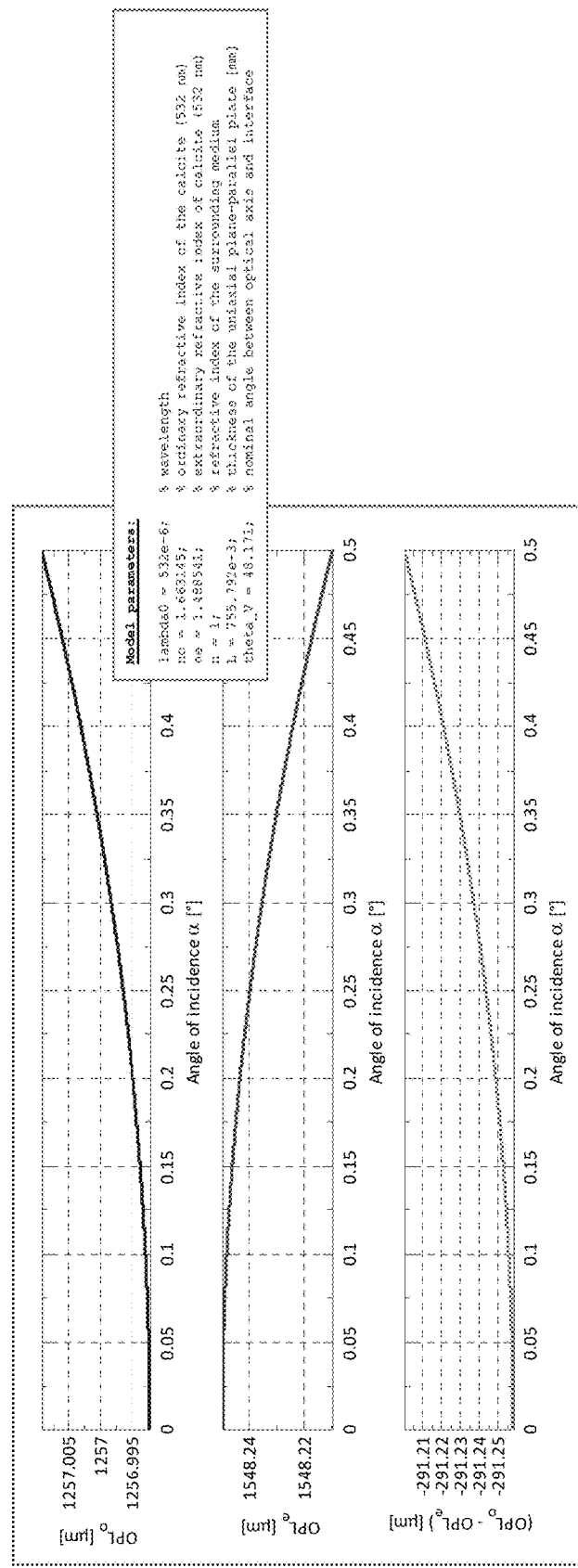
FIG. 16 shows graphically plotted the result of a calculation of how the optical path changes for the ordinary and extraordinary beams inside the birefringent medium when light strikes the birefringent material not perpendicularly but under a small angle α in the range of between 0 and 0.5 degree.

For understanding, it is important to realize that the change, critical for the application, of the optical path difference or of the optical path length is not introduced by the polarization-sensitive component part, see also FIG. 16, but only by geometrical tilting. The path in the surrounding medium is crucial in this regard, as shown in FIG. 7(b). By definition, all incident and emergent beams travel parallel to one another (property of a plane-parallel plate surrounded by the same medium) and all lie in a plane (property of a uniaxial crystal with an optical axis in the incidence plane). The polarization-sensitive component part may therefore be regarded as a "black box", see also FIG. 20, which is calibrated a single time so that the two subbeams are "in-phase". The calibrated nominal state could thus also readily be a state in which the incidence angle is not exactly zero. What is crucial is that in-phase superposition takes place only for this one state. All relative deviations from the nominal state lead to the described problem and therefore to the disadvantage of existing embodiments according to the prior art.

A numerical example to illustrate the problem will be given below. According to the criterion derived above, that for a Michelson contrast of at least $C_M=0.924$ a relative phase error of at most $\Delta\phi=\pi/8=0.3927$ rad is tolerable, the maximum tolerable deviations in the angle of incidence $\alpha$ of the light are given according to the formula above as $\alpha=\arcsin\{\lambda/(16p_x)\}$. At a wavelength of $\lambda=532$ nm, this results in tolerable changes in the angle of incidence of 0.038° for a pixel pitch of 50 μm, or 0.019° for a pixel pitch of 100 μm, see also FIG. 21. Compliance with these narrow tolerances in the mechanical and thermal stress of the display system would be technically achievable with great difficulty or scarcely at all. A pixel pitch is intended in particular to mean an average pixel size or an average pixel spacing, specifically in particular in the direction in which two pixels are combined to form a macropixel, i.e. for example the horizontal pixel pitch/pixel spacing when two horizontally adjacent pixels are combined to form a macropixel.

Furthermore, WO 2010/149583 A1 also describes a combination of a reflective light modulator (SLM) with a beam combiner and a front light. In this case, an arrangement is shown in which light travels two times through the beam combiner, from the front light through the beam combiner to the SLM and, after reflection on the rear side of the SLM, back again through the beam combiner. In this case, a structured aperture already leads to separation of the polarization of the incident light into two components on the forward path, one component being directed to the first pixel of a pixel pair and the second component to the second pixel of the pixel pair. After modulation by the two SLM pixels, on the return path these components are superimposed again at the exit of the beam combiner. This arrangement is also susceptible to geometrical tilting of the light beams in relation to the nominal state.

It is therefore an object of the invention to provide a device for beam combination and a spatial light modulation device for complex-valued modulation of light, which react almost insensitively to changes of the incidence angle of the light or deviations from the nominal state.

According to the invention, the object is achieved in that the entire beam path in the light modulator sandwich (SLM) is produced symmetrically in such a way that any tilts act uniformly on both subbeams to be superimposed and thereby mutually compensate one another, see also FIG. 24. To this end, the (essentially phase-modulating) SLM is embedded between polarization-sensitive component parts and the optical media, through which the two subbeams pass spatially separately, are configured or arranged symmetrically in the light propagation direction, so that the sum of the optical path lengths of the two subbeams $OPL_1$ and $OPL_2$ is respectively constant for different angles of incidence.

The device according to the invention for combining light beams, which interact with adjacently arranged pixels of a light modulator, comprises a light modulator having a multiplicity of pixels, a beam splitting component, preferably configured uniaxially birefringently, a beam combining component, which is preferably configured uniaxially birefringently, and a beam superposition component. The beam splitting component is configured and arranged in such a way that incident light beams are thereby split into a first subbeam and a second subbeam by the beam splitting component, in such a way that the first subbeam propagates toward a first pixel of the light modulator and the second subbeam propagates toward a second pixel of the light modulator, preferably in each case with essentially the same intensity, the beam combining component being configured and arranged in such a way that the first subbeam and the second subbeam can thereby be combined after interaction with the respective pixels of the light modulator. The beam splitting component and the beam combining component are configured and arranged in such a way that the optical beam path of the first subbeam (for example in relation to the polarization property) and the optical beam path of the second subbeam (for example in relation to the polarization property) are essentially configured point-symmetrically with respect to the midpoint between the first pixel and the second pixel.

This solution will be described in more detail with the aid of an exemplary embodiment which uses a birefringent material as a polarization-sensitive component part. The described basic principles of the solution, i.e. the symmetrization of the separately extending optical path, may however likewise be applied for other types of polarization-sensitive optical component parts such as volume gratings (volume Bragg gratings) or polarization gratings. However, depending on the type of polarization-sensitive component part and depending on the required entry polarization of the (in particular phase-modulating) SLM, it may be necessary for other (structured or unstructured) retarders (for example a λ/4 plate (quarter-wave plate (QWP) for polarization gratings)) to be used, or for the sequence of the individual layers to be adapted.

FIG. 8 shows an exemplary embodiment of a spatial light modulation device in conjunction with a beam combination device, the beam combination device comprising at least one birefringent medium (uniaxial crystal) as a polarization-sensitive component part for combining two phase-modulating subpixels of the light modulator SLM. A pair of two phase-modulating subpixels in each case forms a macropixel. For the sake of clarity, only a section of the spatial light modulation device (which are to be continued toward the left and toward the right in FIG. 8) and the subbeams of only two adjacent pixels, which are intended to be superimposed according to the principle of two-beam interference, are shown.

Figure 25:
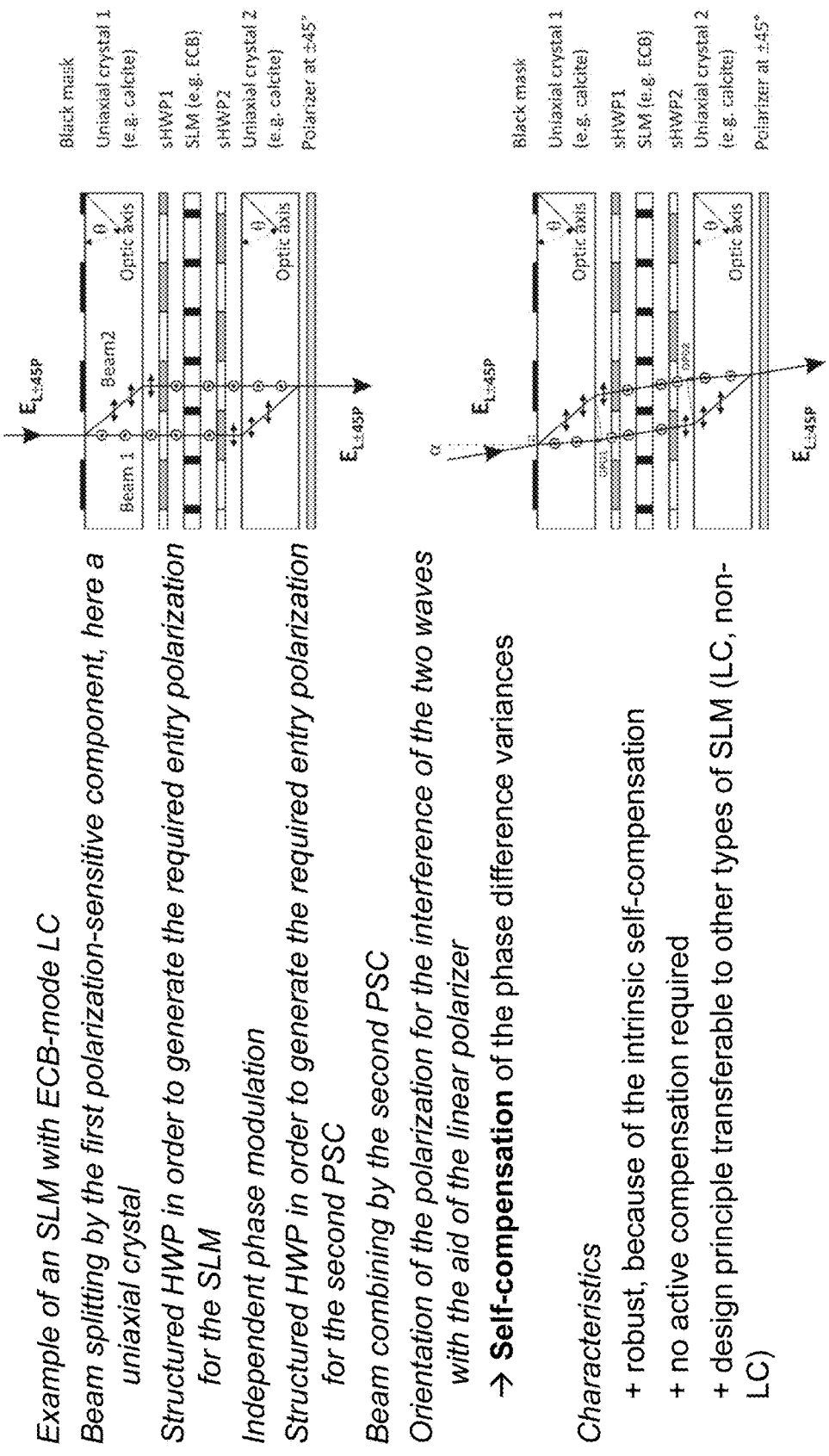
FIG. 25 shows a device according to the invention for combining light beams, the light beams to be combined of adjacent pixels striking the light modulator essentially perpendicularly in the upper part of FIG. 25, and the light beams to be combined of adjacent pixels striking the light modulator at an angle differing from the perpendicular to the surface in the lower part of FIG. 25.

The in particular phase-modulating light modulator SLM (here operated in ECB (electrically controlled birefringence) mode) is embedded between two structured half-wave plates (sHWP1 and sHWP2) and two uniaxial plane-parallel crystal plates having an identically oriented optical axis, see also FIG. 25. First, beam splitting is carried out by a first uniaxial crystal (uniaxial crystal 1) into two mutually orthogonally polarized subbeams, which are then modulated independently of one another (preferably in their phase) by the SLM and subsequently recombined by a second uniaxial crystal (uniaxial crystal 2). The two subbeams are then made to interfere by a linear polarizer arranged at about 45° being arranged at the exit of the arrangement. In this case, the display sandwich, or the arrangement of uniaxial crystals 1 and 2, SLM and half-wave plates, is constructed entirely symmetrically in the region of the separate optical paths of the two subbeams. Only the aperture diaphragm (black mask) and the linear polarizer at the exit of the arrangement are not point-mirror-symmetrical with respect to the center of the SLM. The optical axes of the birefringent uniaxial media, or crystals, are orientated in such a way that the angle θ with respect to the interface produces a constant walk-off angle (angle between the ordinary and extraordinary beams) for the two uniaxial media.

Figure 8A:
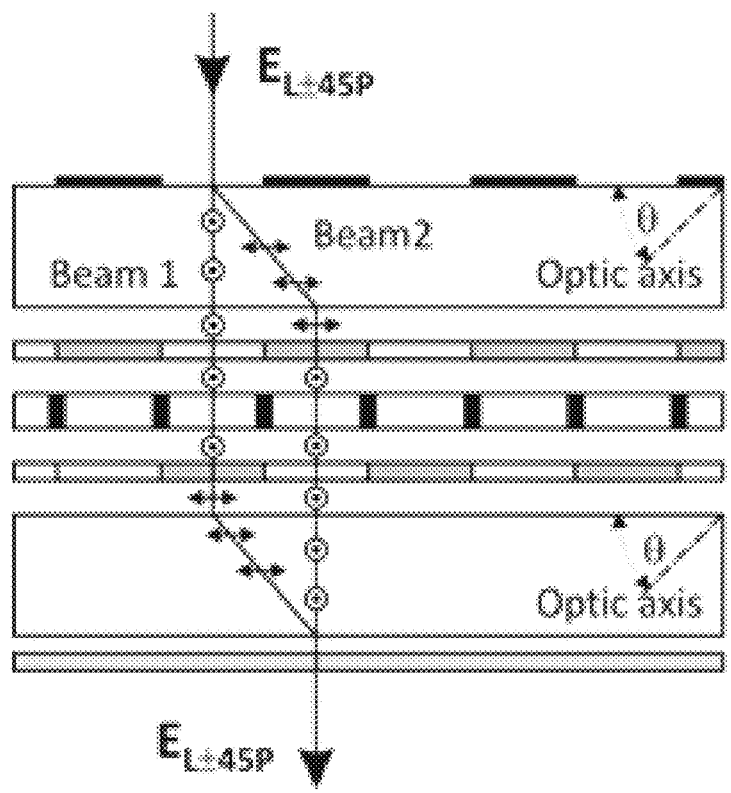
FIGS. 8a, 8b shows a device according to the invention for combining light beams, the light beams to be combined of adjacent pixels striking the light modulator essentially perpendicularly in the upper FIG. 8a, and the light beams to be combined of adjacent pixels striking the light modulator at an angle differing from the perpendicular to the surface in the lower FIG. 8b.

FIG. 8a shows the display sandwich in the calibrated nominal state. Incident light is linearly polarized at 45° and strikes the first plane-parallel uniaxial crystal plate (uniaxial crystal 1). Applied onto the crystal plate, there is an absorber mask or aperture diaphragm which covers every second pixel of the SLM and thus prevents crosstalk. At the crystal plate, the 45°-polarized light is split, the vertically polarized light, which is denoted by the circle with a dot, as an ordinary beam being refracted according to Snell's law of refraction and the ordinary refractive index of the uniaxial crystal. In the example shown here of normal incidence onto the interface with the uniaxial crystal, this means that the ordinary beam also passes perpendicularly through the uniaxial crystal. The horizontally polarized light, which is denoted by the double arrow, propagates as an extraordinary beam. The direction of the extraordinary beam is in this case given by the extraordinary refractive index of the uniaxial crystal and the orientation of the crystal axis. When emerging from the first plane-parallel crystal plate, the two beams again travel parallel to the entry beam, but with a mutually perpendicular polarization (s-pol and p-pol). Since the preferably phase-modulating SLM requires a vertical entry polarization, the subbeams with a horizontal polarization are rotated by 90° in their polarization with a structured half-wave plate (sHWP1), while the subbeams with a vertical polarization are not modified by the structured half-wave plate. The structured half-wave plate thus represents the structured beam influencing component, which comprises spatial structuring and regionally modifies no optical property of a subbeam. The SLM is traveled through uniformly with vertical polarization, while a different or predeterminable (desired) phase lag may be imparted to the two subbeams, which corresponds to the value which is intended to be represented with the respective macropixel, see also FIG. 12. Subsequently, the ordinary beam of the first crystal plate is rotated by 90° into horizontal polarization by a further structured half-wave plate (sHWP2) so that it propagates as an extraordinary beam in a subsequent second crystal plate (uniaxial crystal 2). The extraordinary beam of the first crystal plate (uniaxial crystal 1) has already been rotated in its polarization by the first half-wave plate (sHWP1) and passes through the second half-wave plate (sHWP2) without modification in the polarization direction. This beam therefore propagates as an ordinary beam in the second crystal plate (uniaxial crystal 2). The two subbeams are recombined at the exit of the second crystal plate and again travel parallel to the entry beam. They are made to interfere by the downstream 45° linear polarizer. The amplitude of a macropixel is adjusted by means of two-beam interference of two phase-modulating subpixels. The phase value of a macropixel is produced by the relative phase difference between the individual macropixels of the SLM. This principle is known as "double phase hologram representation", see also FIG. 12.

Figure 8B:
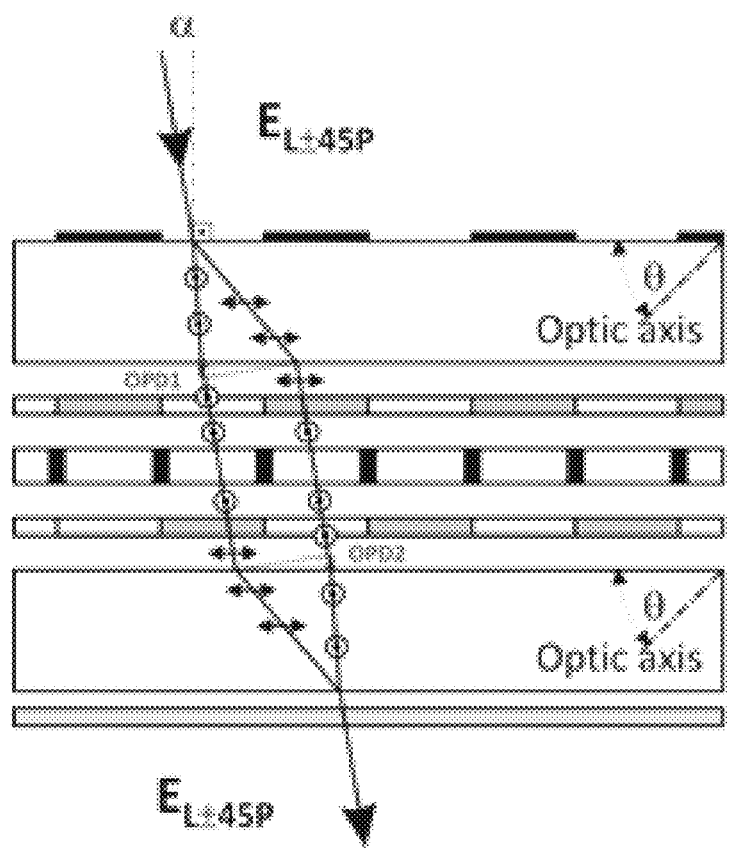

The mode of operation of the solution according to the invention will now be illustrated with the aid of FIG. 8b, in which the entry beam is inclined by an angle $\alpha$ and therefore strikes the SLM differently to the calibrated nominal state. The subbeams propagate as ordinary and extraordinary beams through the first crystal plate and emerge from the crystal plate again parallel to the incident beam. The direction of the ordinary beam is given according to Snell's law of refraction and the ordinary refractive index of the uniaxial crystal, and the direction of the extraordinary beam is given by the extraordinary refractive index of the uniaxial crystal and the orientation of the crystal axis. Because of the geometrical tilt, in subbeam 1 there is now an additional relative phase lag $\Delta\varphi_1 = k \cdot OPD_1$ at the exit of the first crystal plate ($k=|k|=2\pi/\lambda$—wave number; OPD—optical path difference (or optical path length difference)), the optical path difference being given by $OPD = \delta \cdot \sin(\alpha)$ ($\delta$—distance between the two subbeams). An opposite situation occurs at the entry into the further crystal plate 2. Here, subbeam 2 experiences an additional relative phase lag of $\Delta\varphi_2 = k \cdot OPD_2$. With a symmetrical configuration of all the component parts in the separately extending beam path, the two optical path differences $OPD_1$ and $OPD_2$ advantageously cancel one another out, so that $\Delta\varphi_2 - \Delta\varphi_1 = 0$.

In order to illustrate the problem, FIG. 8 has been shown as if there was an air layer between the individual component parts and all the component parts were used without substrate glasses. In the case of a complex-valued modulator according to the proposed solution, however, all the component parts may also be applied onto one another, for example adhesively bonded together and applied onto substrate glasses, without an air layer. The proposed principle of the matched beam paths $OPD_1 = OPD_2$ is, however, also effective in this case when a symmetrical beam path is provided. In this case, care should be taken to use the same bonding materials, for example adhesives, or the same glass materials as substrate. In general terms, the surrounding optical media should be configured symmetrically in such a way that the sum of the optical path lengths of the two subbeams $OPL_1$ and $OPL_2$ is respectively constant for different angles of incidence.

Figure 9:
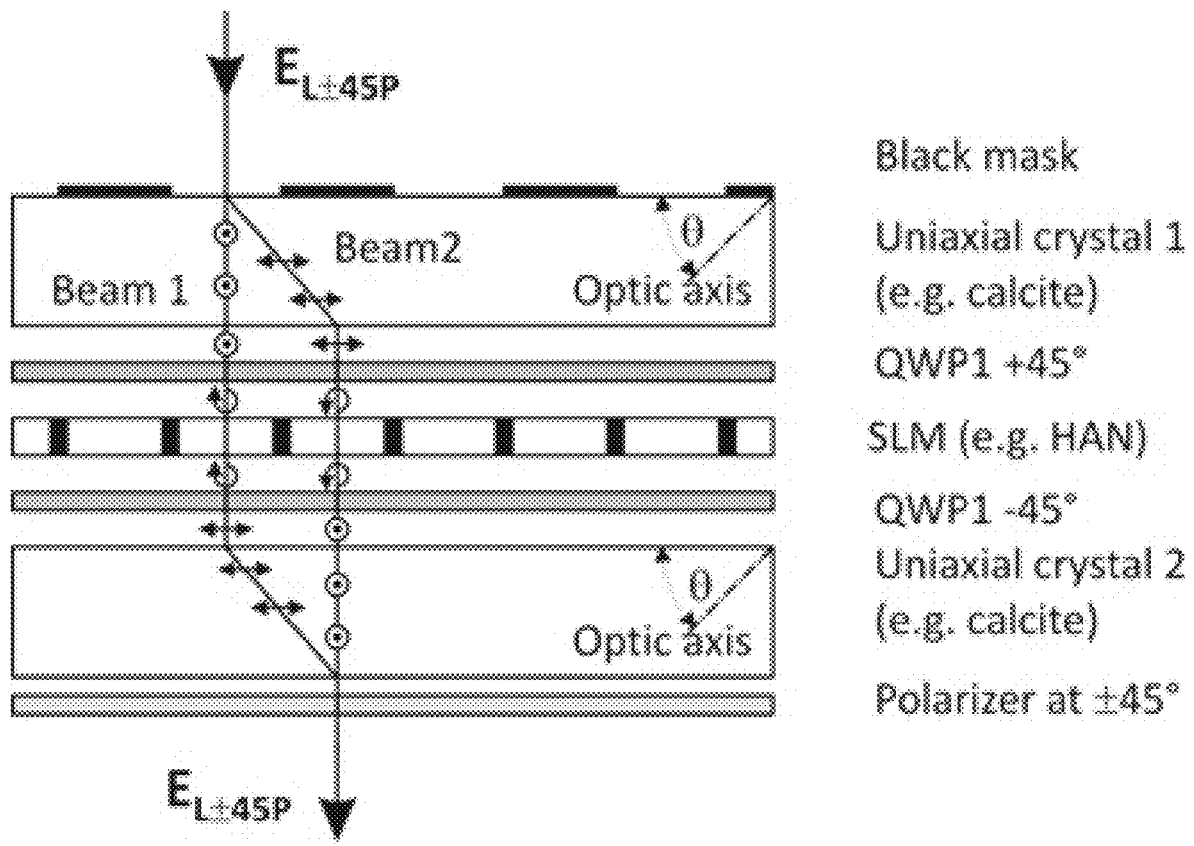
FIG. 9 shows a device comparable to FIG. 8 according to the invention for combining light beams, the light modulator shown in FIG. 9 being based on in-plane LC modulation, FIG. 10 schematically shows an arrangement having a beam combiner according to the prior art, at the top right in a side view and at the bottom in a three-dimensional view.

Further advantageous embodiments, or features:
The proposed solution may likewise be used for an SLM which is based on in-plane LC modulation, see also FIG. 9 or 26. One example for an LC mode with in-plane modulation is the HAN-LC mode (hybrid aligned nematic liquid crystal mode). Other examples are CIPR (continuous in-plane rotation). Smectic LC modes, in which an in-plane rotation of the LC molecules in an electric field dominates over an out-of-plane rotation, may also be regarded as an in-plane mode. Cholesteric LC modes (ULH uniform lying helix) may also be regarded as an in-plane mode. In the context used here, in-plane relates to the rotation direction of the optical axis of the liquid crystals in the electric field, in which case the field itself, for example in the case of an ULH, may also be applied perpendicularly to the LC layer. For in-plane modulation, however, the sequence of the optical component parts between the polarization-selective splitting (PSC1—uniaxial crystal 1) and combination (PSC2—uniaxial crystal 2) should be selected in the following way, since the in-plane mode requires circular entry polarization: unstructured quarter-wave plate arranged at 45° (QWP1); SLM (in-plane LC mode); unstructured quarter-wave plate arranged at −45° (QWP2). In this configuration, care should be taken that the phase shift in the aforementioned in-plane LC modes (HAN, CIPR, smectic, ULH) is opposite in sign for right- and left-circularly polarized light. This, however, may be taken into account in the calculation or representation of the hologram values, and has no effects on the driving of the SLM per se. It is advantageous that the quarter-wave plates (QWPs) used are unstructured.

The maximum angle between the ordinary beam and the extraordinary beam (walk-off angle) of a uniaxial optical medium is determined by the position of the optical axis of the medium, the direction of the k vector of the ordinary beam and the refractive indices $n_o$, $n_e$. For calcite as an optical medium, for example, in the case of normal light incidence and when using the indices for the wavelength of 532 nm, this gives a value of $\theta = 48.2°$. For reasons of further symmetrization (production, use), it may in this case be advantageous to place the optical axis at about 45°, which may be achieved by processes of grinding and polishing the crystal plate. Even though a somewhat thicker plate is therefore required in order to ensure the same beam offset, the risk of incorrect orientation during installation or production is minimized.

The polarization separation and combination may also be carried out with other polarization-sensitive optical component parts. Advantageous examples are for example volume gratings or polarization gratings, which besides the polarization selectivity are distinguished by a high diffraction efficiency (ideally 100%). It should be noted in this case that for each wavelength two gratings must in each case be provided per splitting element (crystal plate 1) and combiner element (crystal plate 2).

Another advantage comes from the fact that two adjacent parts of a wavefront are not brought into two-beam interference as in the case of the conventional simple configuration, but rather the same part of the wavefront is initially split, then modulated and finally recombined. Small lateral wavefront errors of the entry wavefront therefore do not contribute to amplitude errors in the exit wavefront, as is the case in the conventional simple embodiment. Apart from modulation by means of an SLM, which takes place independently in the two subwaves, the conventional simple method operates according to the lateral shear interference principle (superposition of a wavefront with the same wavefront laterally displaced), while the proposed method operates according to the Mach-Zehnder interference principle (splitting and recombination of a wavefront), the two branches of which are matched (i.e. equal optical path lengths in both subbranches).

Annex I

A description of the representations or figures of the annex will be given below, their numbering being denoted by a prefixed V.

Figure 10:
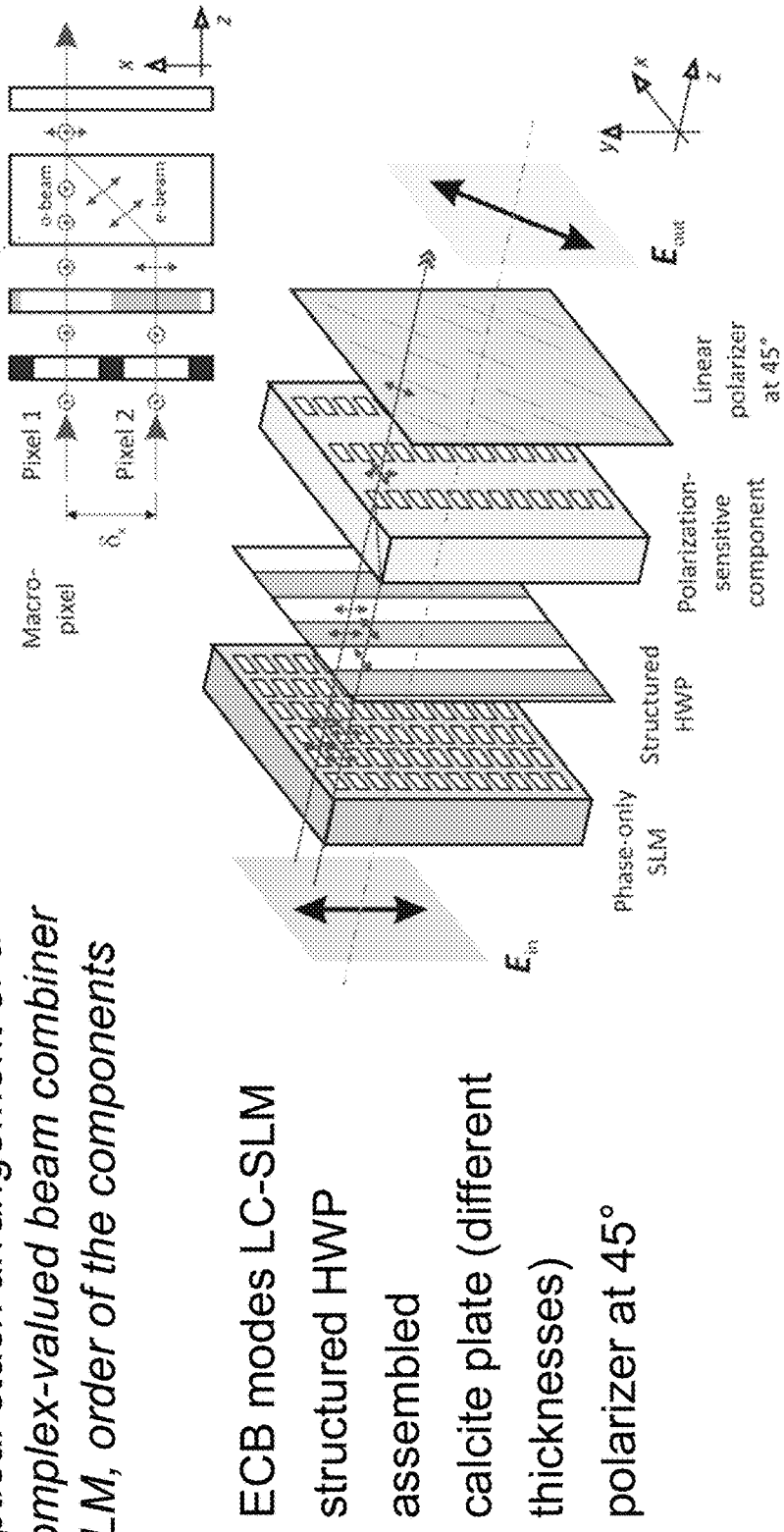

FIG. 10 schematically shows an arrangement having a beam combiner according to the prior art, at the top right in a side view and at the bottom in a three-dimensional view.

Light beams of the same linear polarization pass through two pixels of a phase-modulating light modulator (phase-only SLM), then a structured half-wave plate, which changes the polarization of the light which comes from one of the two pixels and leaves the polarization of the light which comes from the second pixel unmodified. A polarization-selective component part, for example a birefringent layer, is passed through straight, or undeviated, by light which comes from pixel 1, light which comes from pixel 2 passing through the polarization-selective component part at an angle. At the exit of the polarization-selective component part, the light of both pixels emerges at the same position and mutually parallel, and is therefore combined.

A linear polarizer arranged at plus or minus 45 degrees relative to the two polarization directions of the two pixels (for example 45 degree polarizer and 0 and 90-degree polarization direction of the light of the pixels) transmits light, the transmitted intensity depending on the relative phase of the two pixels, which can be adjusted by the phase modulation at the SLM. If the light of both pixels arriving at the polarizer has the same phase, maximum transmission takes place. If the light has a phase shifted by $\pi$, minimum transmission takes place.

Together with the average phase modulation of the two pixels, the arrangement may be used for complex-valued modulation of light. A light modulator with many pixel pairs respectively generates an amplitude and a phase value for each pixel pair.

This may be used for encoding holographic 3D scenes. For explanation, however, examples of the representation of 2D images on the light modulator will also be described below.

FIG. 11 shows results of the intensity of a 2D image on the light modulator, which are achieved with the one arrangement described in FIG. 10. The intensity of each image point of the image represented is adjusted by means of the difference of the modulated phases of two pixels of the light modulator, and the light of the two pixels is combined at the exit of the beam combiner, as described in FIG. 10. The intensity image visible through the polarizer has in this case a noisy gray value profile with moderate contrast.

Further experimental investigations show that the arrangement according to the prior art in accordance with FIG. 10 also reacts sensitively to mechanical stresses. For examples as a result of mechanical twisting of a frame in which the beam combiner arrangement of FIG. 10 is located, a further loss of contrast or even an inversion of the 2D scene represented may occur.

FIG. 12 schematically shows at the bottom right an arrangement of 2 adjacent pixels of a light modulator, into which the phase values $\phi1$ and $\phi2$ are written. The amplitude of the macropixel, i.e. of the light of the two pixels which is combined in this case after the beam combiner, is given as $$A(x, y) = \cos\left(\frac{\phi_1 - \phi_2}{2}\right)$$

The intensity which the polarizer transmits would be proportional to the square of this amplitude $$I \sim \cos^2\left(\frac{\phi_1 - \phi_2}{2}\right)$$

The modulation of the amplitude and intensity as a function of the phase difference of the two pixels corresponds essentially to two-beam interference.

The modulated intensity I therefore also deviates from the desired value when the phase difference of the two pixels has an error $\Delta\phi$.

The known equation for two-beam interference is obtained $$I = A_1^2 + A_2^2 + 2A_1A_2 \cos \Delta\phi$$

with $A_1 = A_2 = 0.5$.

FIG. 13 shows on the left-hand side the graphically plotted amplitude and intensity as a function of $\Delta\phi$.

The Michelson contrast is plotted on the right-hand side $$G_M = \frac{I_{max} - I_{min}}{I_{max} + I_{min}}$$

If the desired phase values can be adjusted, then $I_{max}=1$ and $I_{min}=0$. If there is an error of the phase modulation, however, $I_{max}$ is reduced and $I_{min}$ is increased, so that the contrast decreases.

Figure 14:
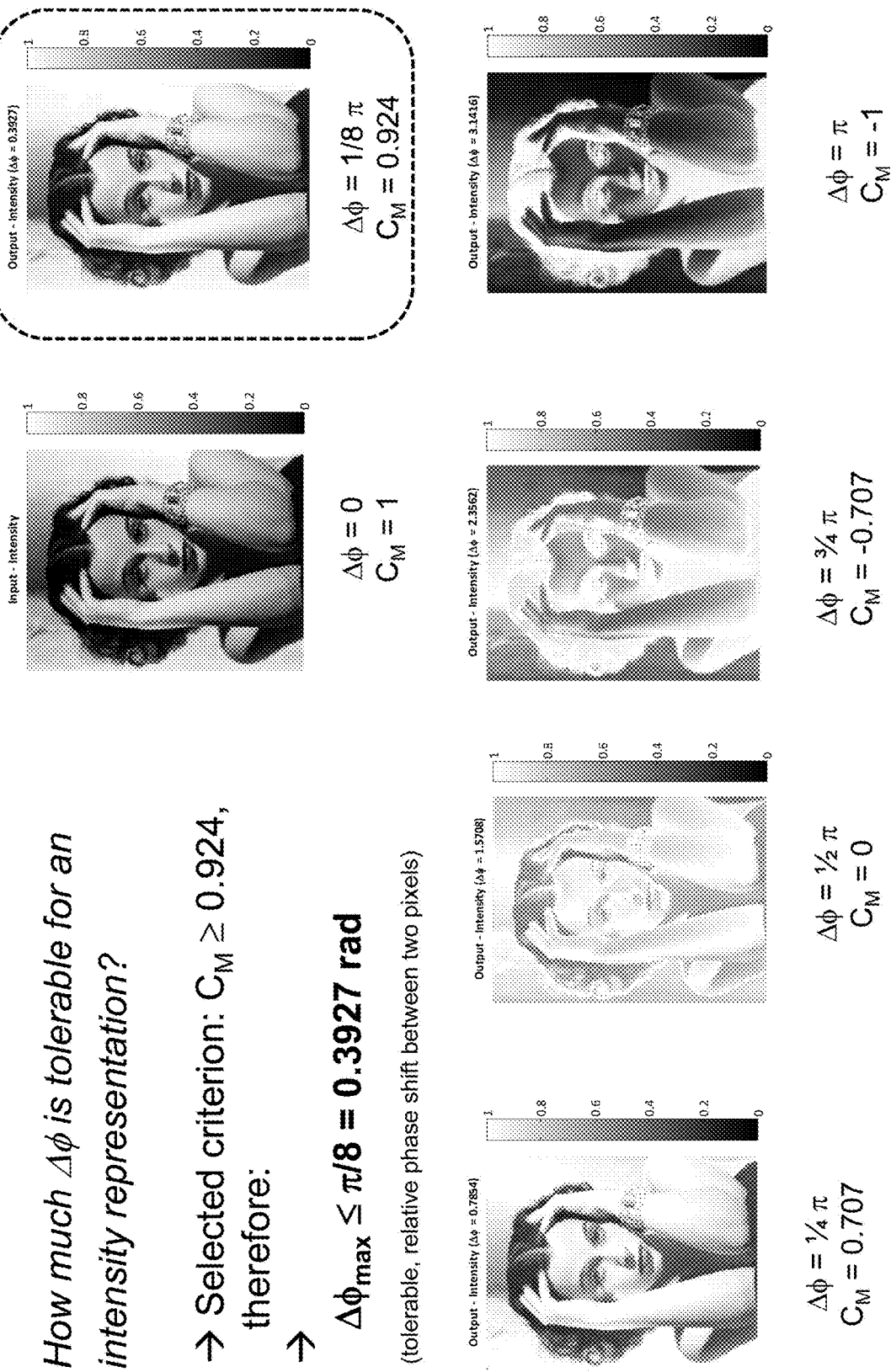

FIG. 14 graphically illustrates the effect of a phase error on the intensity modulation of a 2D image.

Shown at the top left is the representation of the image without an error, in which pixel pairs for an image point respectively modulate the desired phase $\phi_1$ and $\phi_2$.

Subsequently, an increasing error $\Delta\phi$ is added to the phase difference $\phi_1-\phi_2$ and the effect on the intensity image is represented.

An error $\Delta\phi=\pi/8$ leads to a reduction of the Michelson contrast $C_M$ from 1 to 0.924.

An increasing error of $\Delta\phi$ leads initially to a decreasing contrast, then, with an error increasing further, to inversion of the image represented.

On the basis of these relationships, it has been established that the maximum tolerable phase error is $\Delta\phi<=\pi/8$. With this error, the image represented already also has visible changes. These, however, are subjectively assessed as still tolerable. As mentioned, this establishment of the tolerable phase error represents a subjective criterion. It would also be possible to establish other limits for the tolerable error.

FIG. 15 illustrates the light propagation of the ordinary and extraordinary beams in a uniaxial birefringent medium with refractive indices n0 and ne, the birefringent medium being surrounded on both sides by an identical isotropic medium, and this isotropic medium having the refractive index n.

In particular, light refraction between the isotropic medium and the uniaxial birefringent medium is also taken into account when the incident light beam strikes the interface with the birefringent medium obliquely.

The beams emerging from the birefringent medium (ordinary and extraordinary beam) travel parallel to one another but offset.

Equations are given for the optical path $OPL_O$ of the ordinary beam, and the optical path $OPL_e$ of the extraordinary beam between the point O (entry into the birefringent medium) and the points P' and respectively P''' (exit of the two beams from the birefringent medium):

$$OPL_o = L \frac{n_o^2}{\sqrt{n_o^2 - n^2 \sin^2 \alpha}} \text{ and}$$

$$OPL_e = \frac{n_o^2}{[n_e^2(n_e^2 \sin^2\theta + n_o^2 \cos^2\theta) - [n_e^2 - (n_e^2 - n_o^2)\cos^2\theta \sin^2\delta] n^2 \sin^2\alpha]^{\frac{1}{2}}}$$

These equations are taken from the article Veiras et al., Appl. Opt. 2010, pages 2769-2777.

Here, a is the entry angle of the incident beam relative to the normal, with which it strikes the birefringent medium in the isotropic medium. L is the thickness of the birefringent medium. Θ is the angle which the optical axis of the birefringent medium has relative to its surface. δ is the angle between the incidence plane and the projection of the optical axis onto the interface.

FIG. 16 shows graphically plotted the result of a calculation of how the optical path changes for the ordinary and extraordinary beams inside the birefringent medium when light strikes the birefringent material not perpendicularly but under a small angle α in the range of between 0 and 0.5 degree.

This calculation is carried out for a calcite plate such as is used as a beam combiner.

The surrounding medium is in this case air with n=1. The calcite plate has $n_O$=1.663145 and $n_e$=1.488541. The thickness of the calcite plate is about 756 micrometers. The angle between the optical axis and the interface is about 48.2°. The calculation is carried out for a wavelength of the light of 532 nm.

As the calculation shows, the optical path length $OPL_O$ of the ordinary beam increases with increasing α, and the optical path length $OPL_e$ of the extraordinary beam decreases with increasing α.

If the angle α changes from 0 to 0.5 degree, this leads to a change of the optical path difference OPD=$OPL_O$−$OPL_e$ of the ordinary and extraordinary beams of 48 nm. Relative to 532 nm, this is about 0.09λ. This corresponds to a phase difference of 0.18 π.

The change of the optical path inside the birefringent layer when there is an angle change by 0.5 degree would already have effects on the intensity image represented, since it is already greater than π/8, although on the other hand it is still relatively small, i.e. it does not explain the experimentally found strong sensitivity of the arrangement to small alignment changes.

FIG. 17 illustrates further considerations, which now take into account the entire path difference in the uniaxial birefringent medium and in the surrounding isotropic medium.

In comparison with FIG. 15, not the optical path between O and P' and respectively P''', but the optical path between O and Q' and respectively Q'' is thus calculated.

A formula is given for the entire phase difference between the ordinary and extraordinary beams as a function of the angle of incidence α:

$$\Delta\phi = \frac{2\pi L}{\lambda_0} \Bigg( (n_o^2 - n^2 \sin^2\alpha)^{\frac{1}{2}} + \frac{n(n_o^2 - n_e^2)\sin\theta\cos\theta\cos\delta\sin\alpha}{n_e^2 \sin^2\theta + n_o^2 \cos^2\theta} +$$

$$-n_o \left\{ \frac{n_e^2(n_e^2 \sin^2\theta + n_o^2 \cos^2\theta) -}{[n_e^2 - (n_e^2 - n_o^2)\cos^2\theta \sin^2\delta] n^2 \sin^2\alpha} \right\}^{\frac{1}{2}} \Bigg) \frac{1}{n_e^2 \sin^2\theta + n_o^2 \cos^2\theta}$$

In this case, α is again the entry angle of the incident beam relative to the normal, with which it strikes the birefringent medium in the isotropic medium. L is the thickness of the birefringent medium. Θ is the angle which the optical axis of the birefringent medium has relative to its surface. δ is the angle between the incidence plane and the projection of the optical axis onto the interface. Furthermore, $n_0$ and $n_e$ are again the refractive indices of the birefringent material and n is the refractive index of the surrounding isotropic material. $\lambda_v$ is the wavelength of the light.

Figure 18:
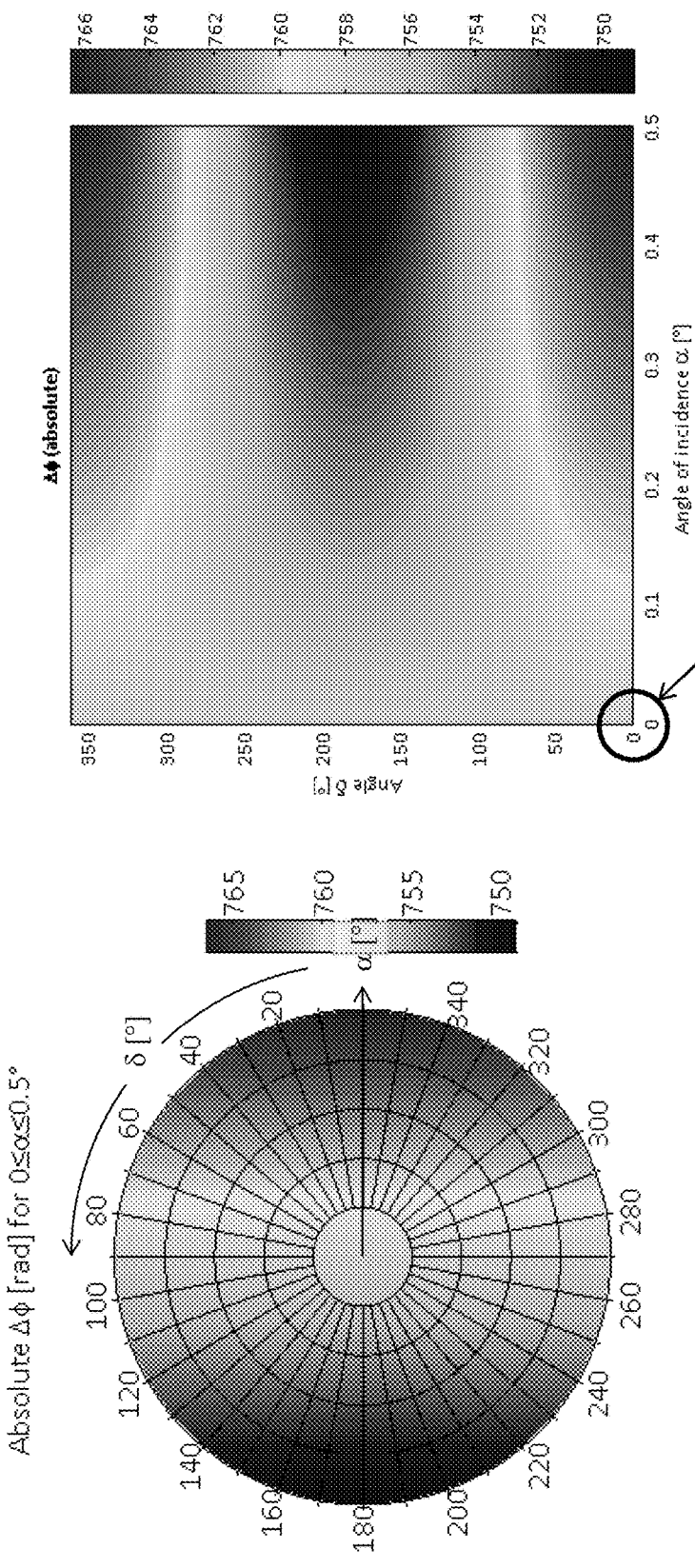
FIG. 18 shows calculations of the absolute phase difference Δϕ as a function both of the angle of incidence α and of the angle δ calculated for a calcite plate with a thickness of about 756 micrometers.

FIG. 18 shows calculations of the absolute phase difference Δϕ as a function both of the angle of incidence α and of the angle δ, again calculated for a calcite plate with a thickness of about 756 micrometers.

For the nominal state with α=0°, i.e. normal incidence, and with δ=0°, a phase difference between the ordinary and extraordinary beams of Δϕ=757.7 rad is obtained.

If, for example, the angle α changes from 0 to 0.5 degree and δ=0° remains, the phase difference increases to Δϕ=766 rad.

If in addition the angle δ changes, this also has an effect on Δϕ, commensurately more when α is greater.

Figure 19:
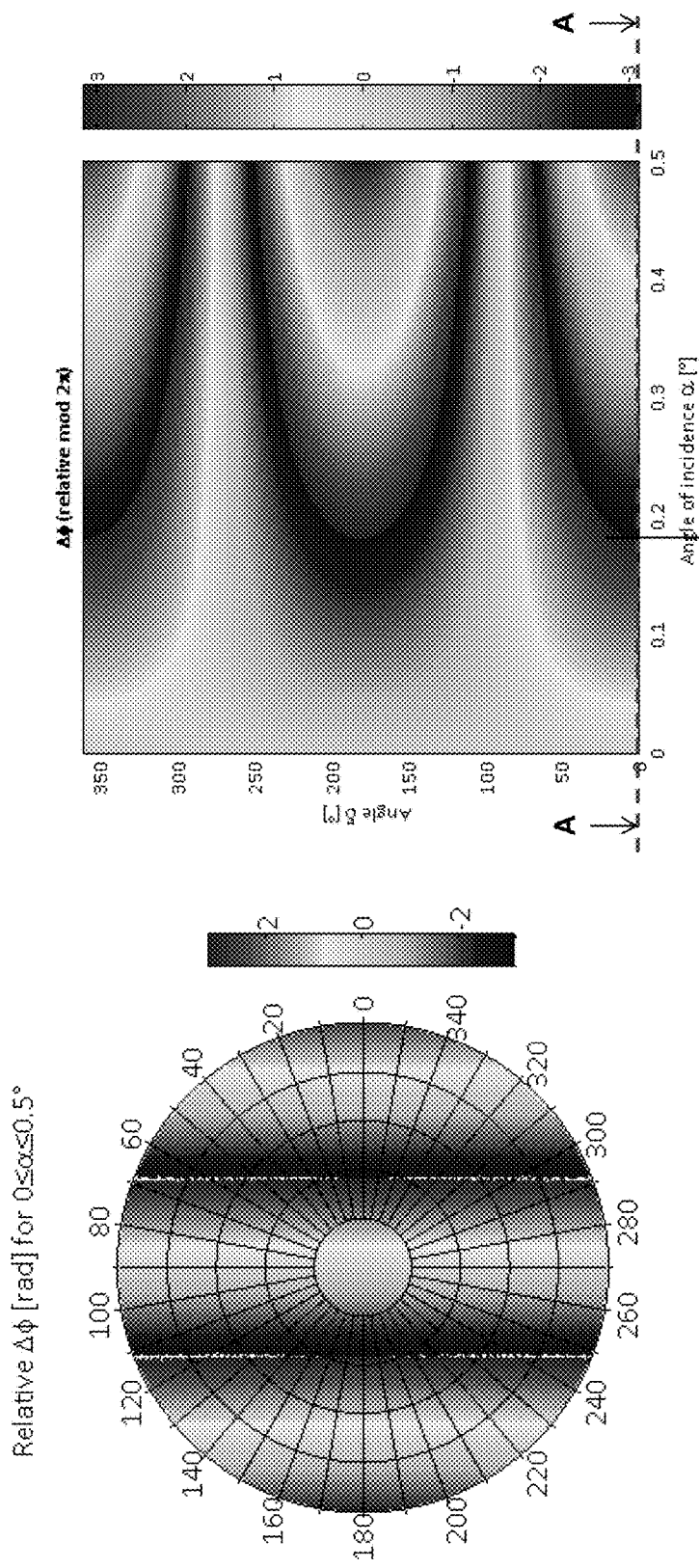
FIG. 19 shows the relative phase difference and the change of Δϕ modulo 2π.

FIG. 19 shows the change of Δϕ modulo 2π. The reference with α=0°, i.e. normal incidence, and with δ=0° is thus now set to 0. In the event of a change of α, when δ=0° remains, it is found that even an angle α=0.181 degree causes a change of Δϕ by π in comparison with α=0.

FIG. 20 shows the analysis of the effects of the angle-dependent changes of Δϕ in the form of a "black box" model.

The beam combiner, or in this case traveled through in the opposite directions beam splitter, is regarded as a "black box", and only the phase shift in the surrounding medium is taken into account.

In the nominal state—i.e. for normal light incidence—a calibration of the beam combiner would then be carried out, by adding an offset of the phase modulation to one of the two phase pixels so that the two pixels are "in-phase". A beam combiner calibrated in this way would deliver the desired amplitude modulation.

A change of the phase difference Δϕ by π, and therefore an inversion of the contrast, would however already occur when the angle of incidence a changes by 0.181 degree. These calculations were carried out for a pixel pitch of the light modulator of 84 micrometers, for which the required thickness of the calcite plate of 756 micrometers is obtained.

If the arrangement with a light modulator and beam combiner is thus calibrated once, a tilt of the light source relative to the birefringent layer thus causes a contrast inversion. The arrangement thus has a very small tolerance in relation to tilting of the incident light.

Figure 21:
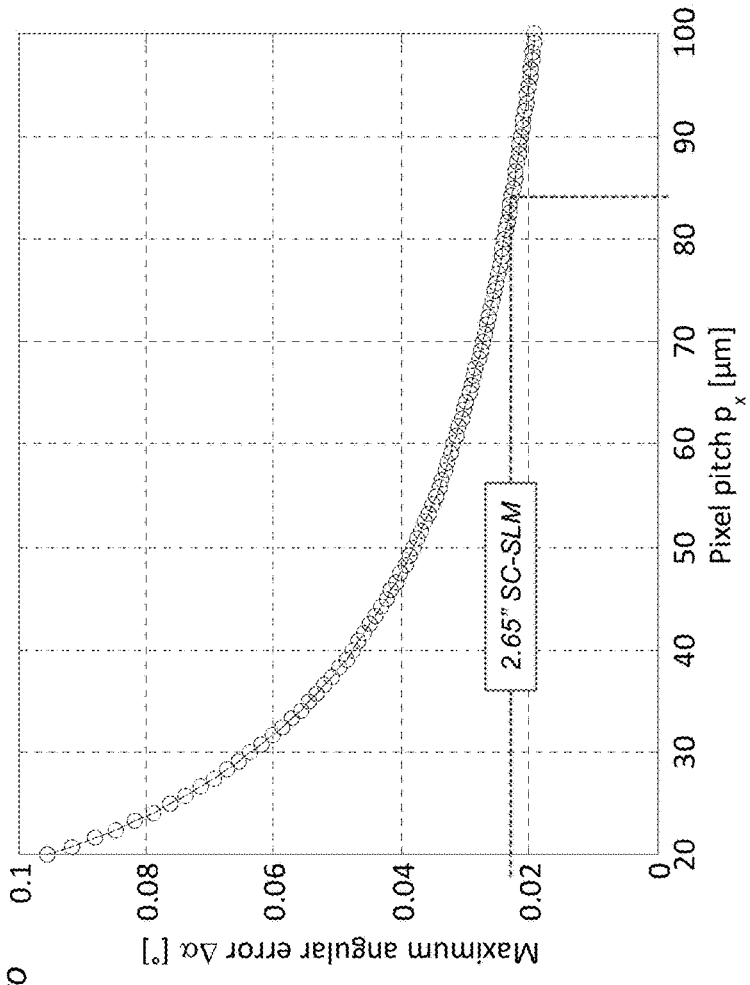
FIG. 21 shows the dependency of the tolerable angle change Δα as a function of the pixel pitch of the light modulator.

FIG. 21 shows the dependency of the tolerable angle change Δα as a function of the pixel pitch of the light modulator.

The starting point is the tolerable $\Delta\phi_{max}$ of $\pi/8$. This gives a tolerable optical path difference $$OPD \leq \frac{\lambda}{2\pi}\Delta\phi_{max}$$

The calculations for a wavelength of 532 nm give $$\Delta\alpha \leq \sin^{-1}\frac{\lambda}{16p_x}$$

For a pixel pitch of 84 micrometers, the tolerable value of $\Delta\alpha$ lies in the range of about 0.02 degree. For a smaller pixel pitch, the value increases somewhat and at a pitch of 20 micrometers approaches 0.1 degree.

In this angle range, the illumination wavefront would need to be kept stable relative to the birefringent layer in order to avoid undesired changes of the amplitude modulation.

Lastly, it should very particularly be pointed out that the exemplary embodiments discussed above merely serve to describe the claimed teaching but do not restrict it to the exemplary embodiments. In this context, with knowledge of the teaching according to the invention disclosed in this document, a person skilled in the art could combine all of the described exemplary embodiments and/or individual features with one another—so far as is possible.

Annex II

A description of the representations or figures of Annex II will be given below, their numbering likewise being denoted by a prefixed V. Another aspect will be described below, which relates to light modulators which are operated in a reflective arrangement. This aspect may on the one hand be implemented separately from the aspects mentioned above, but may on the other hand also be used in conjunction with the concepts described above, i.e. particularly in conjunction with devices for combining light beams which interact with adjacently arranged pixels of a light modulator, and/or in conjunction with the sensitivity to changes of the angle of incidence of the light onto a device for combining light beams according to Annex I.

The following figures first describe schematic configurations for the LC modulation in a reflective spatial light modulator (SLM), for example an LCoS. In this case, there types of configurations of reflective spatial light modulators (SLM) are described in the figures, namely:

(a): an arrangement for phase modulation in a light modulator having an LC mode with "in-plane" modulation;

(b): an arrangement for phase modulation in a light modulator having an LC mode with "in-plane" modulation for a rotation angle up to 180 degrees; and (c): an arrangement for phase modulation in a light modulator having an LC mode with "out-of-plane" modulation.

Figure 28:
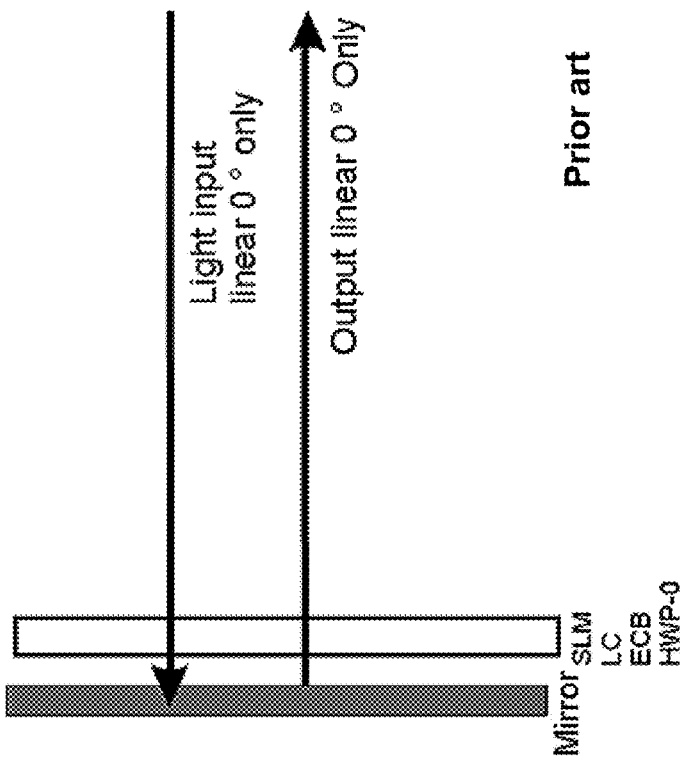
FIG. 28 shows a configuration according to the prior art with a light modulator based on phase modulation with liquid crystals having an "out-of-plane" LC mode, FIG. 29 schematically shows the configuration of such an arrangement according to the prior art in an LCoS.

FIG. 28 shows a configuration according to the prior art with a light modulator SLM based on phase modulation with liquid crystals LC having an "out-of-plane" LC mode, in this example ECB (electrically controlled birefringence). Light with linear polarization passes through an LC layer, is then reflected at a mirror and passes through the LC layer of the light modulator SLM in the opposite direction. In the off state, the LC layer has a thickness d and a birefringence $\Delta n$, the product of which corresponds to a half-wave plate ($\lambda/2$ layer). This corresponds to $d*\Delta n=\lambda/2$, and in a double pass then gives $2*d*\Delta n=\lambda$.

If the orientation of the LC molecules is parallel to the incident polarization direction, the polarization of the light is not rotated when passing through the LC layer. By applying a voltage to the LC layer, however, the optical path is modified by the effective $\Delta n$ being reduced. This change of the optical path is used for phase modulation of the light.

Figure 29:
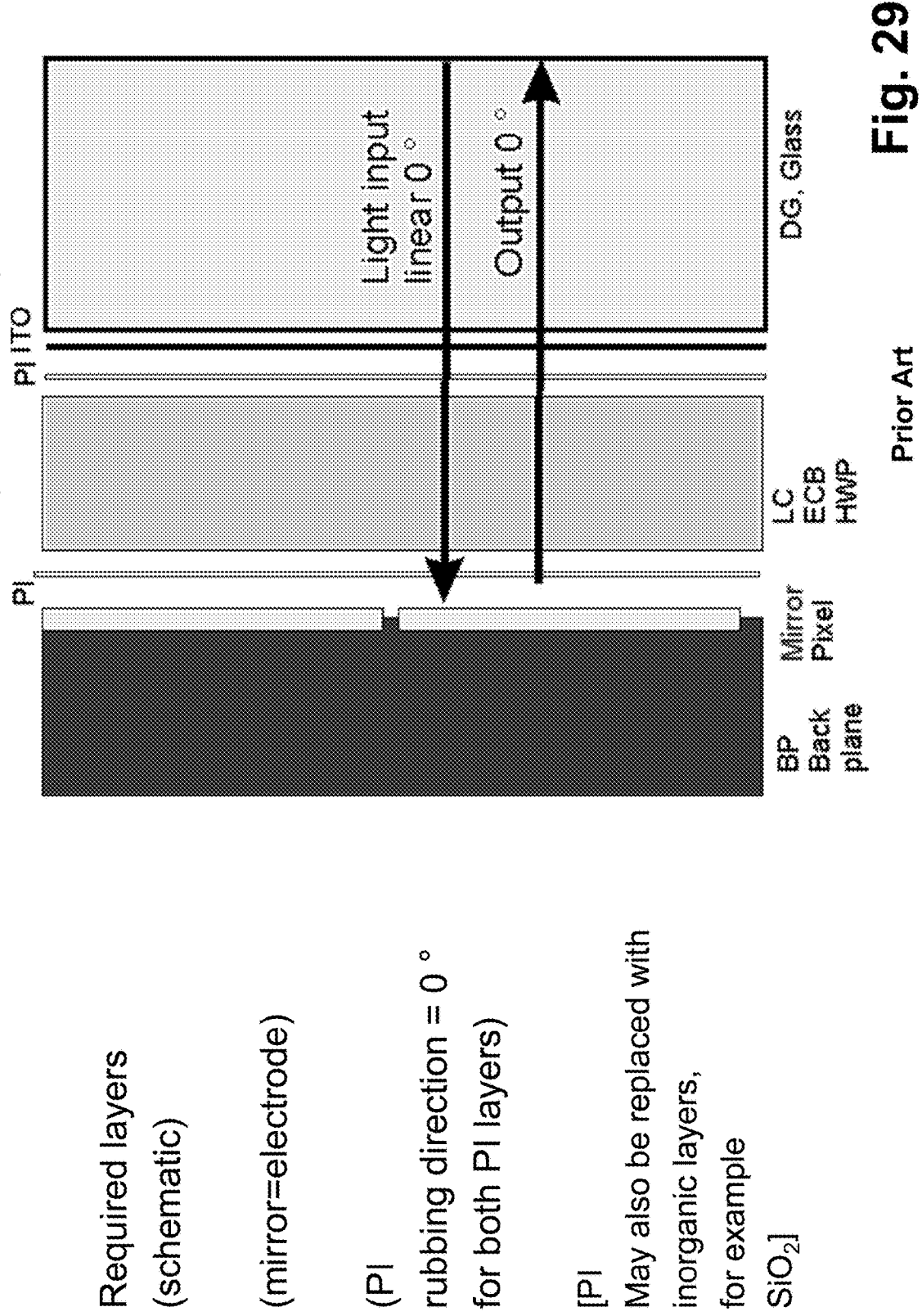

FIG. 29 schematically shows the configuration of such an arrangement according to the prior art in an LCoS. The LCoS comprises a backplane and a pixel matrix. The pixel electrodes themselves are generally configured reflectively, so that mirror and electrode for the driving are combined in the same layer. The LCoS furthermore comprises a cover glass DG with a transparent electrode E made of ITO (indium tin oxide). In addition, the LCoS comprises alignment layers for orientation of the LC molecules, which consist for example of polyimide PI, or optionally also of inorganic material, for example $SiO_2$.

One restriction when using phase-modulating LCoS for holographic displays are the slow switching times of particular LC modes, for example the ECB mode, in particular the passive switch-off times.

One possibility for improving switching times would be to operate both switching processes actively, the switching on with an out-of-plane field and the switching off with an in-plane field.

Figure 30:
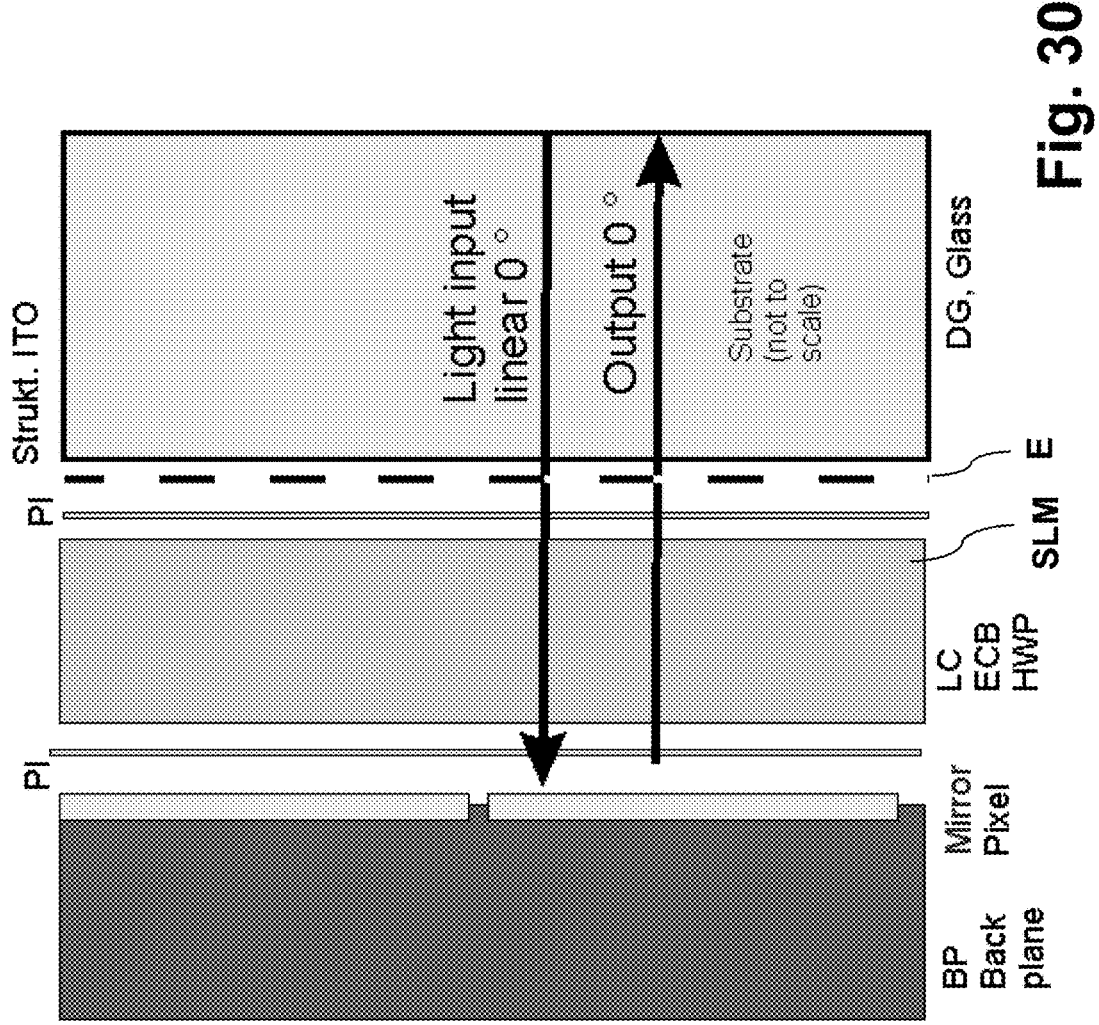
FIGS. 30, 31 show possibilities of modifying the electrodes of an LCoS in order to permit such active switching off with an in-plane field.
Figure 31:
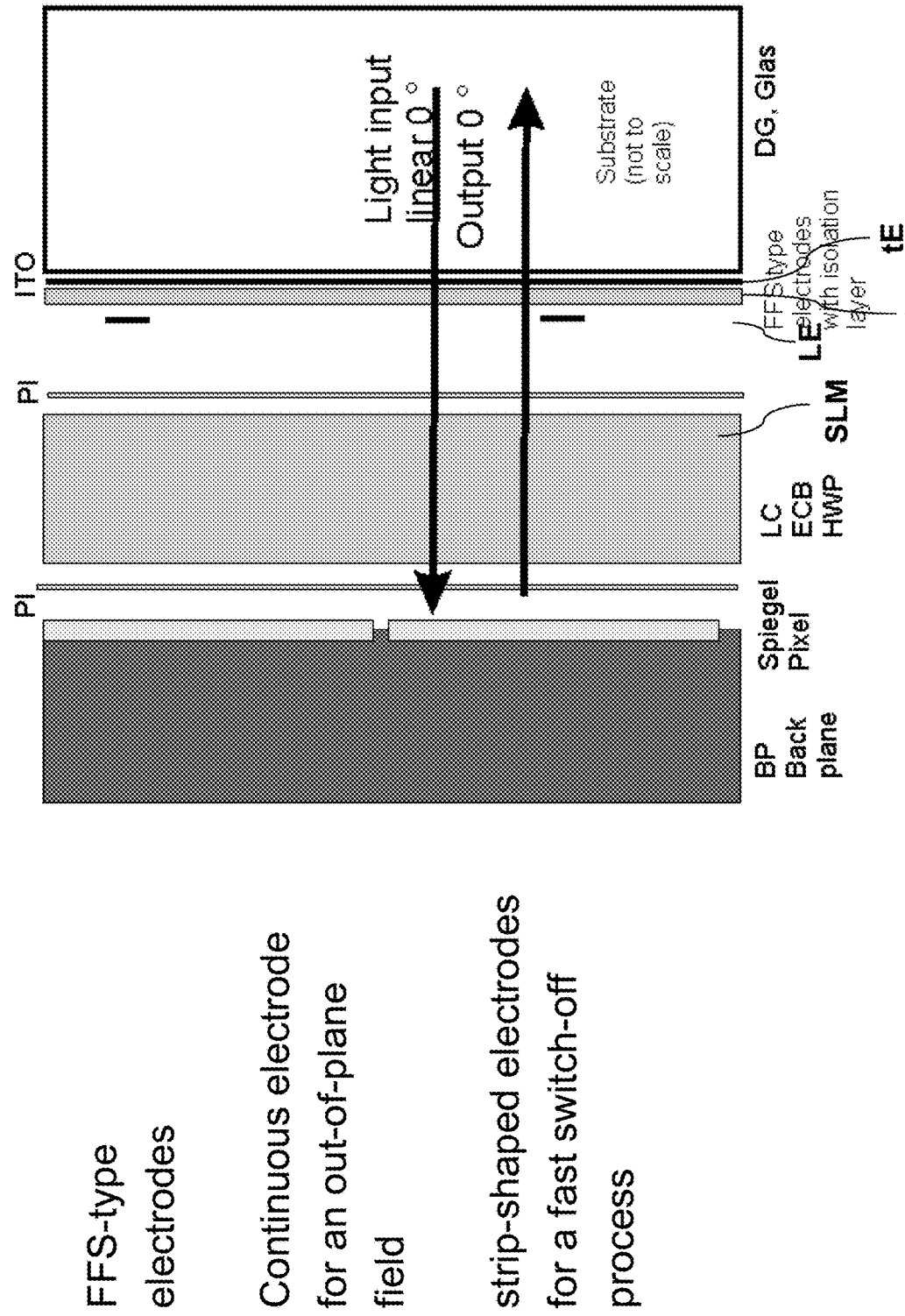

FIGS. 30 and 31 show possibilities of modifying the electrodes of an LCoS in order to permit such active switching off with an in-plane field.

FIG. 30 shows an arrangement in which the flat ITO electrode E on the cover glass DG is replaced with a finely structured electrode LE.

FIG. 31 shows an arrangement in which, instead of this, a flat electrode tE is still used in the cover glass DG, but an insulation layer I above it and additional line electrodes LE above the latter are used. In order to apply an out-of-plane field, the line electrodes and the flat ITO electrode E are driven with the same voltage, although this voltage value differs from the voltage which is applied to the pixel electrodes. For active switching off, the line electrodes and the flat ITO electrode are driven with different voltage values so that a field distribution with in-plane components is obtained.

Figure 32:
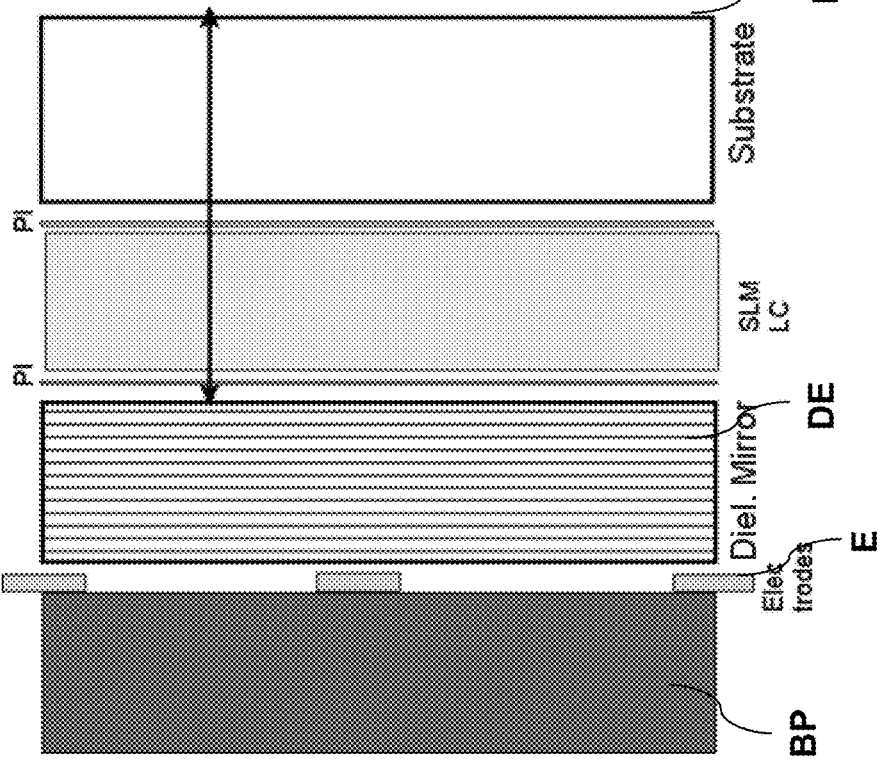
FIGS. 32, 33 show possibilities of using electrodes and mirrors in in-plane LC modes which are driven by an in-plane field, FIG. 34 schematically shows an arrangement for phase modulation in an LC mode with in-plane modulation according to the prior art.
Figure 33:
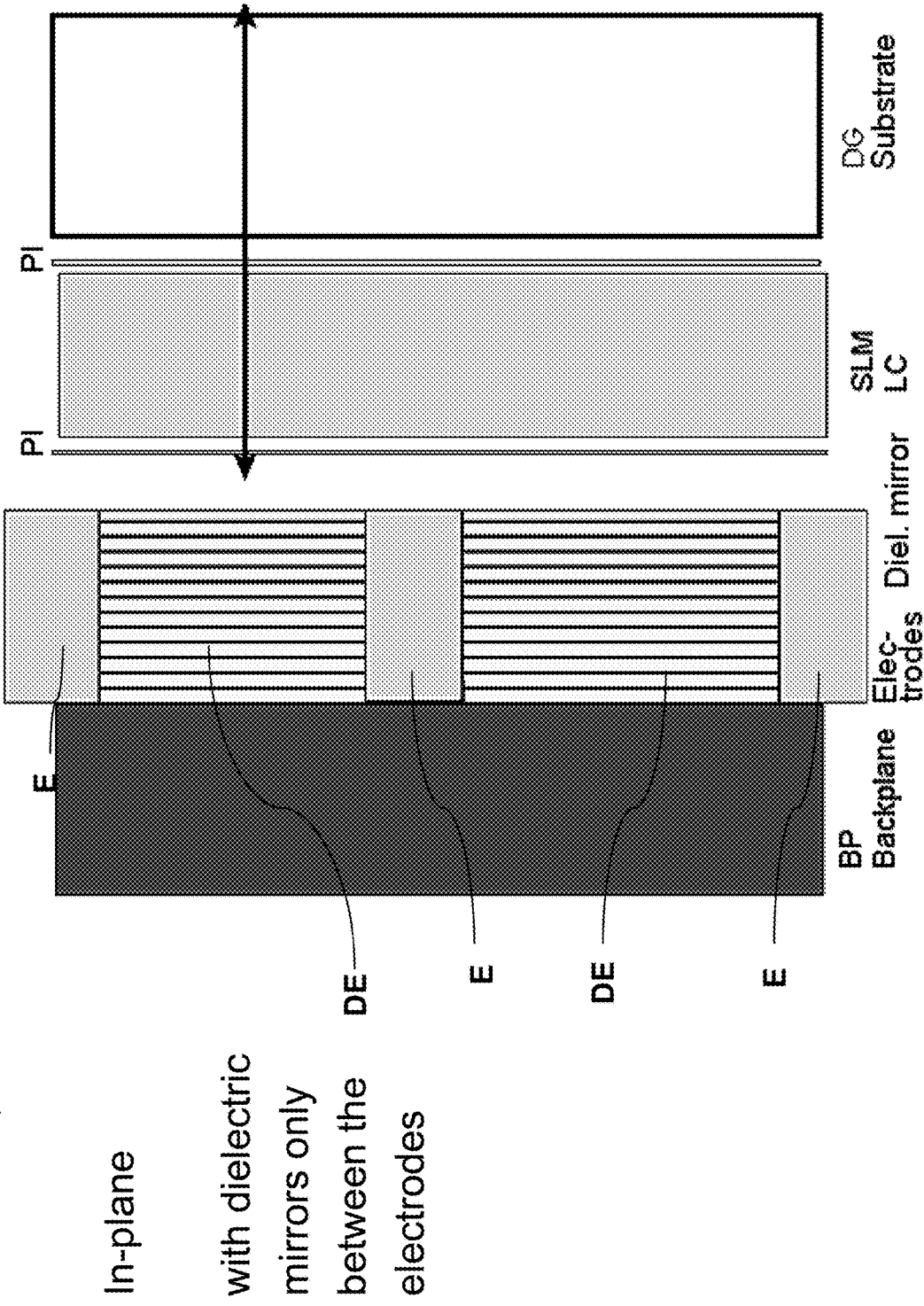

FIGS. 32 and 33 show possibilities of using electrodes and mirrors in in-plane LC modes, for example IPS or HAN, which are driven by an in-plane field. These LC modes are conventionally used only in transparent displays, but not in a reflective LCoS.

Since the modulation of the LC takes place in an in-plane field between two electrodes, the electrode and mirror combination in a single layer, which is conventional in an LCoS, cannot be used. A metallic mirror layer between the electrodes would lead to undesired short circuits.

It is therefore proposed in FIG. 32 to use a reflective dielectric layer stack DE above the electrodes E. For operation with lasers in a holographic display, the dielectric layer stack DE may be optimized for high reflection at the laser wavelengths used.

A layer stack between the electrodes E and the LC layer, however, has the effect that the strength of the field inside the LC layer of the light modulator SLM is reduced for the same voltage at the electrodes E in comparison with a configuration without a dielectric layer DE.

FIG. 33 therefore shows an arrangement with thicker electrodes E and a reflective dielectric layer stack DE only between but not above the electrodes E. This would thus give the desired reflection at the dielectric layer stack DE in combination with a desired in-plane field in the LC layer.

Figure 34:
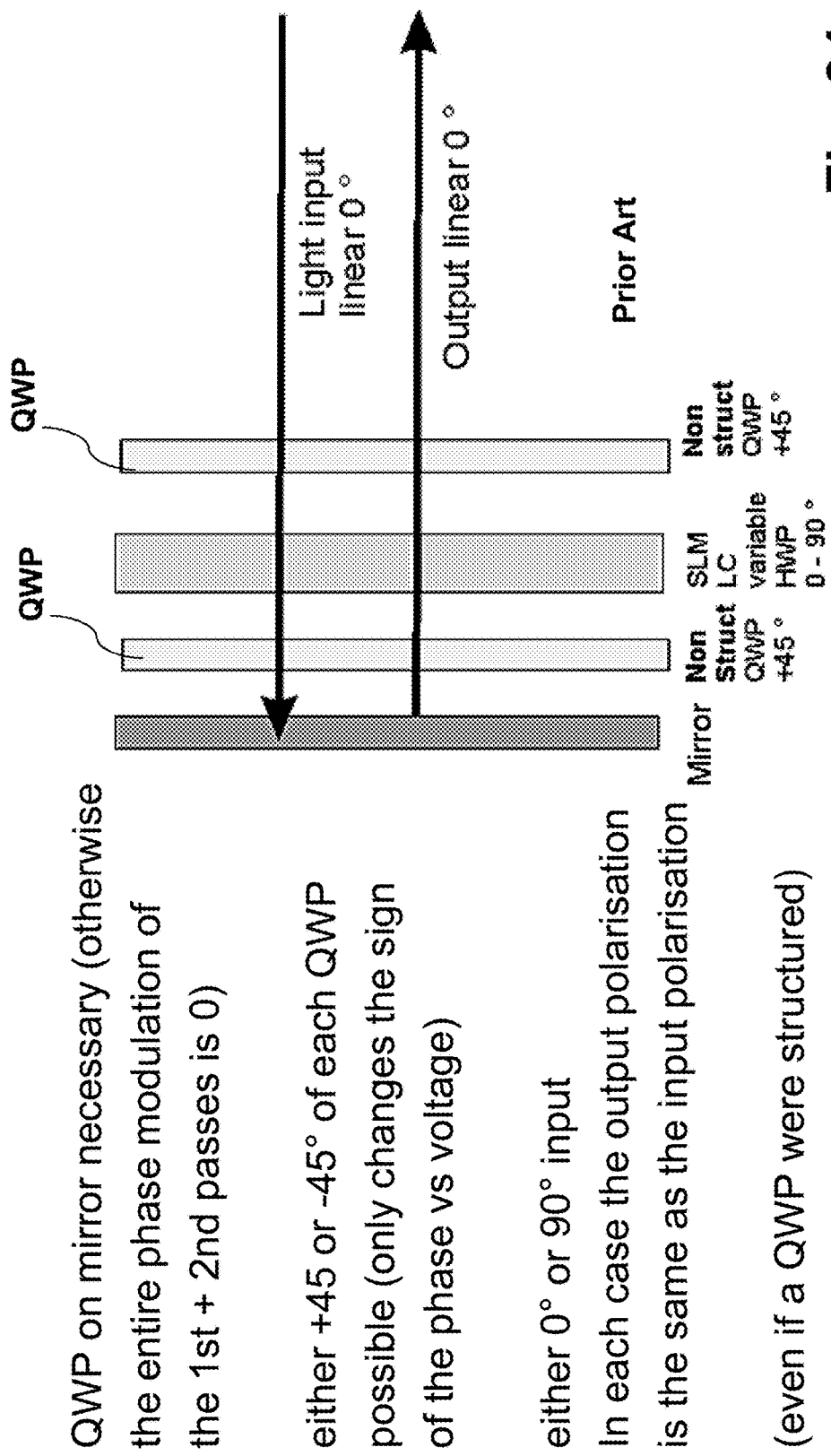

FIG. 34 schematically shows an arrangement for phase modulation in an LC mode with in-plane modulation according to the prior art. Incident light with linear polarization initially passes through a quarter-wave plate QWP, the optical axis of which is oriented at 45° relative to the incident polarization direction. The light then passes through the LC layer, the optical thickness of which corresponds to that of a half-wave plate, then a further quarter-wave plate QWP with an optical axis parallel to the first quarter-wave plate QWP. The two quarter-wave plates QWP may, for example, be configured as achromatic quarter-wave plates. The light is then reflected at a mirror and passes on the return path through the individual layers in the opposite order. This again leads to linearly polarized light with the same polarization direction as the incident light. By driving of the LC layer, in-plane rotation of the optical axis of the liquid crystals is carried out. This rotation causes a phase modulation, which corresponds in each case to two times the rotation angle both on the forward path and on the return path. Overall the phase modulation in this configuration thus adds up to four times the rotation angle. An in-plane rotation of plus/minus 45 degrees ($\pm\pi/4$) is sufficient to achieve a phase modulation of $\pm\pi$.

Figure 35:
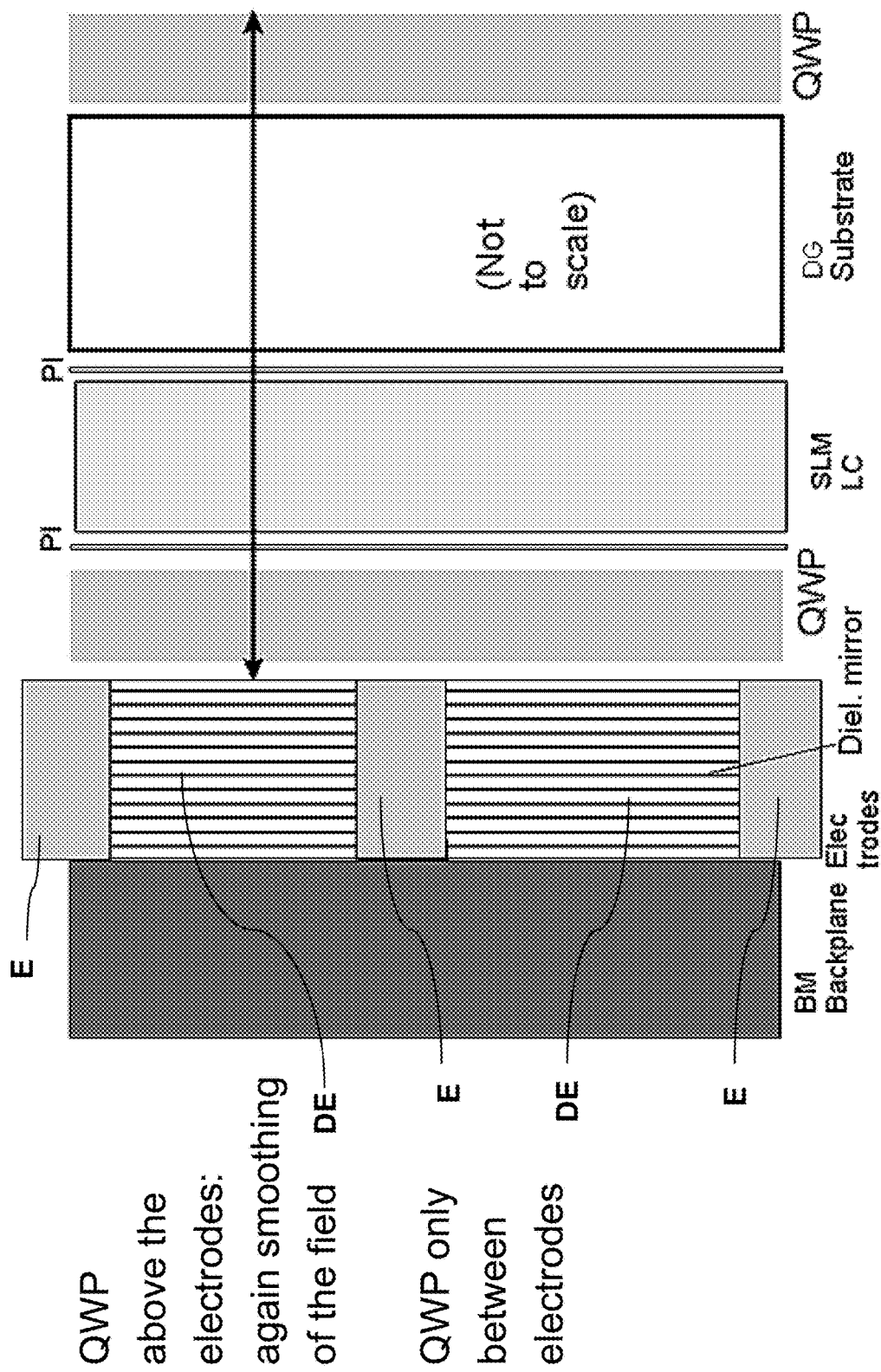
FIG. 35 shows one possible implementation for the phase modulation on the basis of an in-plane LC mode according to the schematic arrangement represented in FIG. 34 in an LCoS with electrodes and dielectric mirrors as in FIG. 33, FIG. 36 schematically shows a further arrangement for phase modulation in an LC mode with in-plane modulation according to the prior art.

FIG. 35 shows one possible implementation for the phase modulation on the basis of an in-plane LC mode according to the schematic arrangement represented in FIG. 34 in an LCoS with electrodes E and dielectric mirrors DE as in FIG. 33.

Figure 36:
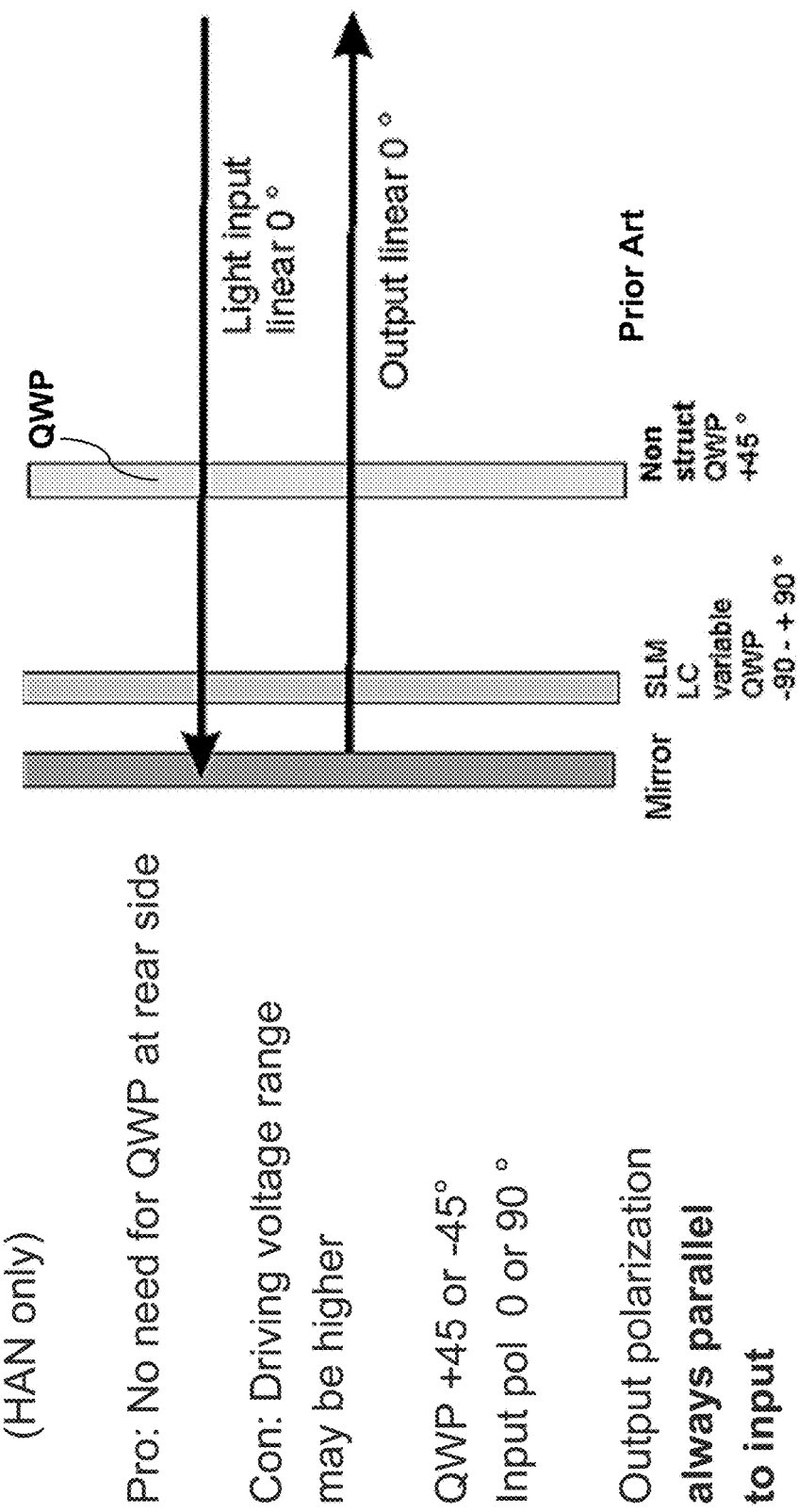

FIG. 36 schematically shows a different (in comparison with FIG. 34) arrangement for phase modulation in an LC mode with in-plane modulation according to the prior art. Incident light with linear polarization again initially passes through a quarter-wave plate QWP, the optical axis of which is oriented at 45° relative to the incident polarization direction. The light then passes through the LC layer, the optical thickness of which corresponds to that of a quarter-wave plate. The light is then reflected at a mirror and passes through the two layers in the opposite direction. By driving of the LC layer, in-plane rotation of the optical axis of the liquid crystals is carried out. This rotation causes a phase modulation. In this case, the overall phase modulation (forward and return paths together) corresponds to two times the rotation angle.

Rotation of the optical axis of the LC by ±90 degrees ($\pm\pi/2$) would therefore be necessary in order to achieve a phase modulation of $\pm\pi$.

Figure 37:
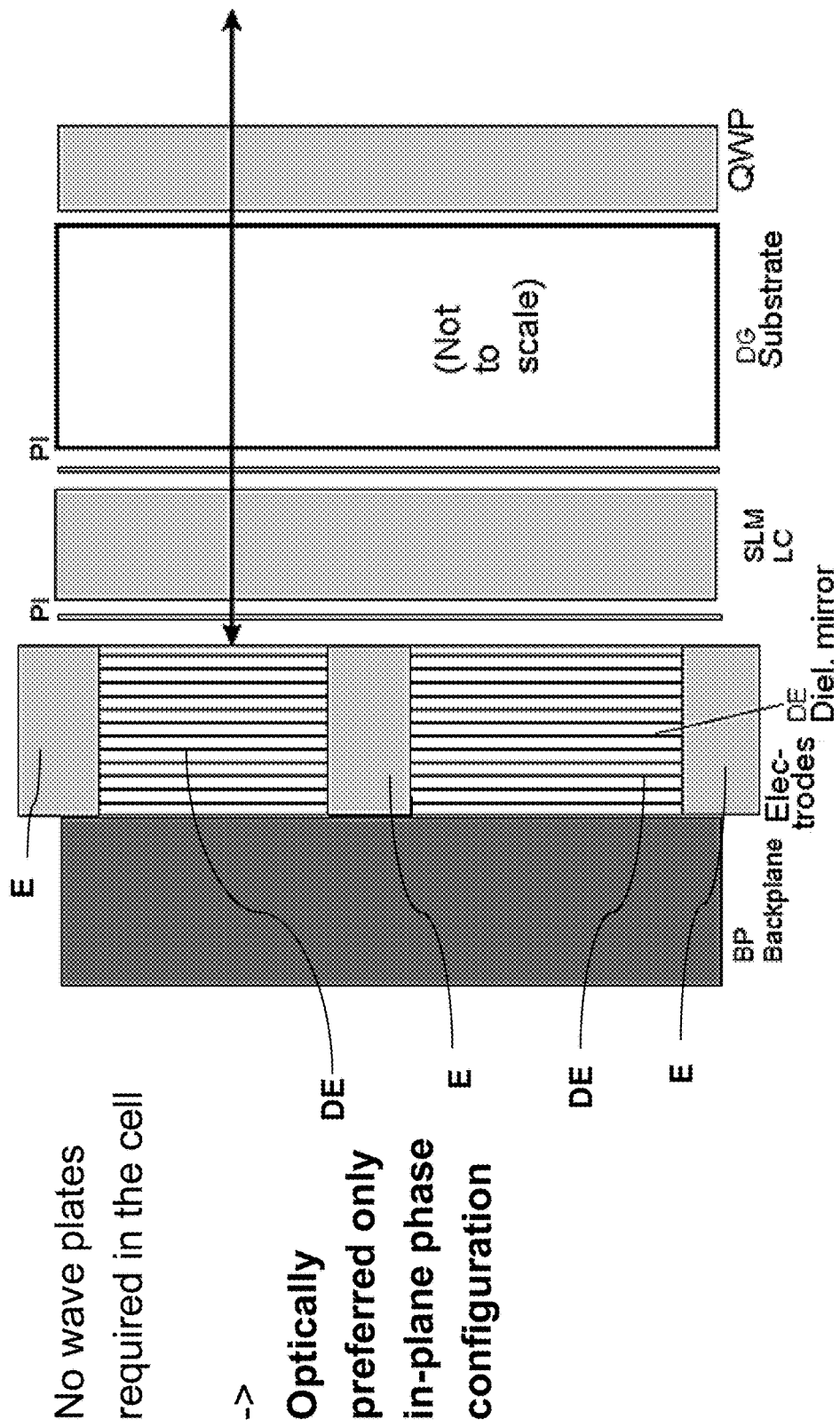
FIG. 37 shows one possible implementation for the phase modulation on the basis of an in-plane LC mode according to the schematic arrangement represented in FIG. 36 in an LCoS with electrodes and dielectric mirrors as in FIG. 33, FIG. 38 describes the problem for a phase-modulating light modulator in conjunction with a device according to the present invention for combining light beams which interact with adjacently arranged pixels of a light modulator, FIG. 39 schematically shows an arrangement which generates a different polarization for adjacent pixels for an in-plane modulating LC mode.

FIG. 37 shows one possible implementation for the phase modulation on the basis of an in-plane LC mode according to the schematic arrangement represented in FIG. 36 in an LCoS with electrodes E and dielectric mirrors DE as in FIG. 33. In an LCoS, this configuration has the advantage that no additional quarter-wave plate is required between the LC layer and the rear side of the LCoS. The requirement for the rotation angle is that it can be driven in the range of ±90.

The configurations described so far for a phase-modulating LCoS, both for an in-plane and for an out-of-plane mode, all have the property that the incident polarization is not modified, but rather light of the same linear polarization as the incident light also had comes back again from the LCoS.

For a device for combining light beams which interact with adjacently arranged pixels of a light modulator, which comprises either a birefringent layer or other polarization-selective component parts for beam splitting or beam combination, it is necessary for light of two adjacent pixels with different polarization to be combined. On the other hand, the LC layer itself often also requires a particular incident polarization in order to modulate the phase as desired.

FIG. 38 describes the problem for a phase-modulating light modulator in conjunction with a device for combining light beams which interact with adjacently arranged pixels of a light modulator.

The following figures show various configurations for achieving the desired different polarization of the reflected light in adjacent pixels. In this regard, these configurations are suitable to be integrated into a device for combining light beams which interact with adjacently arranged pixels of a light modulator, and/or into an apparatus for representing two-dimensional and/or three-dimensional image contents and/or moving scenes.

Figure 39:
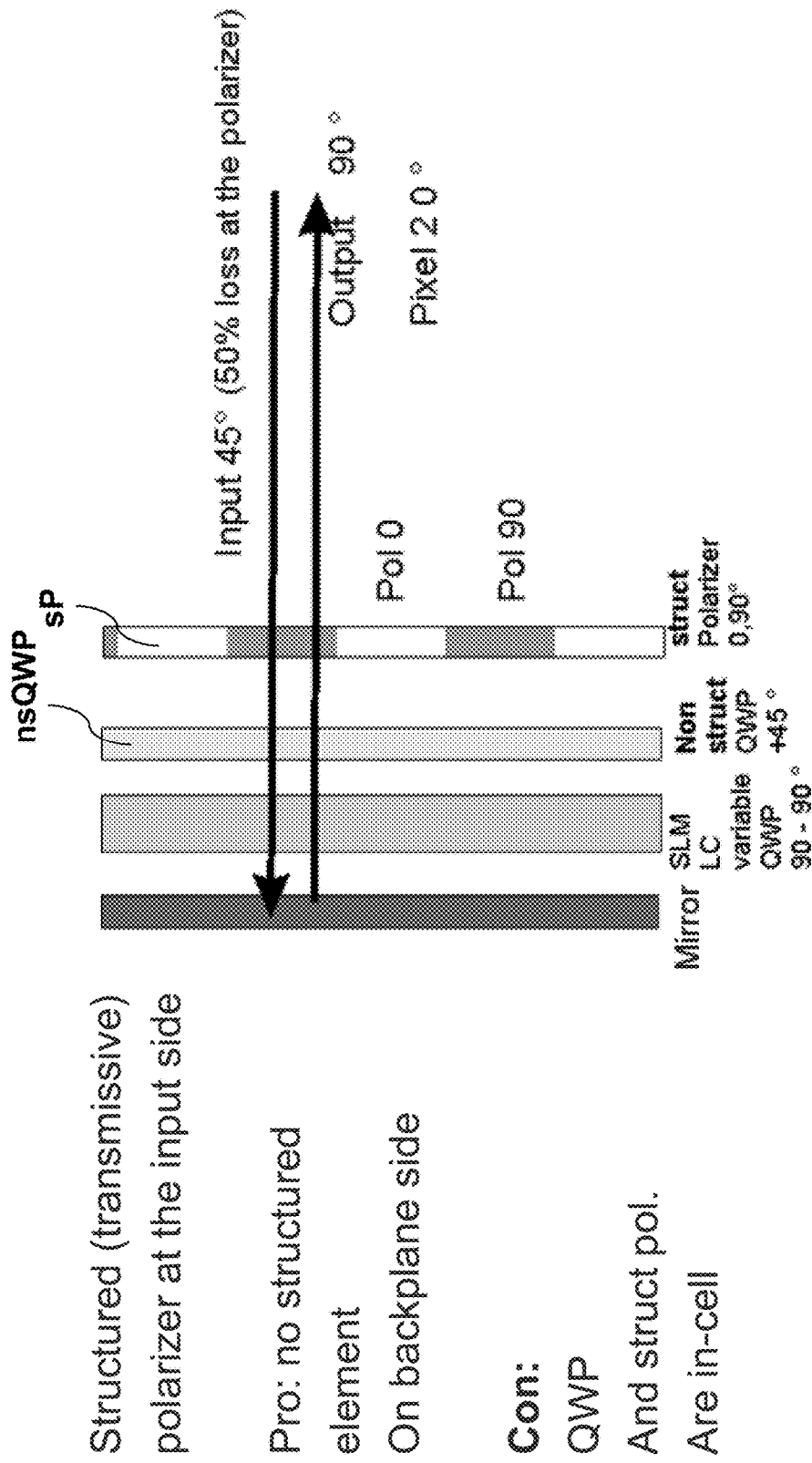

FIG. 39 schematically shows an arrangement which generates a different polarization for adjacent pixels for an in-plane modulating LC mode. The arrangement comprises a structured polarizer sP on the entry side, so that only either horizontal or vertical polarization already enters the modulator for the incident light for different pixels. For example, the modulator may be illuminated with 45-degree linearly polarized light which has both a vertical and a horizontal component. The structured polarizer sP respectively transmits the suitably polarized part of the incident light. A quarter-wave plate nsQWP with a fast axis at 45 degrees then converts the incident light respectively into circularly polarized light, although the direction sense of the circular polarization differs for the adjacent pixels. Right-circularly and left-circularly polarized light is thus alternatively obtained for adjacent pixels.

The light then passes through an LC layer of the light modulator SLM, the optical thickness of which corresponds to that of a quarter-wave plate, strikes a mirror and passes back through the aforementioned elements. In the case of an in-plane rotation of the LC molecules, a phase modulation takes place proportionally to two times the rotation angle, although the sign of the phase modulation differs for left-circular and right-circular light. According to the invention, this is taken into account when writing the phase values into the light modulator, for example by generating a positive rotation angle in even pixel columns by applying a suitable voltage, and a negative rotation angle of the LC molecules in odd pixel columns, for the same phase value to be written in.

Particularly in the case of small pixels, the influence of diffraction effects during the light propagation between the structured polarizer and the LC layer should be kept small. To this end, it is expedient to minimize the distance between the structured polarizer and the LC layer.

Advantageously, therefore, both the quarter-wave plate and the structured polarizer are arranged "in-cell", i.e. on the inner side of the cover glass (not shown in FIG. 39), close to the LC layer.

This arrangement with a structured polarizer on the outer side is expedient for an in-plane modulating LC because phase modulation takes place both for right-circularly and for left-circularly polarized light.

In contrast thereto, phase modulation takes place for an out-of-plane modulating LC for linear polarization, but only for a particular polarization direction—for example in the case of an ECB mode parallel to the orientation of the LC molecules in the off state (that is to say for example parallel to the rubbing direction during orientation of the LC by mechanical rubbing of a PI layer).

An arrangement of an out-of-plane modulating LC with a structured polarizer could thus lead to only every second pixel modulating the phase at all, while for the other pixels the phase is constant independently of the driving of the pixels. This relationship is described in FIG. 40.

Figure 41:
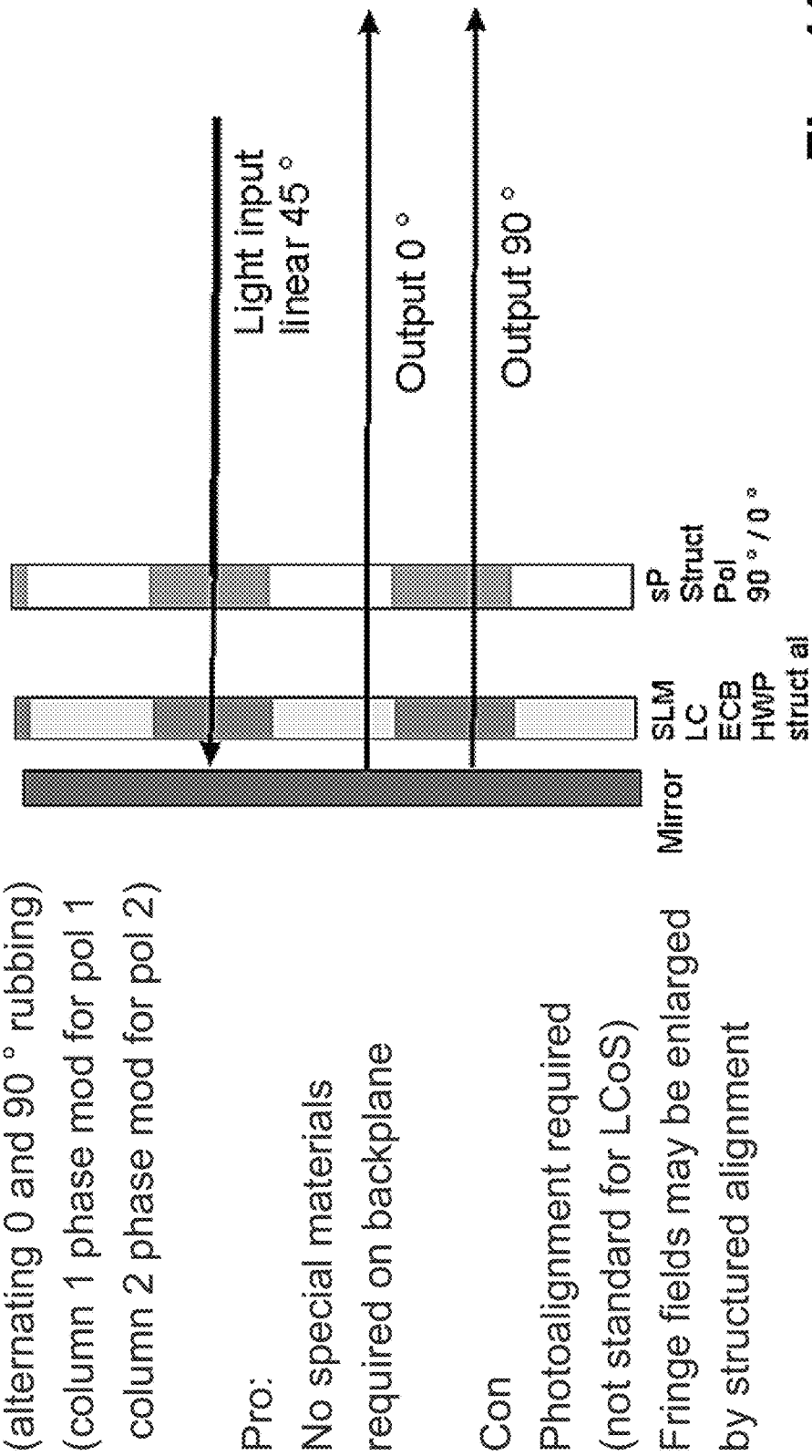

FIG. 41 shows a solution for this problem. An arrangement with a structured polarizer sP is shown, as in FIG. 39. Differently linearly polarized light then passes through the pixels of the LC layer of the light modulator SLM, the thickness of which preferably corresponds to a λ/2 layer. In addition, however, the LC layer has a pixelwise structured orientation of the LC molecules. The orientation of the LC molecules is parallel to the transmission direction of the structured polarizer sP before each pixel. Such an orientation may, for example, be carried out by means of photoalignment by using a suitable mask during the production of the light modulator SLM. Because of the suitable orientation of the molecules, in the case of out-of-plane modulation of the LC molecules, phase modulation takes place in each pixel. However, such an arrangement, which requires structured orientation of the LC, is elaborate.

Figure 42:
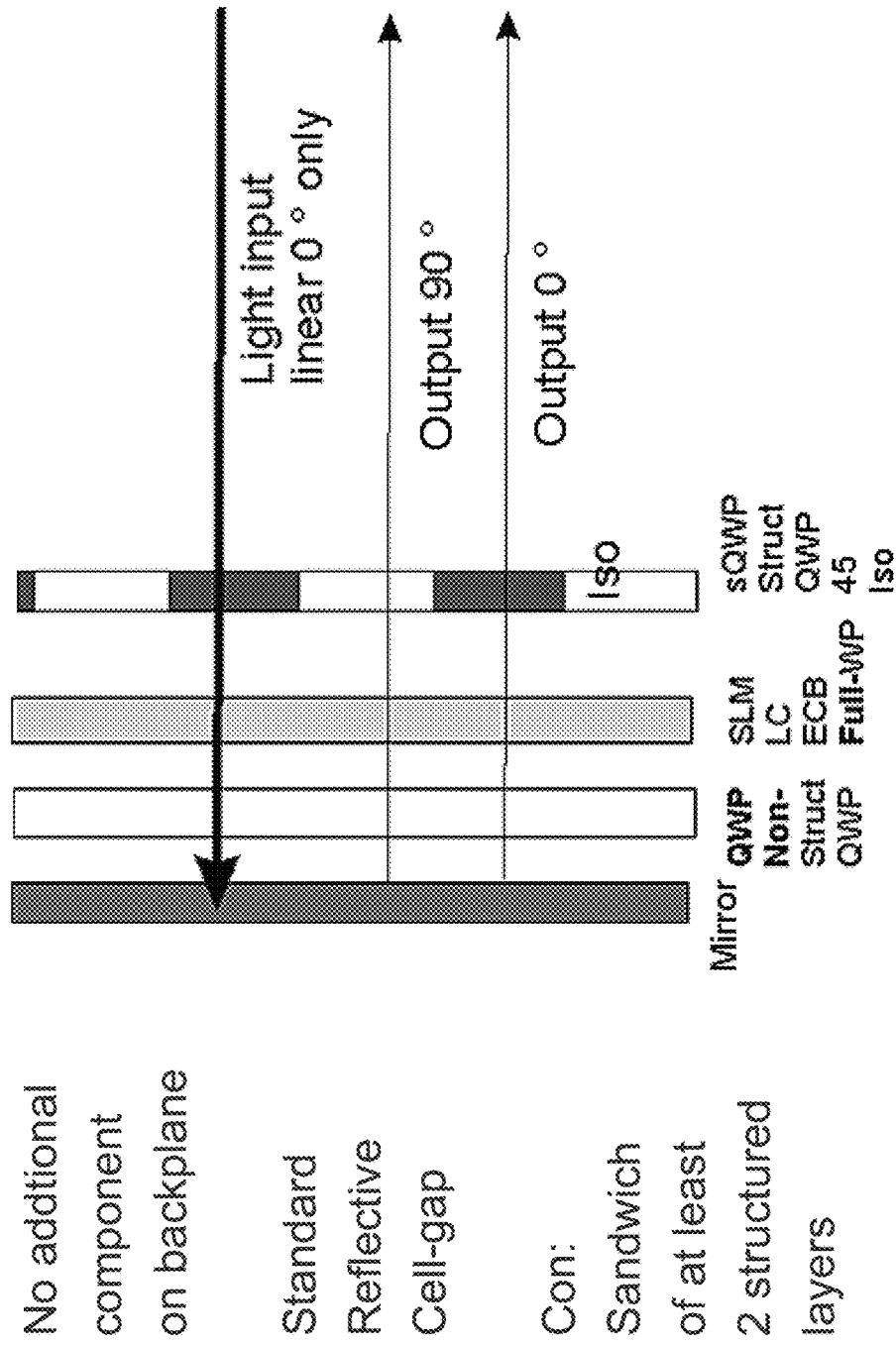

For this reason, according to FIG. 42, another possibility is proposed, namely to use an out-of-plane modulating LC with a structured polarizer sP. To this end, a structured half-wave plate HWP is arranged between the structured polarizer sP and the LC layer of the light modulator SLM. For every second pixel, the structured half-wave plate HWP rotates the polarization by 90 degrees. The effect thereby achieved is that, after passing through the half-wave plate HWP and when entering the LC layer, the light initially polarized differently after passing through the structured polarizer sP and before the structured half-wave plate HWP is equally polarized for all pixels. The orientation of the LC molecules in the off state (for example the rubbing direction) is then selected in such a way that it is parallel to the entering polarization direction. In the case of out-of-plane modulation of the LC layer, a phase modulation can therefore be adjusted for all pixels. After passing through the LC layer, on the return path from the structured half-wave plate HWP, the polarization is again such that it is transmitted by the structured polarizer sP. The result is thus a phase modulation with the desired polarization, different for adjacent pixels, of the light emerging from the light modulator SLM.

Figure 43:
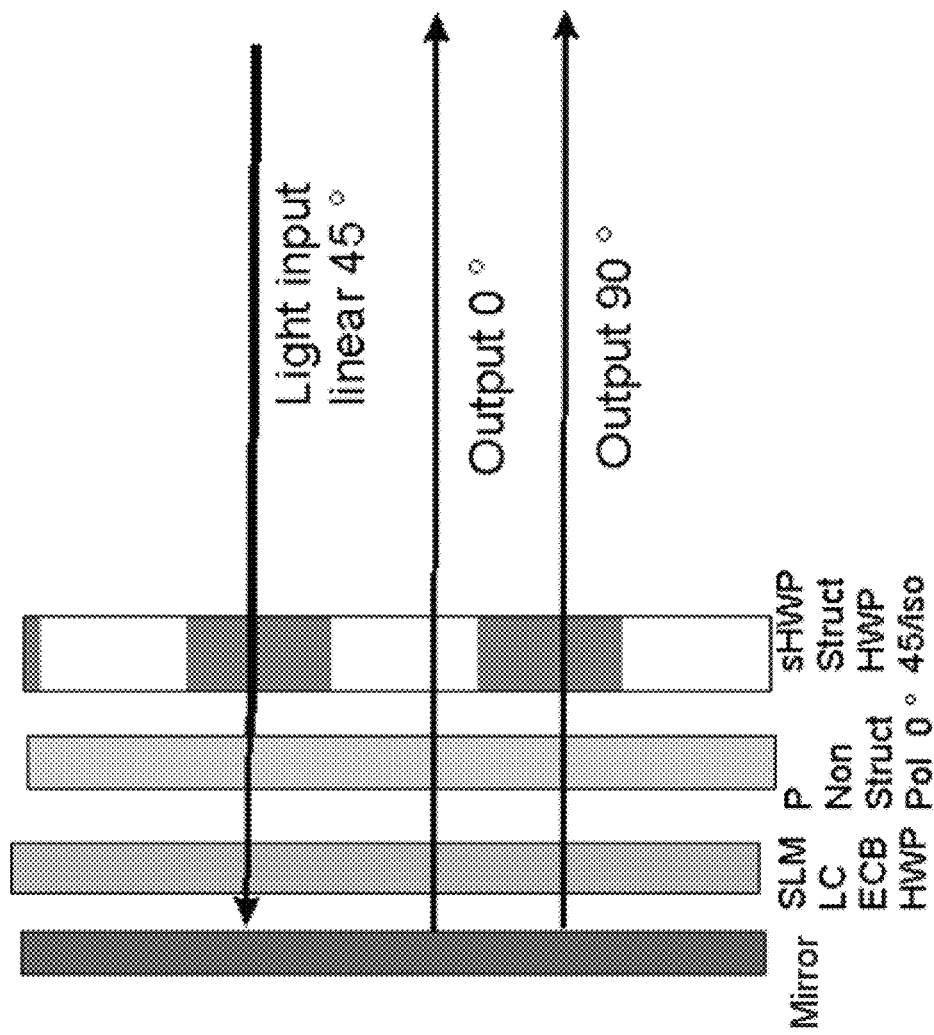
FIG. 43 shows another possibility of phase modulation with an out-of-plane modulating LC and a different polarization of the light emerging from the light modulator for adjacent pixels.

FIG. 43 shows—in a further configuration (d)—another possibility of phase modulation with an out-of-plane modulating LC and a different polarization of the light emerging from the light modulator SLM for adjacent pixels. This configuration makes do without a structured LC layer and without a structured polarizer. Light polarized linearly at 45 degrees strikes a structured half-wave plate sHWP with alternately an isotropic (i.e. non-birefringent material) and a (birefringent) λ/2 layer with 45-degree orientation of the optical axis. On the forward path, the light passes through the half-wave plate sHWP at 45 degrees without rotation, because the optical axis at 45 degrees is parallel to the polarization direction of the incident light and because the isotropic material also leaves the optical axis unmodified. The light then strikes a polarizer P with a 0 degree transmission direction. About 50% of the light is absorbed by the polarizer P, and the other 50% reach with a uniform polarization the LC layer of the light modulator SLM, in which a phase modulation can be adjusted. The light passes with unmodified polarization on the return path back through the polarizer P. By the structured half-wave plate sHWP, the polarization is rotated through 90 degrees only in the sections with a 45° orientation of the optical axis. In the sections of the structured half-wave plate sHWP with isotropic material which lie between these, the polarization is not rotated. The light emerging from the arrangement has, as desired, again alternately different polarization for adjacent pixels. Advantageously, this different polarization in this arrangement is generated only in the last layer that the light passes through. Furthermore, in contrast to the embodiments mentioned above, only a single structured layer is required, namely the structured half-wave plate sHWP.

The disadvantage of this arrangement is that the polarizer P is arranged between the LC layer of the light modulator SLM and the structured half-wave layer sHWP. In order to minimize undesired diffraction effects in the light propagation between the LC layer and the half-wave plate sHWP, the thickness of the polarizer P must therefore be kept small. A conventional film polarizer with a thickness of more than 100 micrometers would not be usable for small pixel sizes. However, special thin-film polarizers in the thickness range of from 5 to 10 micrometers represent an alternative.

Figure 44:
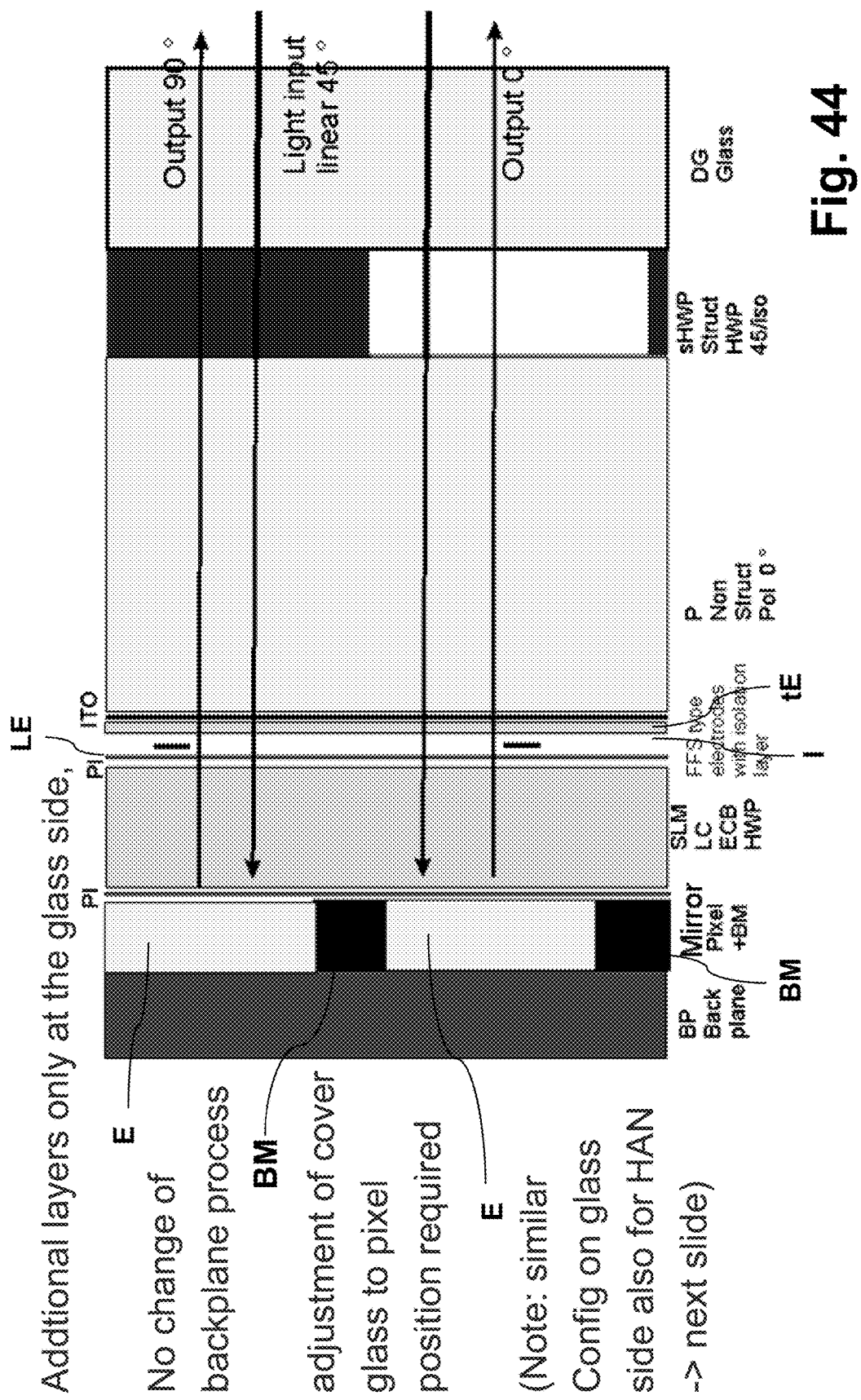
FIG. 44 shows a more detailed view of the configuration of FIG. 43.

FIG. 44 shows a more detailed view of the configuration of FIG. 43. Some elements, such as the pixel pitch and in comparison thereto the relative thicknesses of the LC layer of the light modulator SLM, structured half-wave plate sHWP and polarizer P, are shown approximately true to scale.

The reflective light modulator comprises (from left to right) a backplane BP for driving reflective electrodes E thereover (on the left), optionally with a "black mask" BM in the intermediate spaces of the pixels, thereover a layer PI for orientation of the liquid crystals LC of the light modulator SLM, for example polyimide, then the liquid-crystal layer LC, the optical thickness of which corresponds at least to a λ/2 layer (which should however also have a greater optical thickness), then a second orientation layer PI followed by a transparent electrode arrangement LE, for example ITO. This example, as explained in the description of FIG. 31, involves FFS-type electrodes LE, i.e. line electrodes, followed by an insulating layer I and a flat electrode tE. The electrode tE is followed by a polarizer layer P with a thickness of a few micrometers (thin-film polarizer) and a structured half-wave plate sHWP, which is aligned with the pixels (birefringent with optical axis at 45 degrees relative to the transmission direction of the polarizer alternating with non-birefringent isotropic sections, as described in FIG. 43). The second orientation layer PI, the electrodes LE, tE, the polarizer P and the structured half-wave layer sHWP are located internally on a cover glass DG (the latter not true to scale).

During production, these layers are thus typically first of all applied onto the cover glass DG, then the cover glass DG is oriented with respect to the backplane side BP and the LC layer is finally introduced.

In one particular embodiment, the cover glass DG for superposition of the light of in each case 2 pixels may also be configured as a birefringent Savart plate. The cover glass may, for example, be made of quartz glass with a suitable orientation of the optical axis. In another embodiment, the cover glass DG is a commercially available display glass, and the light modulator arrangement is followed in the beam path by an external Savart plate.

Figure 45:
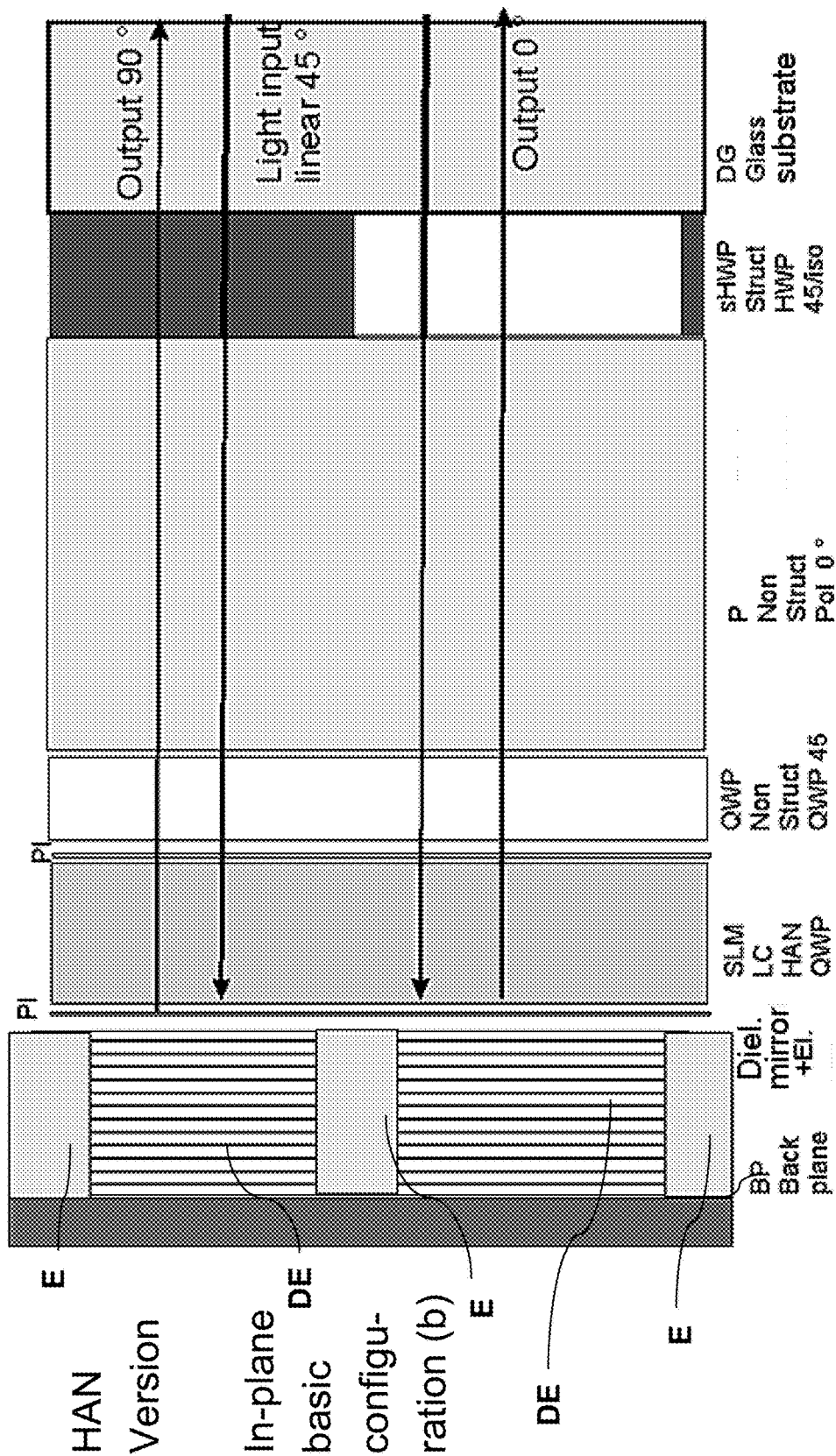
FIG. 45 shows an arrangement similar to that shown by FIG. 44.

FIG. 45 shows an arrangement similar to that shown by FIG. 44, but this time for an in-plane modulating light modulator SLM with an LC layer. From right to left, initially the cover glass DG, the structured half-wave plate sHWP and the polarizer P are identical. On the left of the polarizer P, however, there also follows a quarter-wave plate QWP since the in-plane phase modulation of the SLM requires circularly polarized light. In this example, for an LC mode which carries out in-plane modulation in an in-plane field, an electrode is not required on the side to the right of the LC layer. The LC layer with orientation layers PI arranged on both sides is shown. In this case, the LC layer has the optical thickness of a quarter-wave layer.

As mentioned in FIG. 33 and in the associated description, for an LC mode with in-plane field linear electrodes E with dielectric mirrors DE in the space between the electrodes E may be used. These are shown on the left-hand side of the figure.

There are, however, also LC modes which have in-plane rotation of the liquid-crystal molecules in an electric field applied out-of-plane. These are, for example, LC modes with smectic LC molecules or the uniform lying helix (ULH) mode with cholesteric liquid crystals. For these, the same arrangement of the wave plates and polarizer as shown in FIG. 45 could be used, but with flat electrodes on the backplane side and a glass substrate. The electrode arrangement would thus correspond for example to that shown in FIG. 44.

Figure 46:
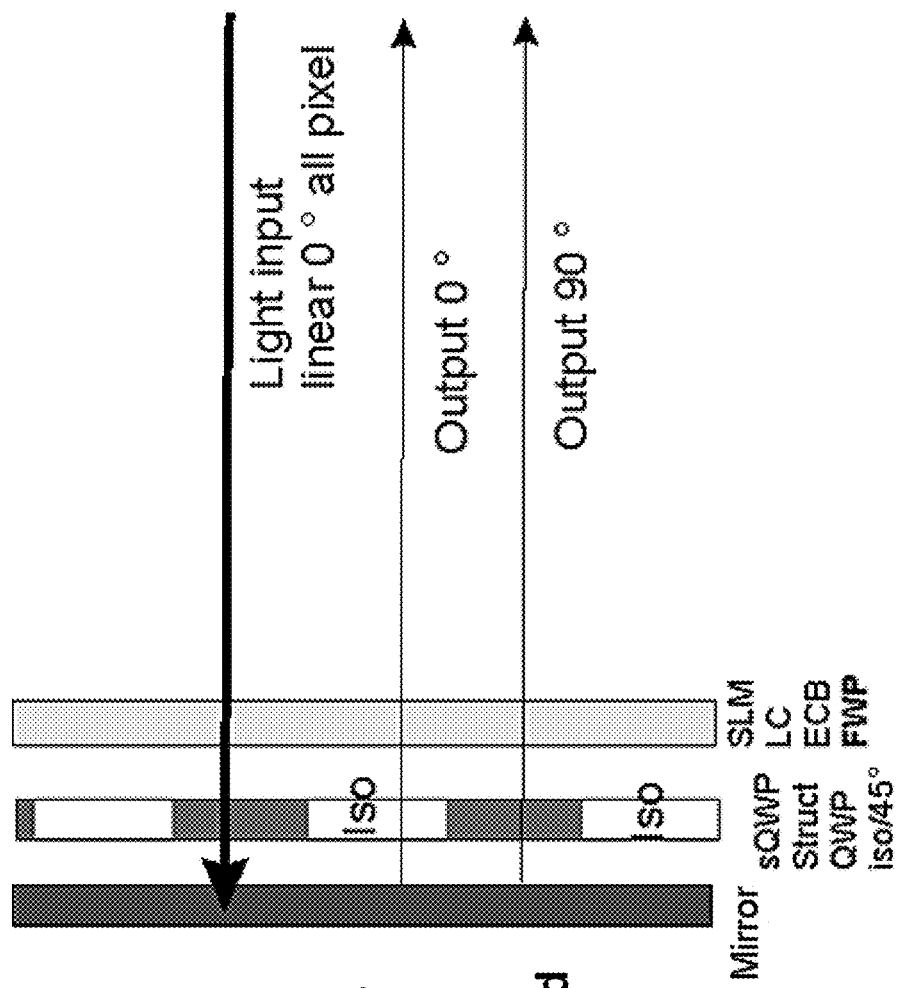
FIG. 46 shows another arrangement for out-of-plane modulation in the LC layer.

FIG. 46 shows another arrangement for out-of-plane modulation in the LC layer. On the rear side between the LC layer of the light modulator SLM and a mirror, there is here a structured quarter-wave layer sQWP—which with a different optical thickness—corresponds the arrangement of the optical axis to that of the half-wave plate in the preceding figures ((birefringent) quarter-wave layer with 45 degree optical axis in alternation with a (non-birefringent) isotropic layer).

Linearly polarized light (0°) strikes the light modulator SLM and travels on the forward path with this polarization through the LC layer. For every second pixel, the polarization is then rotated by 90 degrees by the structured quarter-wave plate sQWP. Since the out-of-plane modulating LC with ECB mode modulates the phase only for one of the linear polarization directions, for every second pixel (at the position of the 45° quarter-wave layer sQWP of the structured quarter-wave plate sQWP) a phase modulation of the light takes place only during the first pass through the LC layer. The LC layer therefore has a larger optical thickness, which corresponds at least to a full wave plate in order nevertheless to achieve a phase modulation of $2\pi$ for all pixels.

Figure 47:
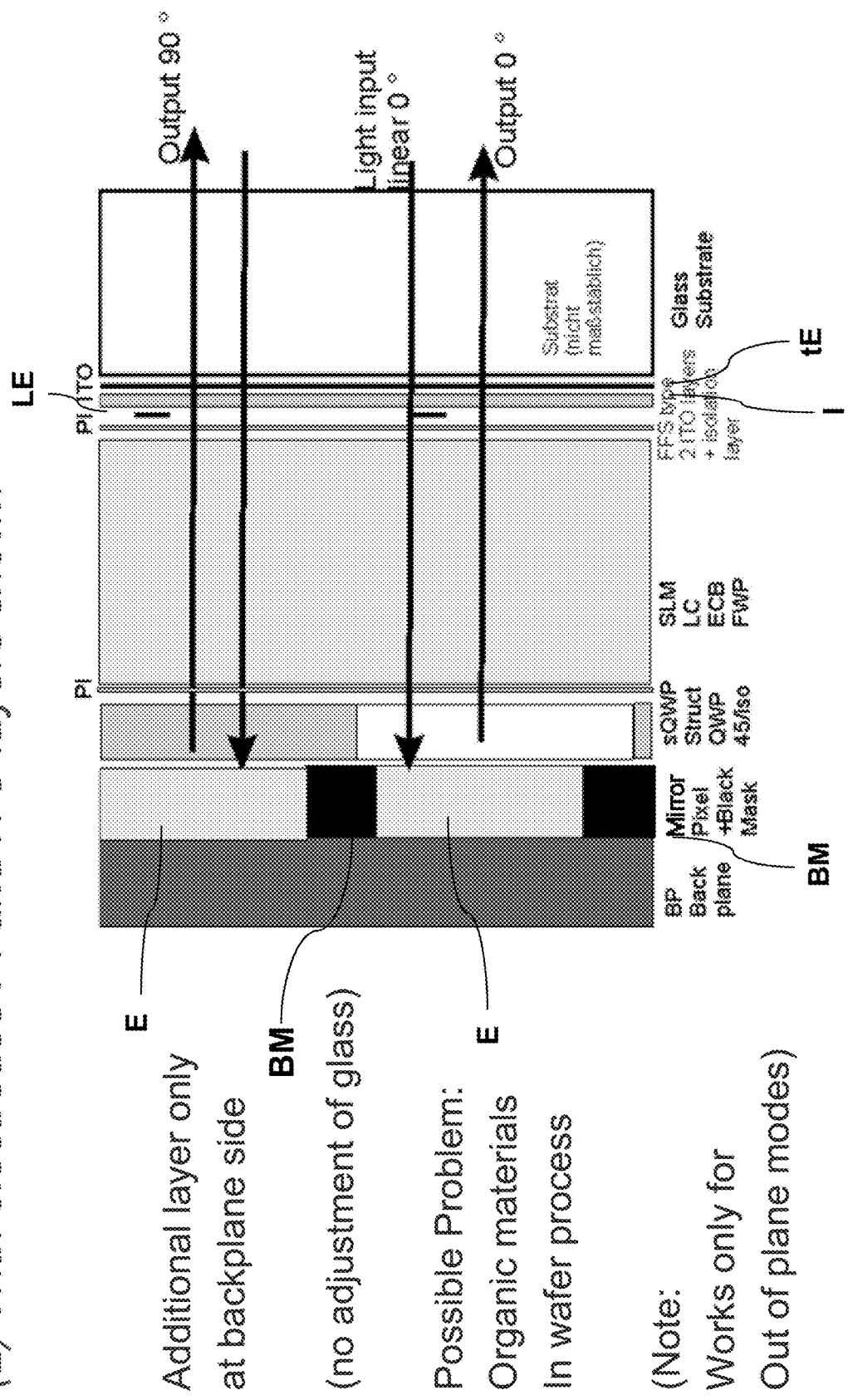
FIG. 47 shows a somewhat more detailed view of the same configuration.

FIG. 47 shows a somewhat more detailed view of the same configuration. Shown here are, from left to right, the backplane BP, the reflective pixel electrodes E and black mask BM in the pixel gaps, the structured quarter-wave plate sQWP, an orientation layer PI, for example polyimide, the LC layer of the light modulator SLM, a second orientation layer PI, a flat ITO electrode tE and the cover glass DG. Since in this case on the one hand the structured quarter-wave layer sQWP is located on the rear side on the same substrate as the pixel electrodes E, and on the other hand the cover glass DG does not have any structured elements, in this arrangement no alignment is thus required when applying the cover glass DG relative to the backplane BP. Disadvantageously, a thicker LC layer generally has slower reaction times.

Figure 48:
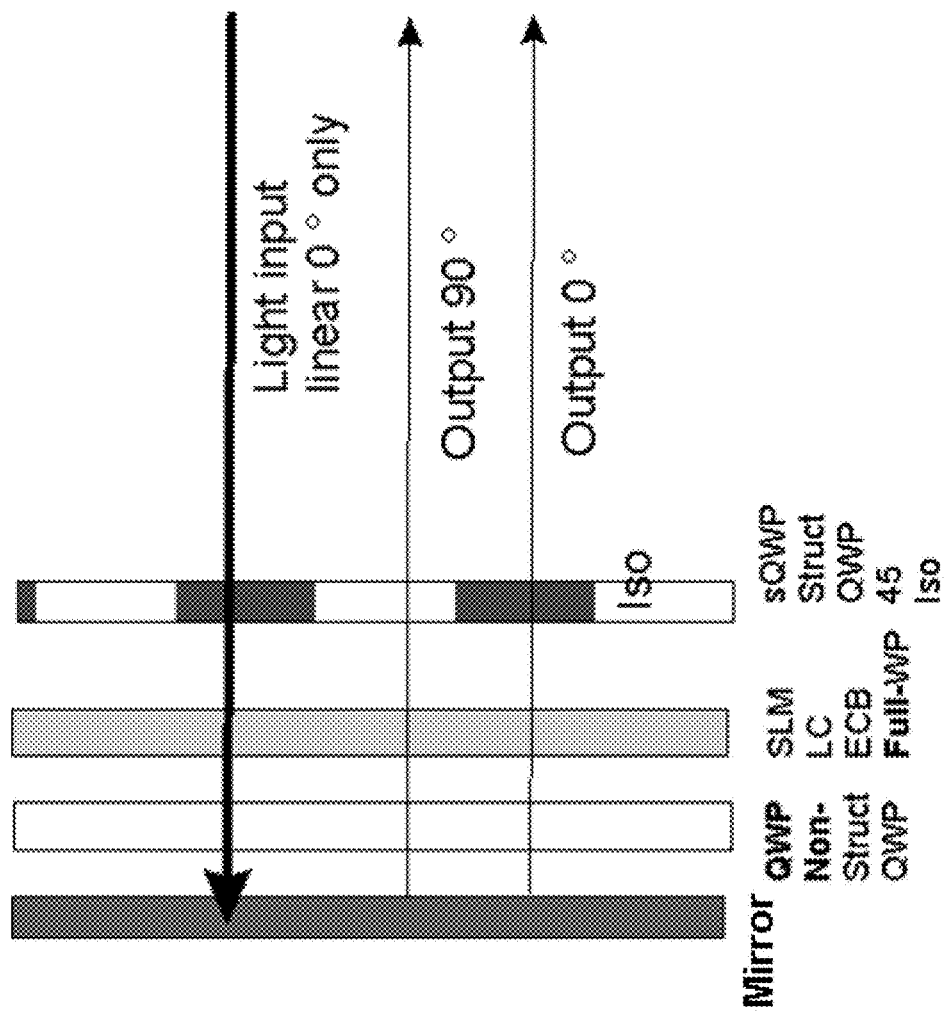
FIG. 48 shows another possible configuration where an unstructured quarter-wave layer is applied on the rear side between the LC layer of the light modulator and the mirror.

FIG. 48 shows another possible configuration: here, an unstructured quarter-wave layer sQWP is applied on the rear side between the LC layer of the light modulator SLM and the mirror. The structured quarter-wave layer sQWP is now—as seen from the LC layer of the light modulator SLM—located on the other side. This arrangement, however, is more elaborate than that described in FIG. 48.

The following figures show another configuration, which contains a polarizer on the rear side between the LC layer and the mirror. The polarization is therefore modified between the first and second passes through the LC layer.

This will be described initially for in-plane LC modes.

Figure 49:
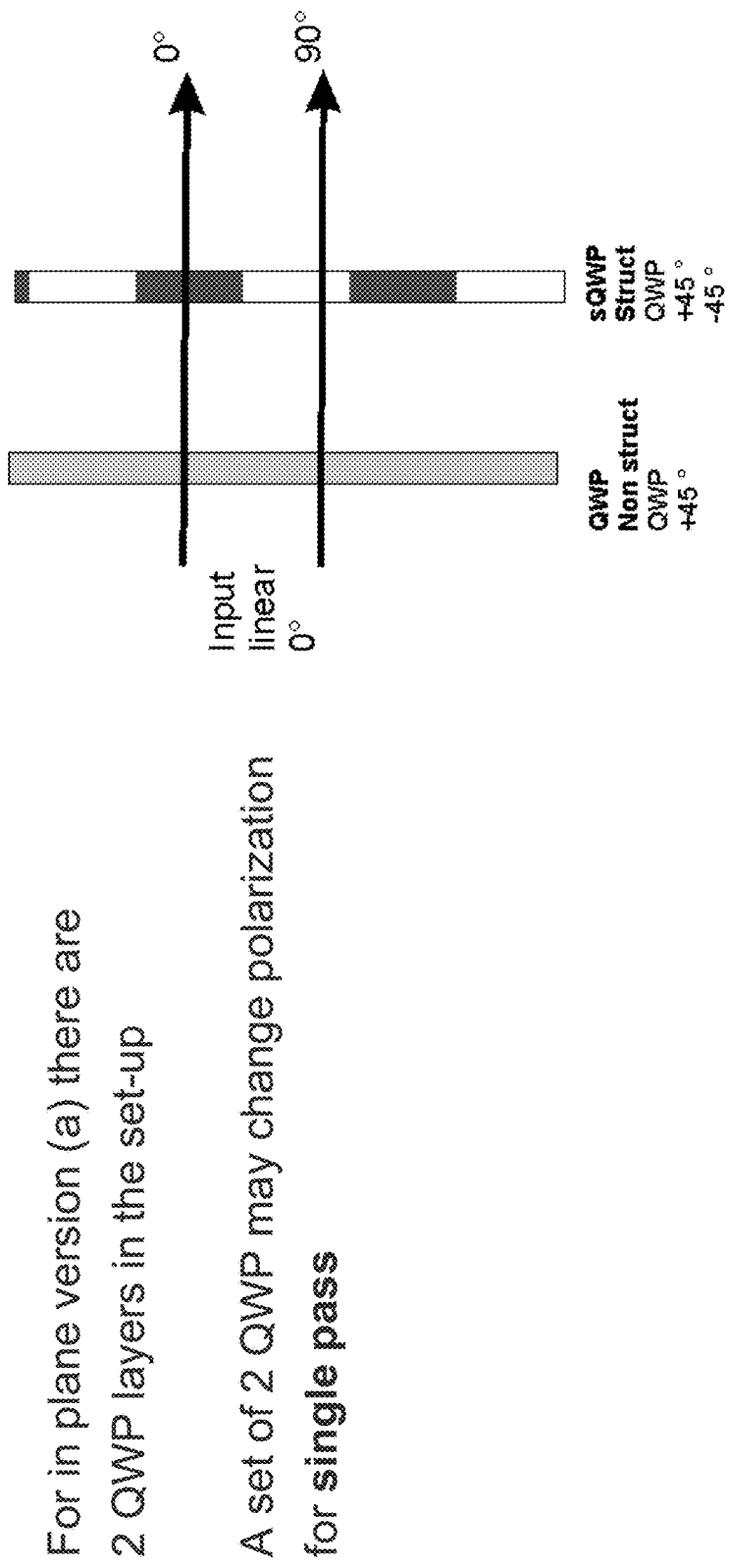
FIG. 49 shows for explanation an arrangement with two quarter-wave plates.

FIG. 49 shows for explanation an arrangement with two quarter-wave plates sQWP, QWP, of which the first is unstructured and the second structured. Linearly polarized light is converted by the first quarter-wave plate QWP into circularly polarized light. By the second (structured) quarter-wave plate sQWP with alternately a +45- and −45-degree optical axis, the light is converted again into linearly polarized light with alternately a 0- and 90-degree polarization direction. In a transmissive arrangement, for example, a liquid-crystal layer for phase modulation could be located between the two quarter-wave layers QWP and sQWP.

For single passage through the two quarter-wave layers, the aim is thus achieved of obtaining a different linear polarization for every second pixel.

For a reflective arrangement, however, during the second pass through the two quarter-wave layers QWP and sQWP the polarization rotation would be reversed and the same polarization would be obtained for all pixels.

The approach of the configurations described below now consists in arranging, between the first and second passes through the quarter-wave layers, i.e. close to the mirror side, a polarizer which eliminates the effect of the quarter-wave plates in one pass but preserves it in the other pass.

Figure 50:
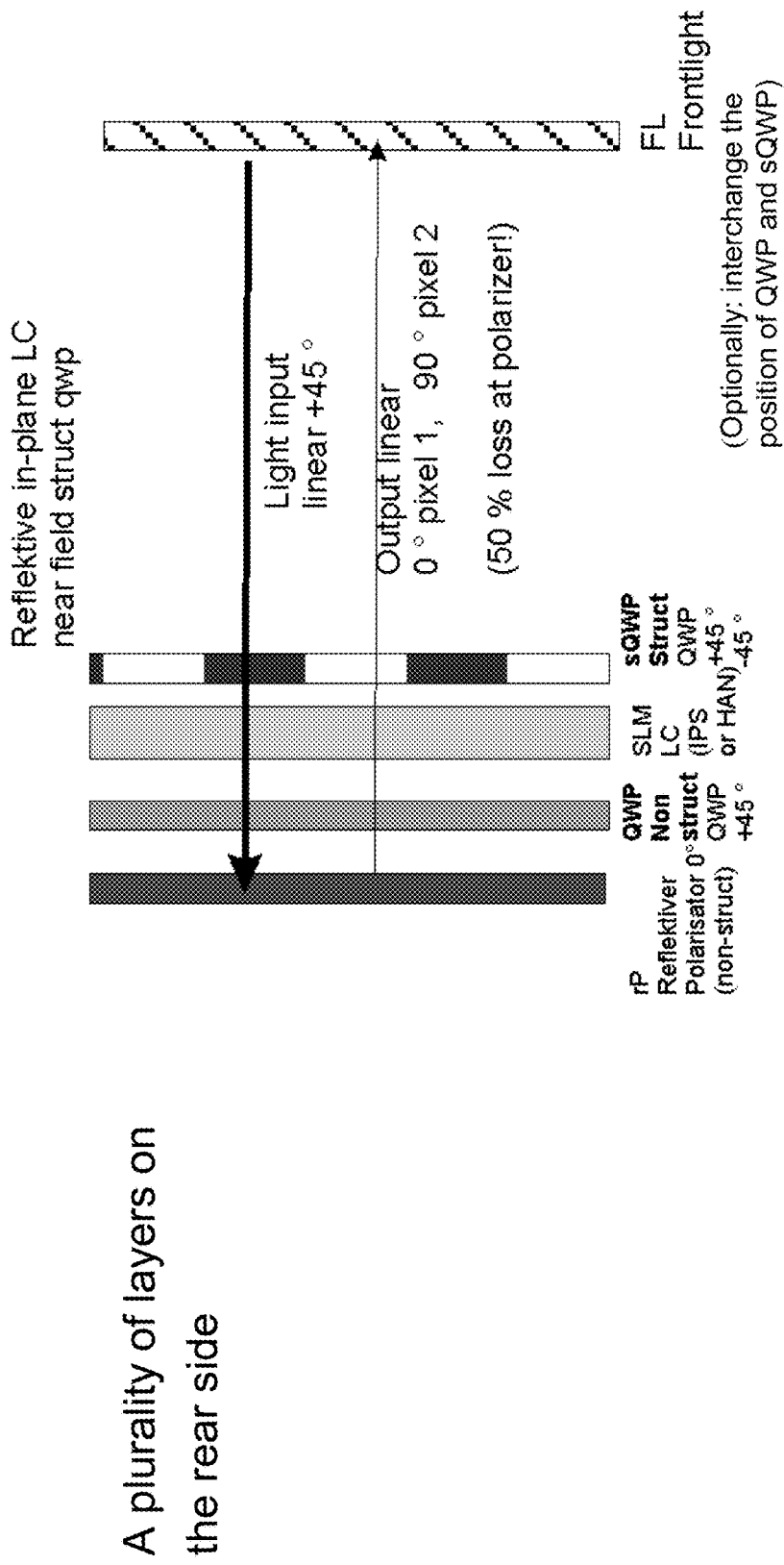
FIG. 50 shows a front-light illumination device illuminating the light modulator.

FIG. 50 shows such a configuration. This figure also shows a front-light illumination device FL (which could be configured in a comparable way to WO 2010/149583 A1), which illuminates the light modulator SLM. The front-light illumination device FL is, however, not necessarily a part of the embodiment. Optionally, the illumination may for example also be carried out by means of a polarization beam-splitter cube, and a further half-wave plate, which rotates the polarization by 45 degrees, may optionally be located between the beam-splitter cube and the arrangement.

Light with a 45° linear polarization strikes the structured quarter-wave plate sQWP with alternately a +45° and −45° orientation of the optical axis. Since the orientation of the quarter-wave plate sQWP is selectively perpendicular or parallel to the polarization direction of the incident light, its polarization state remains linear and 45°.

The linearly polarized light passes through the LC layer of the light modulator SLM and then strikes a quarter-wave plate QWP, likewise with a 45-degree orientation of the optical axis, and then a reflective polarizer rP (or optionally a combination of a transmissive polarizer and a mirror).

Only light polarized linearly at 0 degrees returns from the polarizer rP and passes through the aforementioned layers in the opposite order, i.e. it is circularly polarized after passing through the quarter-wave plate QWP, passes through the LC layer and then after passing through the structured quarter-wave plate sQWP is linearly polarized alternately at 0 degrees or 90 degrees for adjacent pixels.

Optionally, the arrangement of a structured and unstructured quarter-wave plate sQWP, QWP may also be interchanged, so that the structured quarter-wave plate sQWP is applied between the LC layer and the polarizer rP.

However, like some of the other embodiments, this embodiment with the polarizer rP on the rear side also has the disadvantage that 50% of the incident light is lost because of the polarizer rP.

Figure 51:
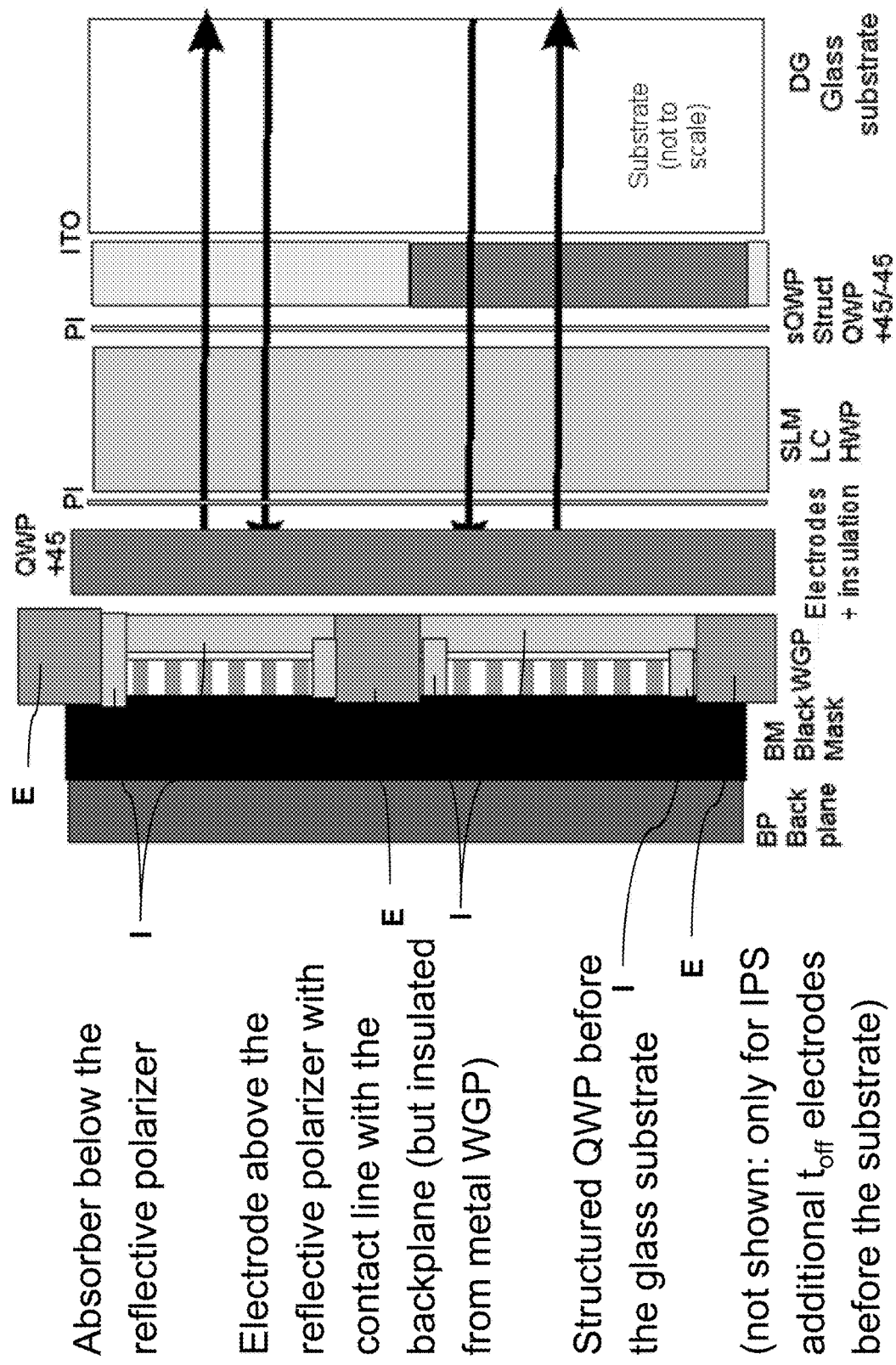
FIG. 51 shows details of the configuration of FIG. 50.

FIG. 51 shows details of the same configuration. Shown, from right to left, are a glass substrate DG, an ITO electrode internally on the glass substrate DG, the structured quarter-wave plate sQWP, a layer PI for orientation of liquid crystals LC, in this case polyimide, a liquid-crystal layer of the light modulator SLM, the optical thickness of which corresponds to a half-wave plate, a further layer PI for orientation of the liquid crystals, in this case again polyimide, and a further quarter-wave plate QWP.

The pixel electrodes E for generating an in-plane field are arranged on the backplane side in the pixel gaps. Between them is the reflective polarizer, in this case a wire-grid polarizer WGP. Since wire-grid polarizers are metallic and therefore conductive, there is an insulating layer I over the polarizer WGP and laterally between the polarizer WGP and the electrode E.

Since the polarizer WGP reflects one linear polarization direction but transmits the polarization direction perpendicular thereto, in this case there is a black mask BM for absorbing the transmitted light on the backplane side behind the polarizer WGP.

Figure 52:
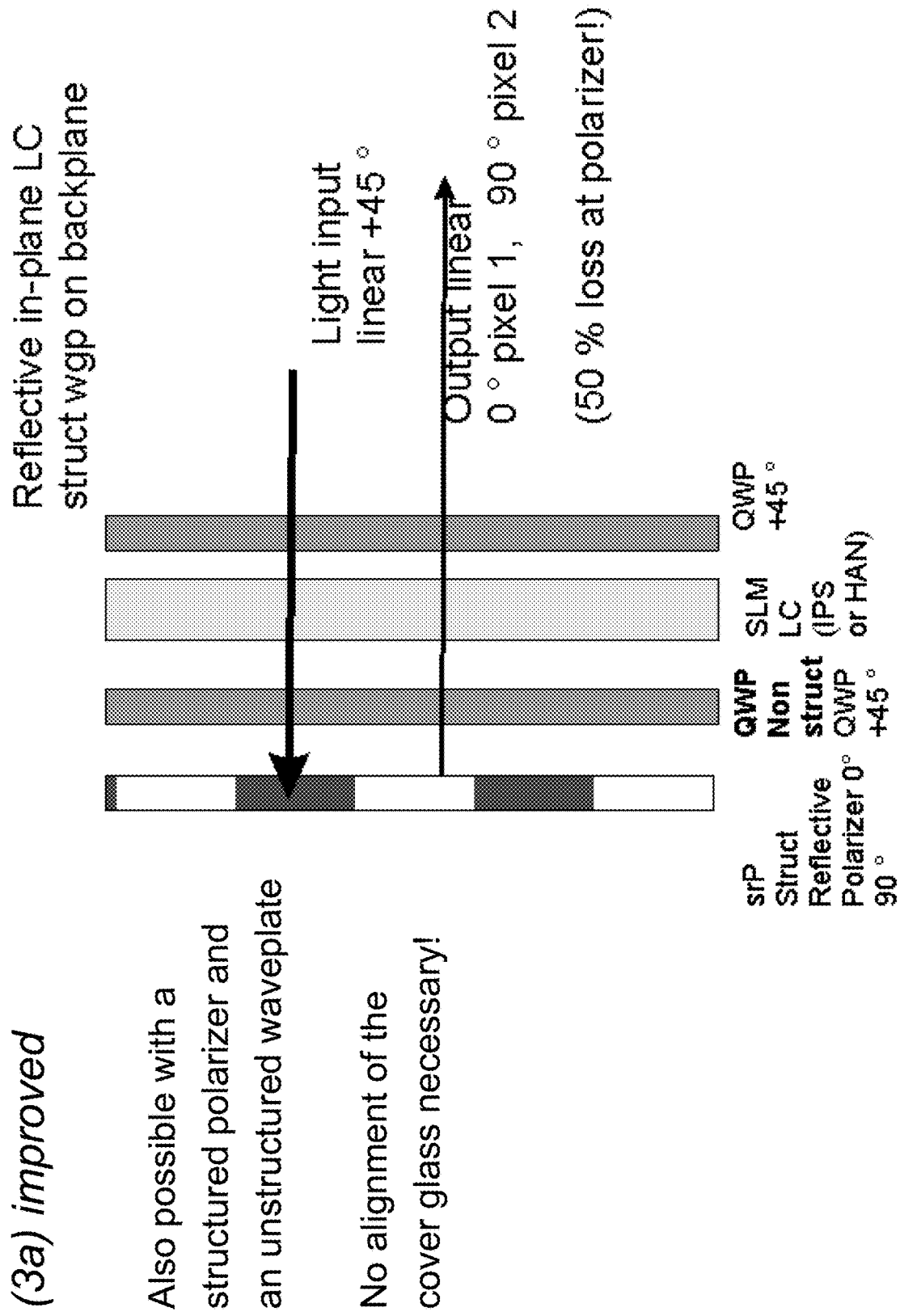
FIG. 52 shows a configuration which is more advantageous in comparison with FIGS. 50, 51.

FIG. 52 shows a configuration which is more advantageous in comparison with FIGS. 50, 51. In this configuration, both quarter-wave plates QWP are unstructured. Instead, the reflective polarizer srP on the backplane side is structured pixelwise.

A metallic wire-grid polarizer WGP on the backplane may also be produced in a structured way by semiconductor processes. Since structured arrangements are present only on the backplane side, it is not necessary to align the cover glass in its position with the backplane during production of the SLM.

On the forward path to the polarizer srP, the incident light passes only through unstructured layers. At the polarizer srP, 0°- and 90°-linearly polarized light is then alternately reflected in adjacent pixels. The light passes through a quarter-wave plate QWP, so that it is circularly polarized, then the LC layer of the light modulator SLM and a further quarter-wave plate QWP, so that it emerges again from the arrangement linearly polarized in adjacent pixels alternately by 0° and 90°.

Figure 53:
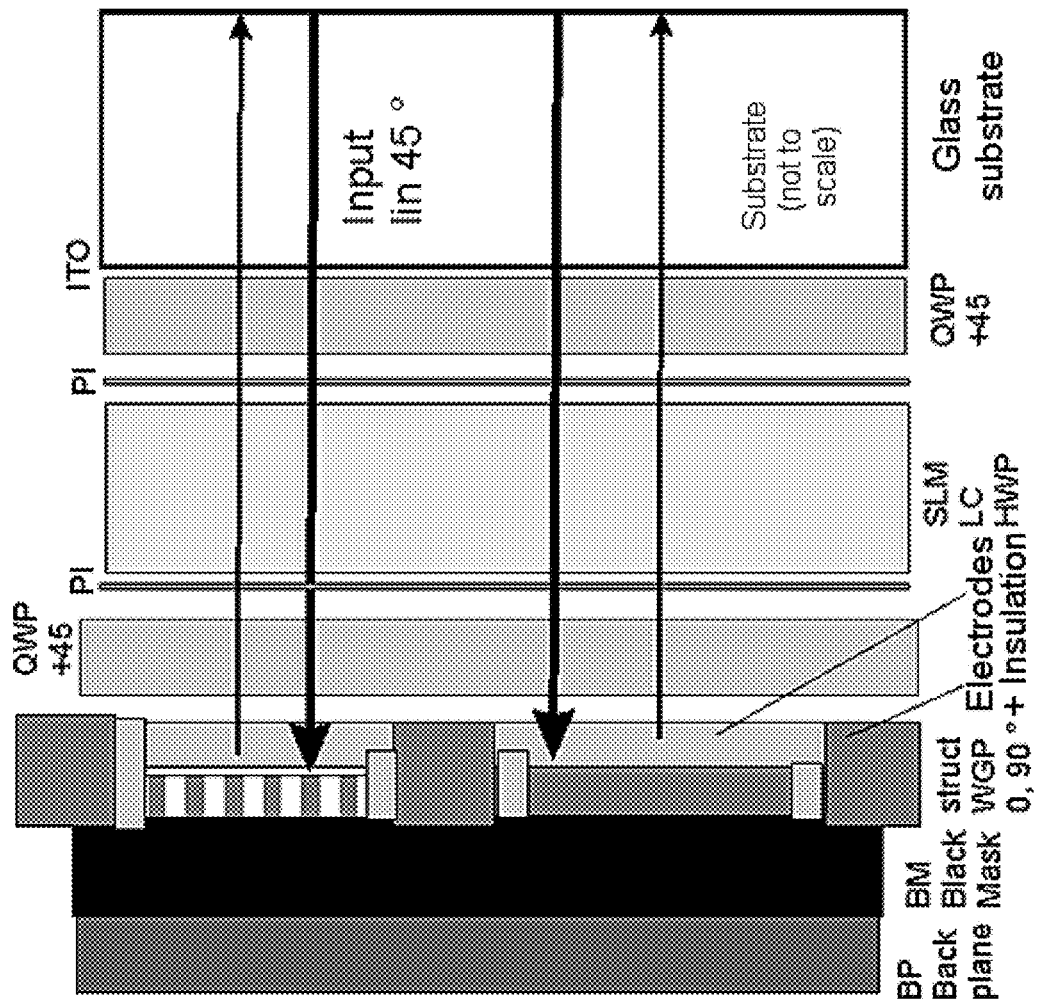
FIG. 53 shows details of the configuration shown in FIG. 52.

FIG. 53 shows details of the same configuration. Shown from right to left are a glass substrate DG, an ITO electrode E internally on the glass substrate, a first quarter-wave plate QWP, a layer PI for orientation of liquid crystals, in this case polyimide, a liquid-crystal layer LC of the light modulator SLM, the optical thickness of which corresponds to a half-wave plate, a further layer PI for orientation of the liquid crystals, in this case again polyimide, and a further quarter-wave plate QWP. The pixel electrodes E for generating an in-plane field are arranged on the backplane side in the pixel gaps. Between them is the reflective polarizer, in this case a wire-grid polarizer WGP. The polarizer WGP is structured, for example by different orientation of the "wires", i.e. the orientation of the metal threads, for example parallel to the plane of the drawing in the lower pixel shown and perpendicular to the plane of the drawing in the upper pixel shown. By the structuring of the polarizer WGP, for every second pixel (in FIG. 53 the upper pixel) light with a 0-degree linear polarization is reflected and for the other pixels (in FIG. 53 the lower pixel) light with a 90-degree linear polarization is reflected. As already in the preceding configuration, there is an insulating layer I over the polarizer WGP and laterally between the polarizer WGP and the electrode E. There is likewise again a black mask BM on the backplane side behind the polarizer WGP.

Figure 54:
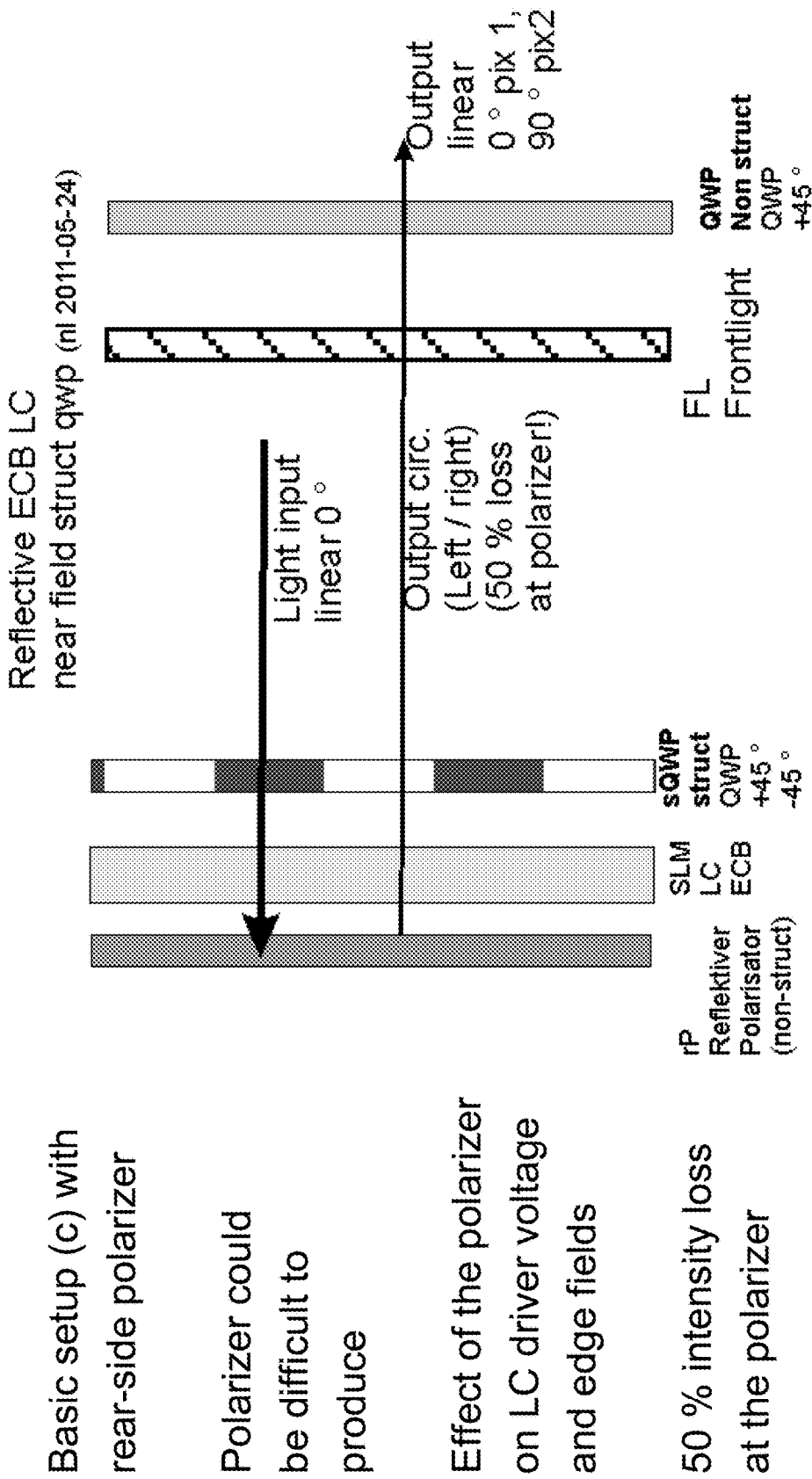
FIG. 54 shows the use of a rear-side polarizer for an LC mode with out-of-plane modulation.

FIG. 54 shows the use of a rear-side polarizer rP for an LC mode with out-of-plane modulation. The use of a front-light illumination device FL is again shown. 0°-linearly polarized light from the front-light illumination device FL strikes a structured quarter-wave plate sQWP, so that the light for adjacent pixels is alternately right- and left-circularly polarized, then the light propagates onto an LC layer of the light modulator SLM and a polarizer rP. Only a linear component of the incident circular light is reflected by the polarizer rP, so that a 50 percent light loss again occurs. The linearly polarized light then passes through the LC layer, again through the structured quarter-wave plate sQWP, so that it is alternately right-circularly and left-circularly polarized for adjacent pixels, then passes through the front-light illumination device FL and then through a further, unstructured quarter-wave plate QWP, after which it is alternately linearly polarized by 0 degrees, 90 degrees for adjacent pixels.

Figure 55:
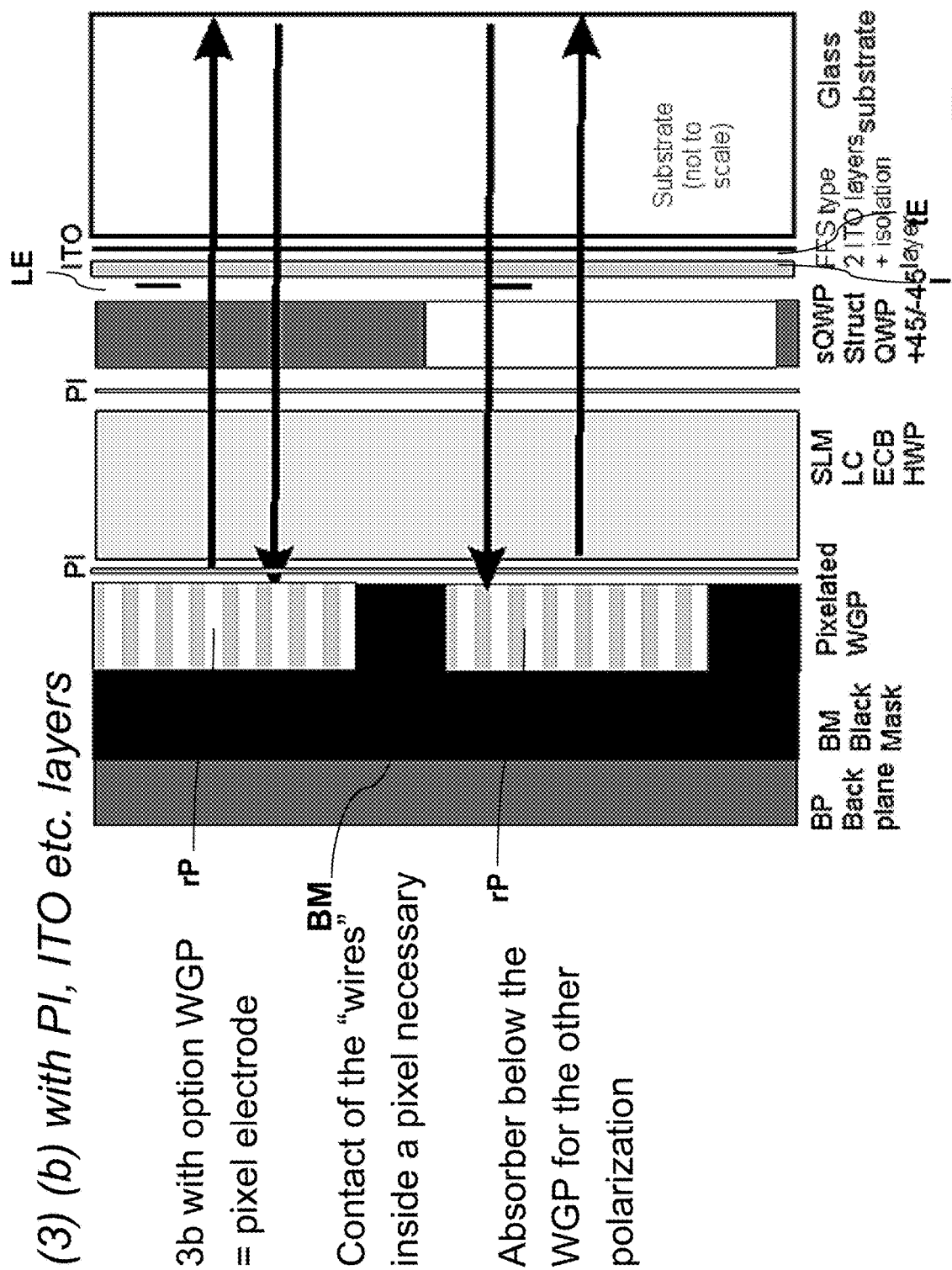
FIG. 55 shows details of the configuration shown in FIG. 54.

FIG. 55 shows details of this configuration. Shown from right to left are a glass substrate DG, electrodes tE, LE internally on the glass substrate DG. In a similar way as in FIG. 44, the electrodes tE are composed of a flat ITO layer tE, an insulation layer I and a line electrode structure LE. The flat electrode tE is in this case used to generate the out-of-plane field for switching on, and the line electrodes LE may be used in order to obtain rapid switching off of the LC of the light modulator SLM by means of an in-plane field.

The electrodes tE, LE are followed by a structured quarter-wave plate sQWP, a layer PI for orientation of liquid crystals LC, in this case polyimide, a liquid-crystal layer, the optical thickness of which corresponds to a half-wave plate, and a further layer PI for orientation of the liquid crystals LC, in this case again polyimide. On the backplane side, the reflective polarizer rP follows. In the case of the metallic wire-grid polarizer, the polarizer and pixel electrodes are identical for the out-of-plane LC mode.

Under the polarizer rP, there is again a black mask BM for absorbing light. The electrodes are electrically connected through the black mask BM to the actual backplane BP.

The shown configurations of a light modulator SLM for use in a reflective beam combiner, the light modulator SLM being based on in-plane or out-of-plane modulation of liquid crystals, have the disadvantage that the liquid crystals LC themselves generally generate the desired phase modulation only for a defined polarization state which passes through the LC layer.

The object of obtaining a desired phase modulation but at the same time a mutually perpendicular emerging linear polarization for adjacent pixels, after passing two times through the LC layer and other optical layers, as is required for the combination of the light of two pixels of a device for combining light beams which interact with adjacently arranged pixels of a light modulator, for example in a Savart plate, can often be achieved only with a loss of light intensity.

Many of the configurations shown contain a polarizer which absorbs 50% of the incident light. This loss reduces the efficiency of the light modulator and increases its energy consumption.

Advantageously, therefore, another configuration will be described below in FIG. 56, which contains a MEMS light modulator (MEMS=Micro-Electro-Mechanical Systems), the phase modulation of which is based on the displacement, i.e. the mechanical adjustment, of micromirrors HS. The phase modulation by means of displaceable mirrors HS is independent of the incident polarization. If, in front of the MEMS mirrors HS, a structured quarter-wave plate sQWP is used, which comprises a 45° quarter-wave layer alternately with an isotropic layer, in the case of incident linearly polarized light of 0° this structured quarter-wave plate sQWP alternately generates either linearly or circularly polarized light for adjacent MEMS mirrors HS. In contrast to conventionally used LC modes, the MEMS mirrors HS can respectively generate the same phase modulation for circular and linearly polarized incident light.

The light reflected by the MEMS mirrors HS passes through the structured quarter-wave plate sQWP for a second time, so that the circularly polarized light is transferred back into linearly polarized light, but light rotated by 90 degrees in comparison with the incidence direction. In the adjacent pixel, to which the isotropic layer of the quarter-wave plate sQWP is assigned, the light remains 0-degree linearly polarized. In this case, no additional polarizer is thus required on the SLM, and no light intensity is therefore lost.

Figure 56:
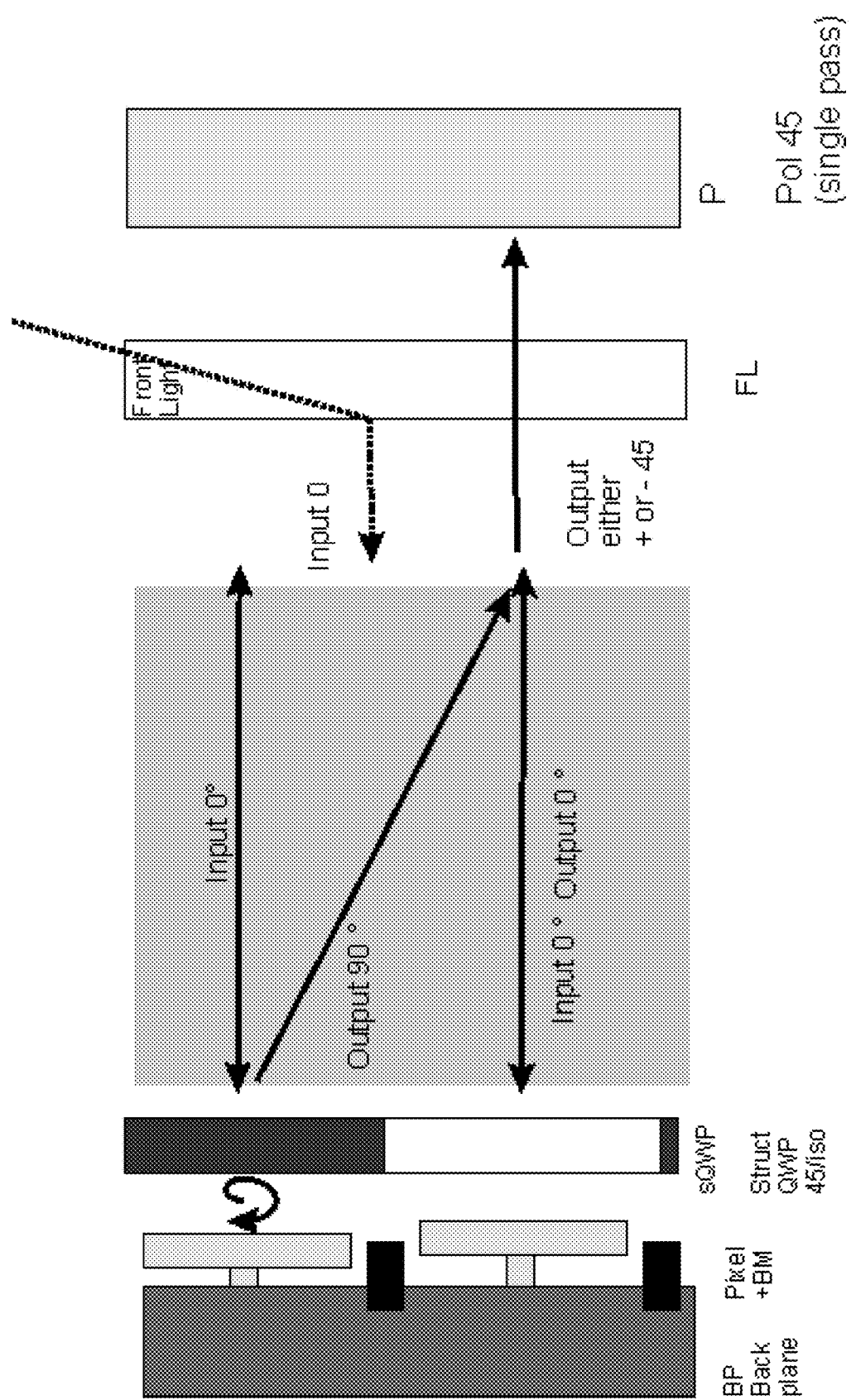
FIG. 56 shows an embodiment with a front-light illumination device for introducing the light and with a cover glass.

FIG. 56 shows an embodiment with a front-light illumination device FL for introducing the light and with a cover glass DG, which itself is birefringent and is used as a Savart plate (beam splitter and/or beam combiner). The structured quarter-wave plate sQWP may then, for example, be applied internally onto this cover glass DG. The light arriving from the front light FL passes through the cover glass DG without an offset, then the arrangement consisting of the quarter-wave plate sQWP and the MEMS mirrors HS. On the return path through the cover glass DG (the Savart plate), an offset takes place for the upper pixel with the polarization rotated by 90 degrees, so that it is superimposed with the lower pixel.

The combined light of the two pixels then passes through the front-light illumination device FL and strikes a polarizer P at 45 degrees. This polarizer P is used for amplitude modulation as a function of the relative phase of the two pixels, as is conventional in a beam combiner with a Savart plate.

The embodiment with MEMS is not restricted to the use of a cover glass DG which is used at the same time as a Savart plate, and not to the use of a front-light illumination device FL.

An essential feature is the simpler arrangement, in comparison with SLMs based on conventional LC modes, of an SLM with a structured quarter-wave plate sQWP (alternately 45° optical axis, isotropic).

The arrangement shown in FIG. 56 is not restricted to MEMS light modulators, but may also be used in a similar way for all other types of light modulators in which the phase can be modulated independently of the polarization of the incident light. These also include, for example, special LC modes such as blue phase, with an electric field applied out-of-plane.

DE 10 2009 044 910 A1 shows in FIG. 21 of this application an example of an arrangement for beam combination, in which, instead of a single optically birefringent uniaxial component, a beam combiner is also composed of two optically birefringent uniaxial components with a half-wave plate inserted between them.

The reflective arrangements described here may also optionally contain a beam combiner arrangement formed in this way, which consists of a plurality of optically birefringent uniaxial components.

FIG. 57 again shows an arrangement with a MEMS light modulator and a front-light illumination device FL, as in FIG. 56. The beam combiner is, now, composed of two birefringent uniaxial components Sp1, Sp2, the optical axes (crystal axis) of which are mutually rotated by 180 degrees, and a half-wave plate HWP45 arranged between the two uniaxial components with an optical axis at 45 degrees relative to the polarization of the incident light.

The half-wave plate HWP45 rotates the polarization of the incident and emergent light beams respectively by 90 degrees, so that the incident and emergent light beams respectively pass through one of the two birefringent uniaxial components Sp1 as an ordinary beam and the other birefringent uniaxial component Sp2 as an extraordinary beam.

Figure 57:
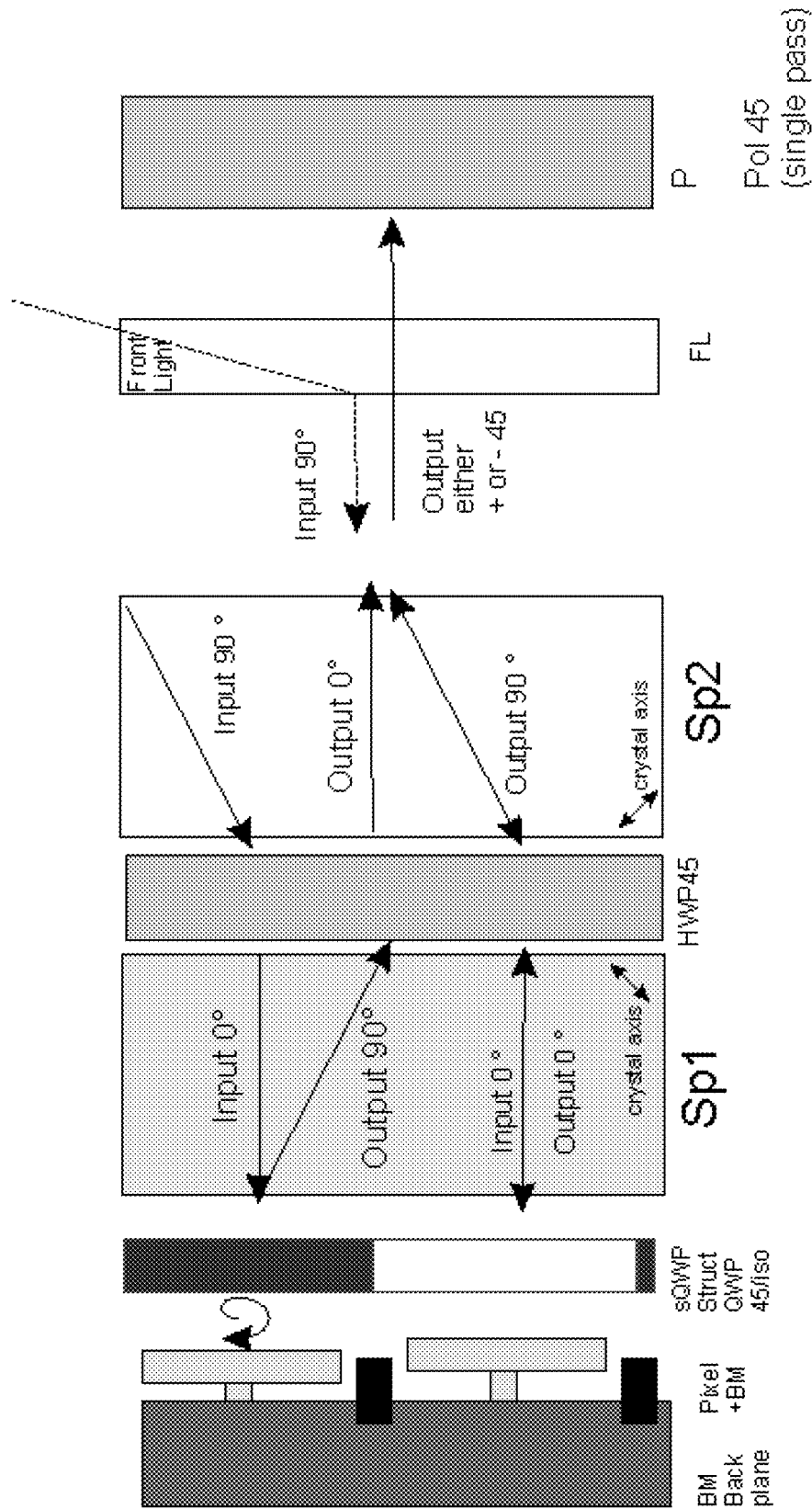
FIG. 57 shows an arrangement with a beam combiner composed of a plurality of optically birefringent uniaxial components.

A reflective light modulator generally comprises small pixels with a pitch of less than 10 micrometers, and therefore also has a better tilting tolerance, with a non-symmetrical arrangement of a beam combiner, for example than a transmissive light modulator with large pixels. An arrangement as shown in FIG. 57, with a beam combiner composed of a plurality of optically birefringent uniaxial components Sp1, Sp2, may, however, advantageously increase this tilting tolerance.

The use of the beam combiner composed of a plurality of optically birefringent uniaxial components Sp1, Sp2 is not restricted to the embodiment with the MEMS light modulator, but may also be used for example in combination with other embodiments of a light modulation arrangement, which are shown in FIGS. 39 to 55.

Indicated below are embodiments of a light modulation arrangement which is suitable for spatially modulating light in reflective beam guiding, the light modulation arrangements allowing faster switching times compared with the light modulation arrangements known in the prior art, and/or such a light modulation arrangement can be combined with a device for combining light beams which interact with adjacently arranged pixels of a light modulator, which in particular are also configured in such a way that the sensitivity to changes of the incidence angle of the light onto the device for combining light beams according to Annex I is reduced. More particularly preferably, such a light modulation arrangement may be integrated into an apparatus for representing two-dimensional and/or three-dimensional image contents and/or moving scenes.

Embodiments

1. Light modulation arrangement for reflective beam guiding, having a spatial light modulator which comprises a plurality of pixels and a backplane for electrical driving of the pixels, having at least one beam influencing component which is configured in such a way that pixelwise influencing of the light interacting with the pixels of the light modulator is thereby made possible and/or having at least one electrode arrangement which is formed and configured to achieve accelerated orientation of liquid crystals for the switch-on process and/or for the switch-off process.

2. Light modulation arrangement according to embodiment 1, wherein the pixels of the light modulator comprise liquid crystals which modify the phase (the optical path) of the light interacting with the pixels because of a controlled orientation change.

3. Light modulation arrangement according to embodiment 2, wherein the liquid crystals are configured in such a way that they carry out an "in-plane" modulation by their controlled orientation change, particularly in the form of an IPS (in-plane-switching), HAN (hybrid aligned nematic) or CIPR (continuous in-plane rotation) mode, or in the form of smectic liquid-crystal modes in which an in-plane rotation of the liquid crystals in an electric field dominates over an out-of-plane rotation, or in the form of cholesteric phases in which the optical axis has an in-plane rotation in the electric field (uniform lying helix, ULH).

4. Light modulation arrangement according to embodiment 2, wherein the liquid crystals are configured in such a way that they carry out an "out-of-plane" modulation by their controlled orientation change, particularly in the form of an ECB mode.

5. Light modulation arrangement according to embodiment 3 or 4, wherein, provided between the backplane and the light modulator, there is a structured electrode arrangement in which the electrodes are arranged in a gap of adjacent pixels and/or in which each pixel comprises an—in particular essentially flatly configured—electrode.

6. Light modulation arrangement according to embodiment 5, wherein at least one insulation layer for electrical insulation of the structured electrode arrangement from further electrically conductive elements of the light modulation arrangement is provided.

7. Light modulation arrangement according to one of embodiments 2 to 6, wherein an electrode arrangement and/or a structured electrode arrangement is arranged on the side of the backplane facing away from the light modulator.

8. Light modulation arrangement according to embodiment 4, wherein the beam influencing component comprises at least one structured polarization influencing device, which is arranged between the backplane and the light modulator and which is configured and arranged in such a way that light of adjacent pixels is thereby influenced differently in its polarization.

9. Light modulation arrangement according to embodiment 4 or 8, wherein the beam influencing component comprises at least one structured polarization influencing device, which is arranged on the side of the backplane facing away from the light modulator and which is configured and arranged in such a way that light of adjacent pixels is thereby influenced differently in its polarization, which could be configured in the form of a structured quarter-wave plate, a structured half-wave plate or a structured wire-grid polarizer.

9. Light modulation arrangement according to one of embodiments 4, 8 or 9, wherein the beam influencing component comprises at least one polarization influencing device or a polarizer, the at least one polarization influencing device or the polarizer being arranged between the backplane and the light modulator and/or on the side of the backplane facing away from the light modulator, and possibly being configured in the form of a quarter-wave plate, a half-wave plate or a wire-grid polarizer.

10. Light modulation arrangement according to one of embodiments 1 to 9, wherein the light modulator or a reflective element is configured and drivable in such a way that light interacting with adjacent pixels is influenced differently in terms of polarization.

11. Light modulation arrangement according to one of embodiments 1 to 10, wherein the light modulator has an optical thickness which corresponds essentially to the optical thickness of a half-wave plate or a quarter-wave plate.

12. Light modulation arrangement according to one of embodiments 1 to 11, wherein the light modulator comprises pixels with a pixelwise or linearly structured different property.

13. Light modulation arrangement according to one of embodiments 1 to 12, which is illuminated with light that is directed or guided in the direction of the light modulation arrangement with the aid of a front-light illumination device or with a neutral beam splitter.

The invention claimed is:

1. A device for combining light beams which interact with adjacently arranged pixels of a light modulator, the device comprising:
a beam splitting component,
the light modulator having a multiplicity of pixels,
a beam combining component, and
a beam superposition component,
wherein the beam splitting component is configured and arranged in such a way that incident light beams are thereby split into a first subbeam and a second subbeam by the beam splitting component, in such a way that the first subbeam propagates toward a first pixel of the light modulator and the second subbeam propagates toward a second pixel of the light modulator, the beam combining component is configured and arranged in such a way that the first subbeam and the second subbeam is thereby combined after interaction with the respective pixels of the light modulator, the beam splitting component and the beam combining component are configured and arranged in such a way that a sum of optical path lengths of the first subbeam and the second subbeam is respectively constant for different angles of incidence, and
wherein an optical beam path of the first subbeam in relation to a polarization property and an optical beam path of the second subbeam in relation to a polarization property are essentially configured point-symmetrically with respect to a midpoint between the first pixel and the second pixel.

2. The device as claimed in claim 1, wherein the beam splitting component and the beam combining component are identically configured optically birefringent uniaxial components or are formed from the same material or comprise the same optical axes.

3. The device as claimed in claim 1, wherein the beam splitting component and the beam combining component are identically configured optically birefringent uniaxial components having optical axes being oriented in such a way that the angle with respect to an interface forms an equal angle between an ordinary subbeam and an extraordinary subbeam for the two uniaxial components or wherein the optical axes of the two birefringent uniaxial components are oriented at about 45°, or wherein the optical axes of the birefringent uniaxial components, or crystals, are orientated in such a way that the angle with respect to the interface produces a constant walk-off angle for the two uniaxial components.

4. The device as claimed in claim 1, wherein the beam splitting component splits the incident light beams into the first subbeam and the second subbeam, the first subbeam and the second subbeam having essentially the same intensity.

5. The device as claimed in claim 1, wherein an absorber mask or an aperture diaphragm is arranged such that every second pixel of the light modulator is covered.

6. The device as claimed in claim 1, wherein a structured beam influencing component comprises a spatial structuring which regionally has the functionality of at least one of a retarder, of a λ/2 plate and of a λ/4 plate, of regionally modifying no optical property of a subbeam, or wherein a spatial structuring of a structured beam influencing component is adapted to a spatial structure of the pixels of the light modulator.

7. The device as claimed in claim 6, wherein the structured beam influencing component is arranged at least one of in front of and behind the spatial light modulator.

8. The device as claimed in claim 1, wherein a beam influencing component comprises the functionality of a retarder or of a λ/2 plate or of a λ/4 plate.

9. The device as claimed in claim 8, wherein the beam influencing component is arranged at least one of in front of and behind the spatial light modulator.

10. The device as claimed in claim 1, wherein the first subbeam and the second subbeam are made to interfere with the beam superposition component or wherein the beam superposition component is a linear polarizer which is arranged at the exit of the arrangement or which might be arranged at about 45°.

11. The device as claimed in claim 1, wherein at least two of the light modulator, the beam splitting component, the beam combining component, the beam superposition component and a structured beam influencing component are directly arranged on one another or fastened to one another, for example by means of adhesive.

12. The device as claimed in claim 1, wherein surrounding optical media is configured symmetrically in such a way that the sum of the optical path lengths of the two subbeams is respectively constant for different angles of incidence.

13. The device as claimed in claim 1, wherein the incident light beams have a linear polarization or a circular polarization, which is oriented or adjusted in such a way that the light beams can be split into the first and second subbeams and recombined.

14. The device as claimed in claim 1, wherein the beam splitting component and the beam combining component are at least one of volume gratings, volume Bragg gratings and polarization gratings.

15. The device as claimed in claim 1, wherein the light modulator comprises liquid crystals and is configured in such a way that the liquid crystals execute an out-of-plane rotation, or an ECB (electrically controlled birefringence) mode.

16. The device as claimed in claim 15, wherein the incident light beams are linearly polarized, wherein a structured beam influencing component regionally has the functionality of a $\lambda/2$ plate.

17. An apparatus for the representation of at least one of two-dimensional, three-dimensional image contents and moving scenes, having at least one device as claimed in claim 1.

18. A device for combining light beams which interact with adjacently arranged pixels of a light modulator, the device comprising:
  a beam splitting component,
  the light modulator having a multiplicity of pixels,
  a beam combining component, and
  a beam superposition component,
  wherein the beam splitting component is configured and arranged in such a way that incident light beams are thereby split into a first subbeam and a second subbeam by the beam splitting component, in such a way that the first subbeam propagates toward a first pixel of the light modulator and the second subbeam propagates toward a second pixel of the light modulator, the beam combining component is configured and arranged in such a way that the first subbeam and the second subbeam is thereby combined after interaction with the respective pixels of the light modulator, the beam splitting component and the beam combining component are configured and arranged in such a way that a sum of optical path lengths of the first subbeam and the second subbeam is respectively constant for different angles of incidence, wherein the light modulator comprises liquid crystals and is configured in such a way that the liquid crystals execute an in-plane rotation, or a HAN-LC mode (hybrid aligned nematic liquid crystal mode) or a CIPR mode (continuous in-plane rotation) or a Smectic LC mode or a Cholesteric LC mode (ULH uniform lying helix) and
  wherein the incident light beams are linearly polarized, wherein a structured beam influencing component regionally has the functionality of a $\lambda/4$ plate.

19. A device for combining light beams which interact with adjacently arranged pixels of a light modulator, the device comprising the following components in an order with regard to the propagation direction of linearly polarized light interacting with the device:
  an absorber mask or an aperture diaphragm is arranged such that every second pixel of the light modulator is covered,
  a uniaxial birefringent beam splitting component,
  a first structured beam influencing component regionally having the functionality of a $\lambda/2$ plate,
  the light modulator having a multiplicity of pixels and being configured in such a way that the liquid crystals execute an out-of-plane rotation,
  a second structured beam influencing component regionally having the functionality of a $\lambda/2$ plate,
  a uniaxial birefringent beam combining component, and
  a beam superposition component being a linear polarizer,
  wherein the beam splitting component is configured and arranged in such a way that incident light beams are thereby split into a first subbeam and a second subbeam by the beam splitting component, in such a way that the first subbeam propagates toward a first pixel of the light modulator and the second subbeam propagates toward a second pixel of the light modulator, the beam combining component is configured and arranged in such a way that the first subbeam and the second subbeam is thereby combined after interaction with the respective pixels of the light modulator, the beam splitting component and the beam combining component are configured and arranged in such a way that a sum of optical path lengths of the first subbeam and the second subbeam is respectively constant for different angles of incidence, and
  wherein an optical beam path of the first subbeam in relation to a polarization property and an optical beam path of the second subbeam in relation to a polarization property are essentially configured point-symmetrically with respect to a midpoint between the first pixel and the second pixel.

20. A device for combining light beams which interact with adjacently arranged pixels of a light modulator, the device comprising the following components in an order with regard to the propagation direction of linearly polarized light interacting with the device:
  an absorber mask or an aperture diaphragm is arranged such that every second pixel of the light modulator is covered,
  a uniaxial birefringent beam splitting component,
  a first beam influencing component regionally having the functionality of a $\lambda/4$ plate,
  the light modulator having a multiplicity of pixels and is configured in such a way that the liquid crystals execute an in-plane rotation,
  a second beam influencing component regionally having the functionality of a $\lambda/4$ plate,
  a uniaxial birefringent beam combining component, and
  a beam superposition component being a linear polarizer,
  wherein the beam splitting component is configured and arranged in such a way that incident light beams are thereby split into a first subbeam and a second subbeam by the beam splitting component, in such a way that the first subbeam propagates toward a first pixel of the light modulator and the second subbeam propagates toward a second pixel of the light modulator, the beam combining component is configured and arranged in such a way that the first subbeam and the second subbeam is thereby combined after interaction with the respective pixels of the light modulator, the beam splitting component and the beam combining component are configured and arranged in such a way that a sum of optical path lengths of the first subbeam and the second subbeam is respectively constant for different angles of incidence.

\* \* \* \* \*